United States Patent [19]

Kuroiwa et al.

[11] Patent Number: 5,619,251
[45] Date of Patent: Apr. 8, 1997

[54] TWO-WAY CATV SYSTEM AND REMOTE CONTROL SYSTEM

[75] Inventors: Wataru Kuroiwa, Yokohama; Isao Miyazaki, Kawasaki; Shinichi Ooi, Yokohama; Yasushi Odagiri, Yokohama; Masahiro Takahashi, Yokohama, all of Japan

[73] Assignee: Kabushiki Kaisha Toshiba, Kawasaki, Japan

[21] Appl. No.: 290,303

[22] Filed: Aug. 12, 1994

[30]   Foreign Application Priority Data

Aug. 13, 1993 [JP] Japan .................................. 5-201545
Aug. 13, 1993 [JP] Japan .................................. 5-201546

[51] Int. Cl.$^6$ ...................................................... H04N 7/14
[52] U.S. Cl. ............................... 348/12; 348/6; 348/734
[58] Field of Search .................................... 348/10, 6, 7, 8, 348/11, 12, 13, 734; 455/3.1, 4.1, 4.2, 5.1, 6.2, 6.3; H04N 5/00, 7/10, 7/14, 7/173

[56]   References Cited

U.S. PATENT DOCUMENTS

| | | |
|---|---|---|
| 4,771,456 | 9/1988 | Martin et al. . |
| 4,864,613 | 9/1989 | Van Cleave . |
| 4,885,803 | 12/1989 | Hermann et al. . |
| 4,972,503 | 11/1990 | Zurlinden . |
| 5,151,789 | 9/1992 | Young . |
| 5,235,640 | 8/1993 | Devries et al. . |
| 5,280,276 | 1/1994 | Kwok . |
| 5,410,326 | 4/1995 | Goldstein .............................. 348/734 |
| 5,459,507 | 10/1995 | Sakuma .................................. 348/10 |

FOREIGN PATENT DOCUMENTS

| | | |
|---|---|---|
| 0323258 | 7/1989 | European Pat. Off. . |
| 2207838 | 2/1989 | United Kingdom . |
| WO90/00847 | 1/1990 | WIPO . |
| WO92/10040 | 6/1992 | WIPO . |

OTHER PUBLICATIONS

Patent Abstracts of Japan, vol. 10, No. 248 (E-431), Aug. 26, 1986, JP-A-61 075690, Apr. 18, 1986.
Patent Abstracts of Japan, vol. 17, No. 335 (P-1563), Jun. 24, 1993, JP-A-05 040984, Feb. 19, 1993.
Elektor, No. 4, Apr. 1990, pp. 10+12, "D2B-Home-Bus Fuer Audio und Video".

*Primary Examiner*—David E. Harvey
*Attorney, Agent, or Firm*—Oblon, Spivak, McClelland, Maier & Neustadt, P.C.

[57] ABSTRACT

There is provided a method with which the expansion of CATV services and the diversity of subscribers' needs can be dealt with flexibly, it is easier to maintain and expand the apparatus, the system can be operated simply, and the parental control function is also simple. A head end and a subscriber terminal unit have two-way communication means and are connected to each other via a two-way transmission line. The HIB and subscriber remote control units each have two-way communication means. The output of HIB is supplied to various types of apparatuses. The HIB can also exchange data with an expansion unit. To control various types of apparatuses with a remote control unit, the remote control unit communicates with the HIB, receives the necessary data under the control of HIB, and together with HIB, controls various types of apparatuses.

23 Claims, 52 Drawing Sheets

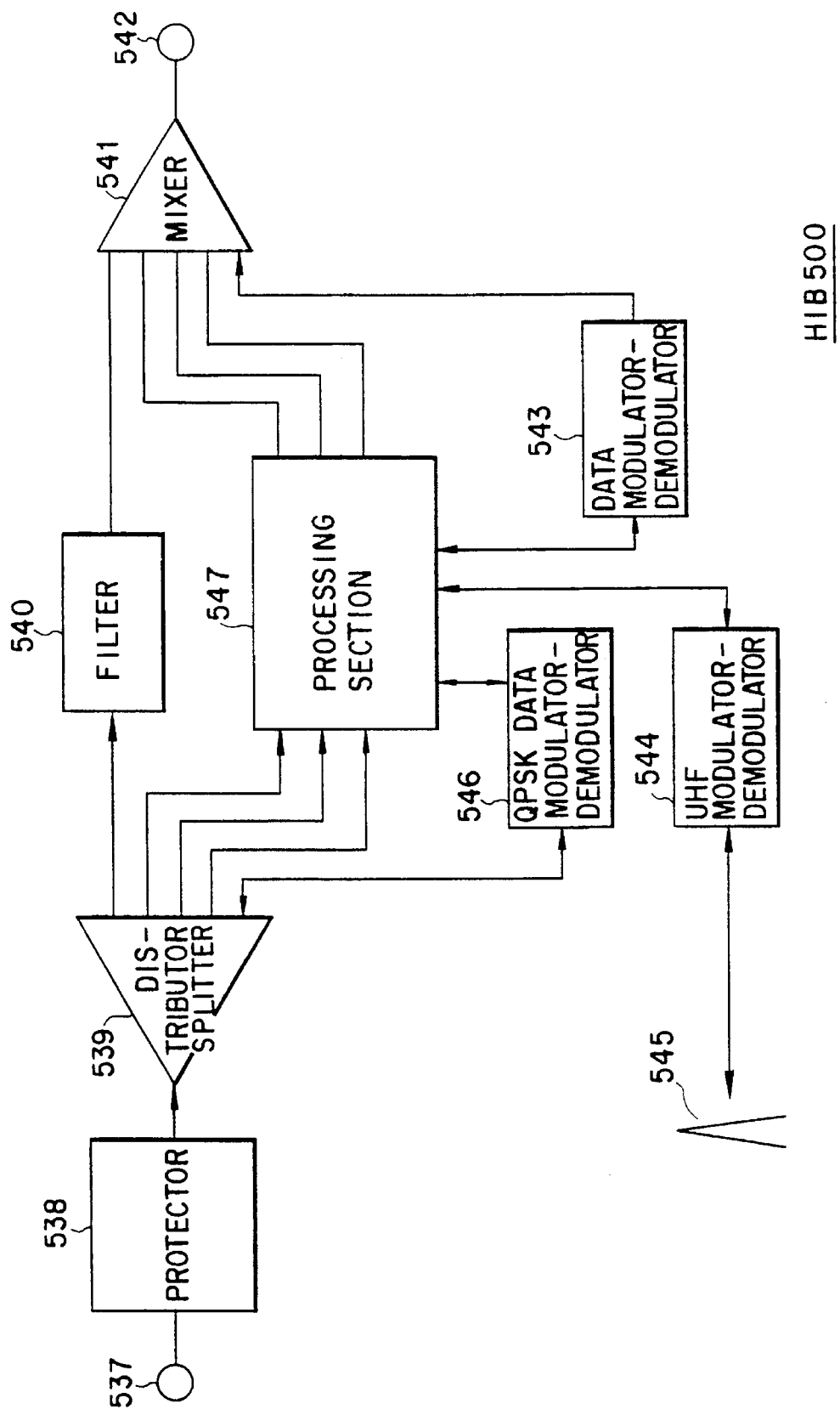
F I G. 2

|  | SLOT NUMBER USED |
|---|---|
| TV CHANNEL 0<br>  VIDEO SIGNAL<br>  AUDIO SIGNAL | 0~62<br>63~72 |
| TV CHANNEL 1<br>  VIDEO SIGNAL<br>  AUDIO SIGNAL | 73~135<br>136~145 |
| TV CHANNEL 2<br>  VIDEO SIGNAL<br>  AUDIO SIGNAL | 146~208<br>209~218 |
| TV CHANNEL 3<br>  VIDEO SIGNAL<br>  AUDIO SIGNAL | 219~281<br>282~291 |
| TV CHANNEL 4<br>  VIDEO SIGNAL<br>  AUDIO SIGNAL | 292~354<br>355~364 |
| TV CHANNEL 5<br>  VIDEO SIGNAL<br>  AUDIO SIGNAL | 365~427<br>428~437 |
| TV CHANNEL 6<br>  VIDEO SIGNAL<br>  AUDIO SIGNAL | 438~500<br>501~510 |
| TV CHANNEL 7<br>  VIDEO SIGNAL<br>  AUDIO SIGNAL | 511~573<br>574~583 |
| TV CHANNEL 8<br>  VIDEO SIGNAL<br>  AUDIO SIGNAL | 584~646<br>647~656 |
| TELETEXT | 657, 685 |
| TELEPHONE SPEECH | 659~668 |
| RESERVE | 669~671 |

DIGITAL BROADCAST LAYOUT

F I G. 8

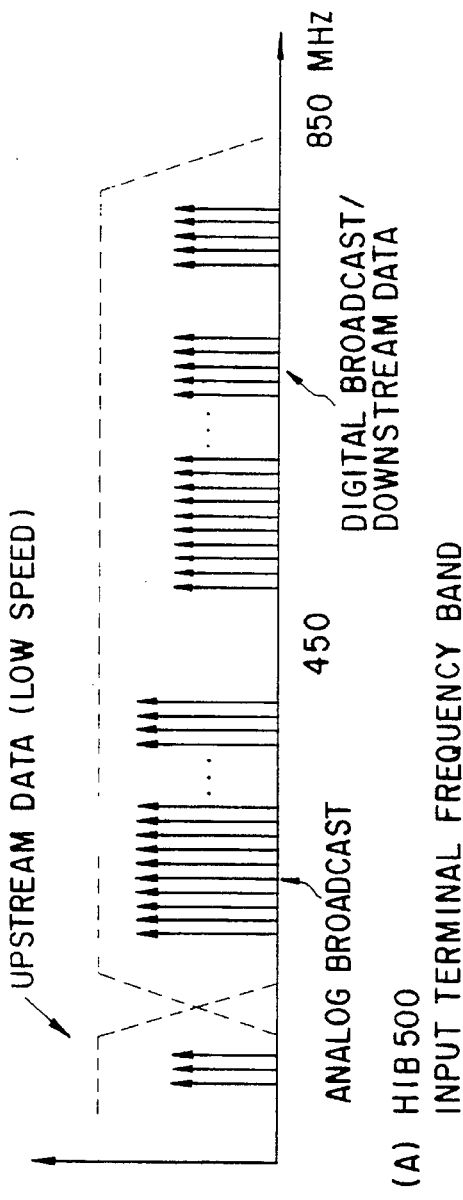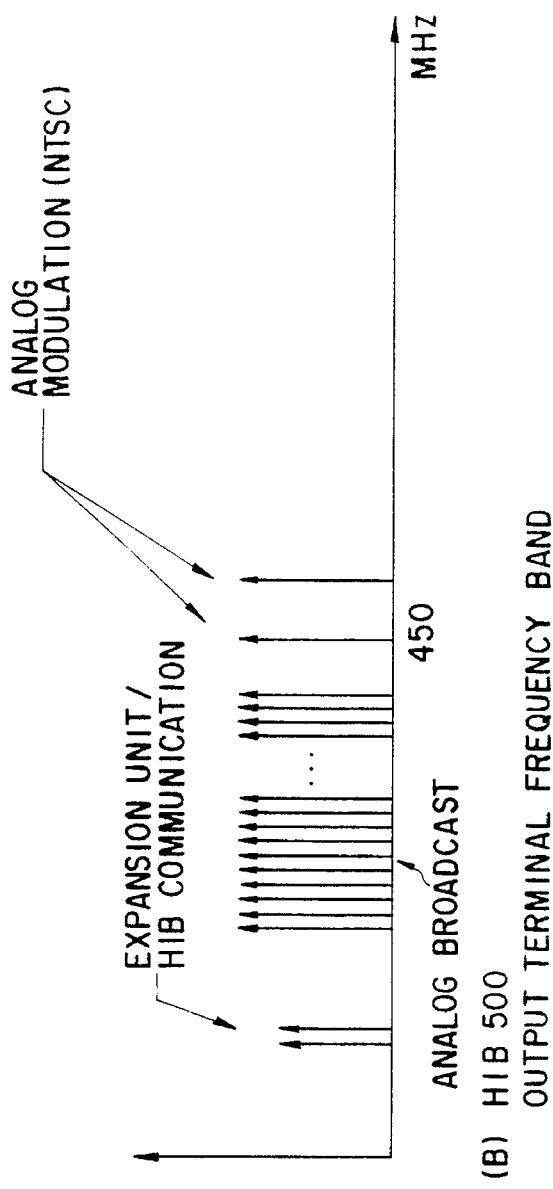

EXTERNAL BUS TERMINAL LAYOUT

| TERMINAL NO. | FUNCTION | TERMINAL NO. | FUNCTION |
|---|---|---|---|
| 0 | GND | 9 | 5V |
| 1 | GND | 10 | B/C |
| 2 | DATA 0 | 11 | DATA 4 |
| 3 | DATA 1 | 12 | DATA 5 |
| 4 | DATA 2 | 13 | DATA 6 |
| 5 | DATA 3 | 14 | DATA 7 |
| 6 | MASTER CK | 15 | SLOT SC |
| 7 | PHYSICAL ADDRESS 0 | 16 | PHYSICAL ADDRESS 2 |
| 8 | PHYSICAL ADDRESS 1 | 18 | PHYSICAL ADDRESS 3 |

FIG. 12A BUS SLOT
FIG. 12B MASTER CLOCK
FIG. 12C SLOT SYNC.

FIG. 12D

| FUNCTION | SLOT NO. |
|---|---|
| CONTROL SLOT | S0~S00F |
| DATA SLOT | S10~S3FF |

SLOT ALLOCATION

FIG. 12E

| SLOT NO. | TRANSMISSION | RECEPTION |
|---|---|---|
| S0 | EXTERNAL BUS CONTROL | ALL UNITS |
| S1 | EXTERNAL BUS CONTROL | DISPLAY MAN. CONTROL |
| S2 | EXTERNAL BUS CONTROL | DATA MAN. CONTROL |
| S3 | SPECIFIED UNIT | EXTERNAL BUS CONTROL |
| S4 | | EXTERNAL BUS CONTROL |
| S5 | DISPLAY MAN. CONTROL | |
| S6 | DATA MAN. CONTROL | |
| S7 | DISPLAY MAN. CONTROL | SPECIFIED UNIT |
| S8 | | |
| S9 | SPECIFIED UNIT | DISPLAY MAN. CONTROL |
| SA | | |
| SB | DATA MAN. CONTROL | SPECIFIED UNIT |
| SC | | |
| SD | SPECIFIED UNIT | DATA MAN. CONTROL |
| SE | | |
| SF | | |

CONTROL SLOT ALLOCATION

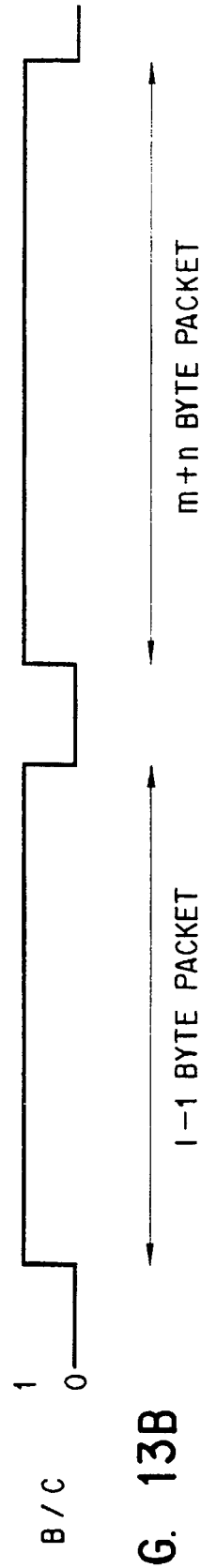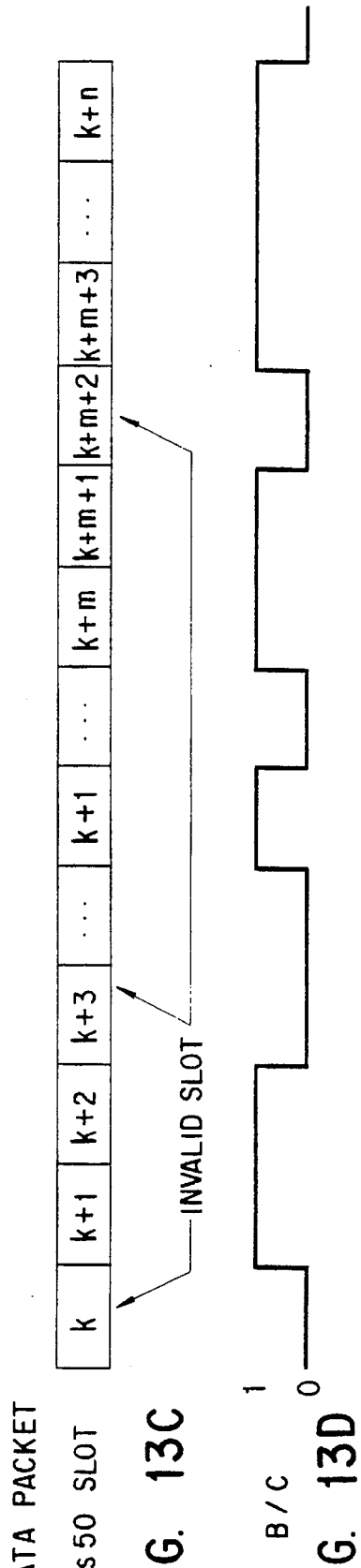
FIG. 13A — CONTROL PACKET s0 SLOT — EFFECTIVE SLOT IDENTIFICATION EXTRACTION OF CONTROL SLOT & DATA SLOT
FIG. 13B
FIG. 13C — DATA PACKET s50 SLOT
FIG. 13D

STRUCTURE OF CONTROL PACKET

| | | |
|---|---|---|
| 1 ST BYTE | PACKET START CODE |
| 2 ND BYTE | BYTE COUNTER |
| 3 RD BYTE | DESTINATION ADDRESS 0 |
| 4 TH BYTE | DESTINATION ADDRESS 1 |
| 5 TH BYTE | COMMAND CODE |
| 6 TH BYTE | COMMAND CONTROL DATA |
| k TH BYTE | COMMAND CODE |
| (k+1)TH BYTE | COMMAND CONTROL DATA |
| n TH BYTE | CRC DATA 0 |
| (n+1)TH BYTE | PACKET END CODE |

TIME SEQUENCE ↓

F I G. 14

FREQUENCY POLLING

UNIT TABLE BY REMOTE CONTROL ID

| REMOTE CONTROL ID | TV | VTR | OTHERS |
|---|---|---|---|
| XYZ | 00 | 11 | — |
| XYX | 01 | 10 | xy |
| XXX | 03 | 1F | — |

FIG. 20A

UNIT TABLE

| UNIT ID | MODEL |
|---|---|
| 00 | TV001, TV002 |
| 01 | TV003, TV009 |
| . | . |
| . | . |
| . | . |
| 10 | VTR001, VTR002 |
| 11 | VTR003, VTR004 |
| . | . |
| . | . |

FIG. 20B

UNIT ID / CODE TABLE

| UNIT ID | 0 | 1 | 2 | 3 | ... | PW | VOLUP | VOLDN |
|---|---|---|---|---|---|---|---|---|
| 00 | 30 | 31 | 32 | 33 | | 4A | 54 | 55 |
| 01 | 30 | 31 | 32 | 33 | | 76 | 67 | 68 |
| . | | | | | | . | | |
| . | | | | | | . | | |
| . | | | | | | . | | |

FIG. 20C      MAIN MEMORY (FIG. 3)

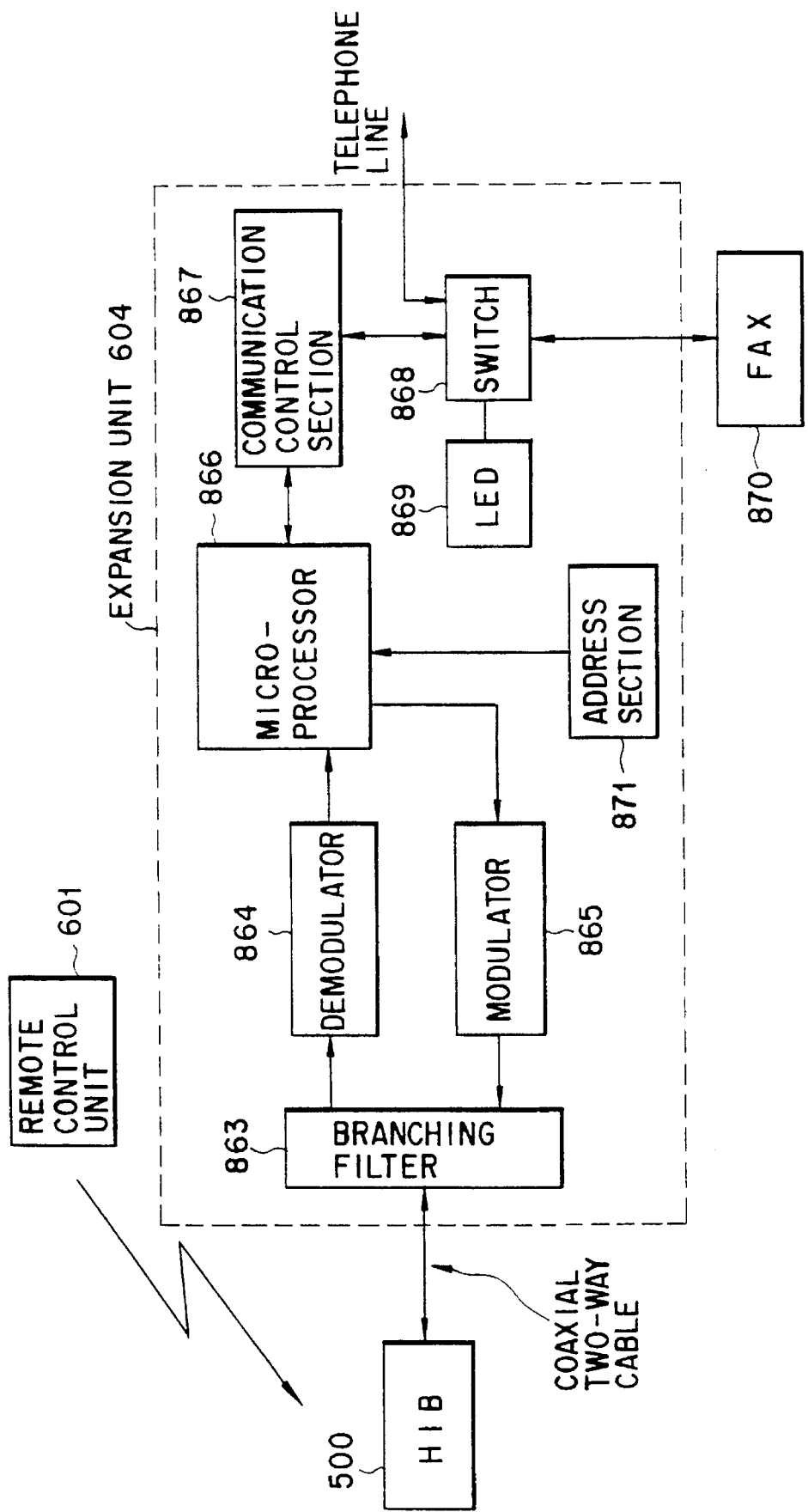
F I G. 21

PARENTAL UNIT 630

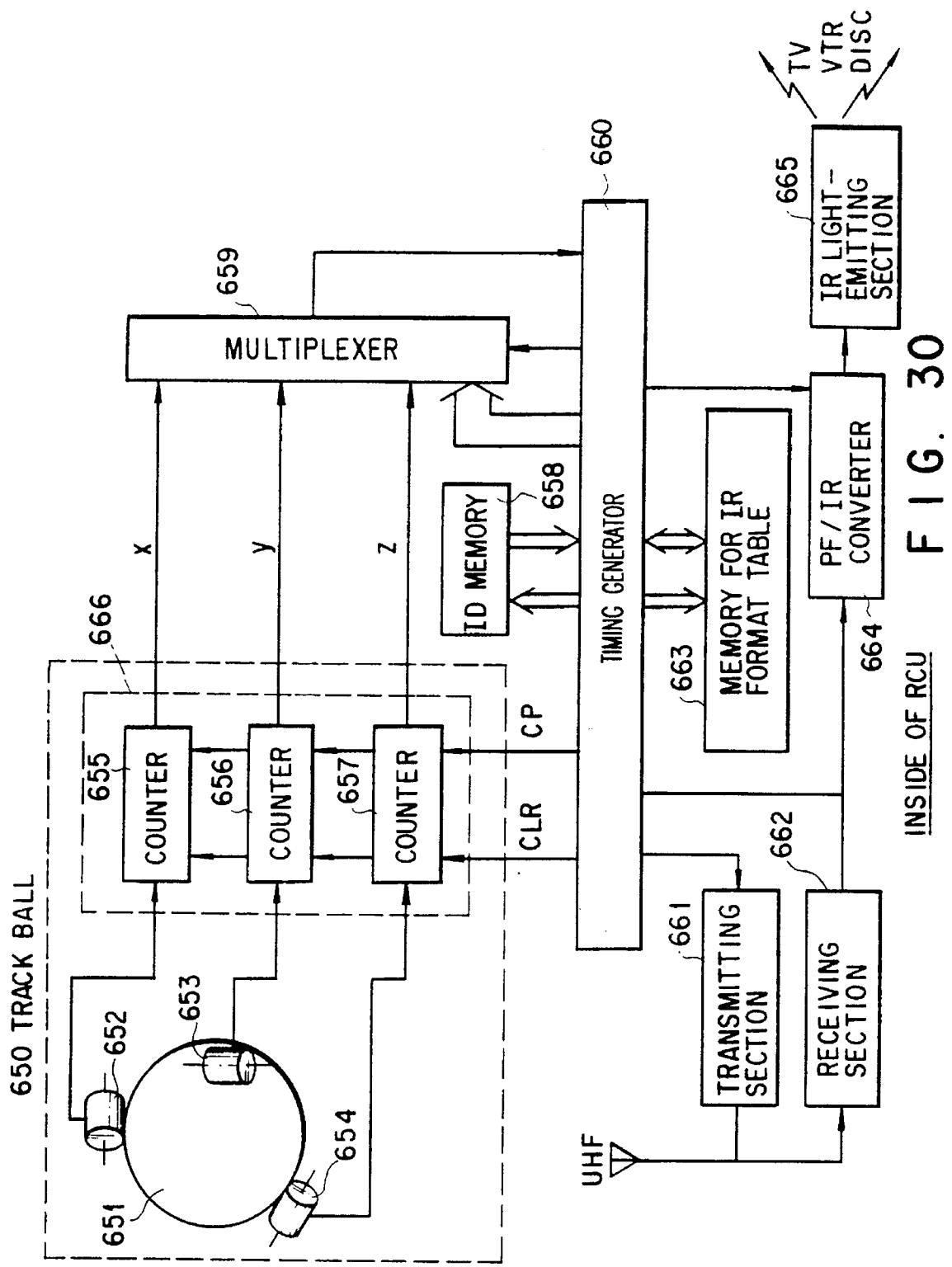
F I G. 30

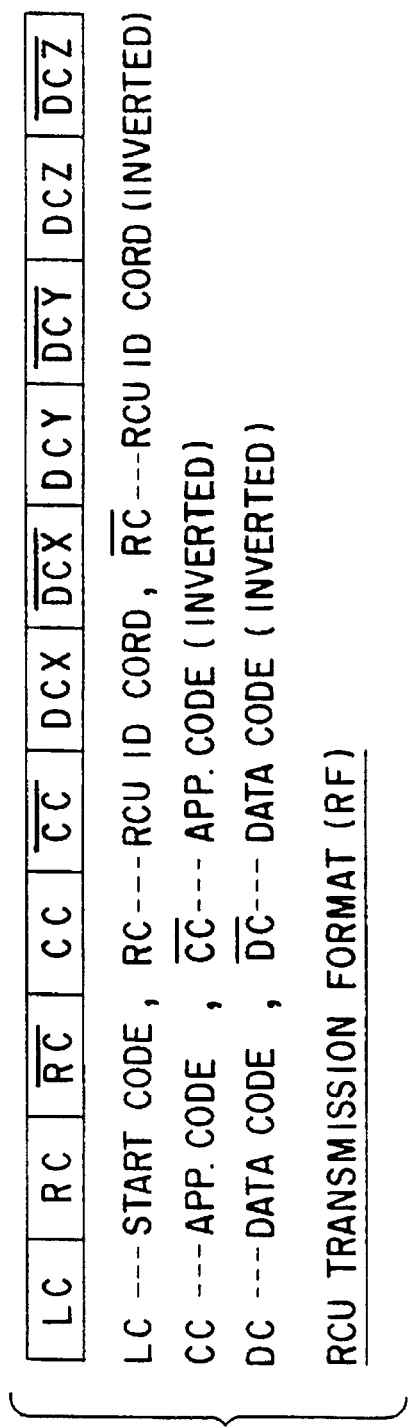

FIG. 36A

| LC | RC | $\overline{RC}$ | CC | $\overline{CC}$ | DCX | $\overline{DCX}$ | DCY | $\overline{DCY}$ | DCZ | $\overline{DCZ}$ |

LC --- START CODE, RC --- RCU ID CORD, $\overline{RC}$ --- RCU ID CORD (INVERTED)
CC --- APP. CODE, $\overline{CC}$ --- APP. CODE (INVERTED)
DC --- DATA CODE, $\overline{DC}$ --- DATA CODE (INVERTED)

RCU TRANSMISSION FORMAT (RF)

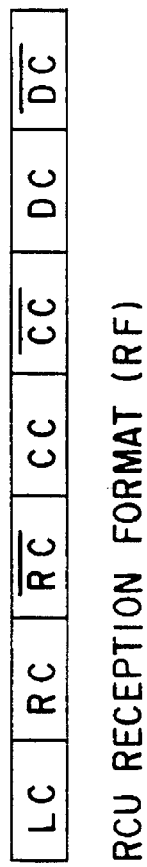

FIG. 36B

| LC | RC | $\overline{RC}$ | CC | $\overline{CC}$ | DC | $\overline{DC}$ |

RCU RECEPTION FORMAT (RF)

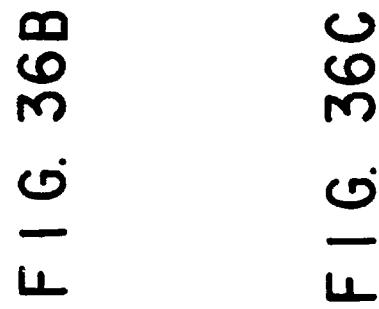

FIG. 36C

| LC | CC | $\overline{CC}$ | DC | $\overline{DC}$ |

RCU INFRARED TRANSMISSION (IR)

RCU TRANSMISSION FORMAT (RF)

RCU RECEPTION FORMAT (RF)

RCU INFRARED TRANSMISSION (IR)

RCU TRANSMISSION FORMAT (RF)

RCU RECEPTION FORMAT (RF)

RCU INFRARED FORMAT (IR)

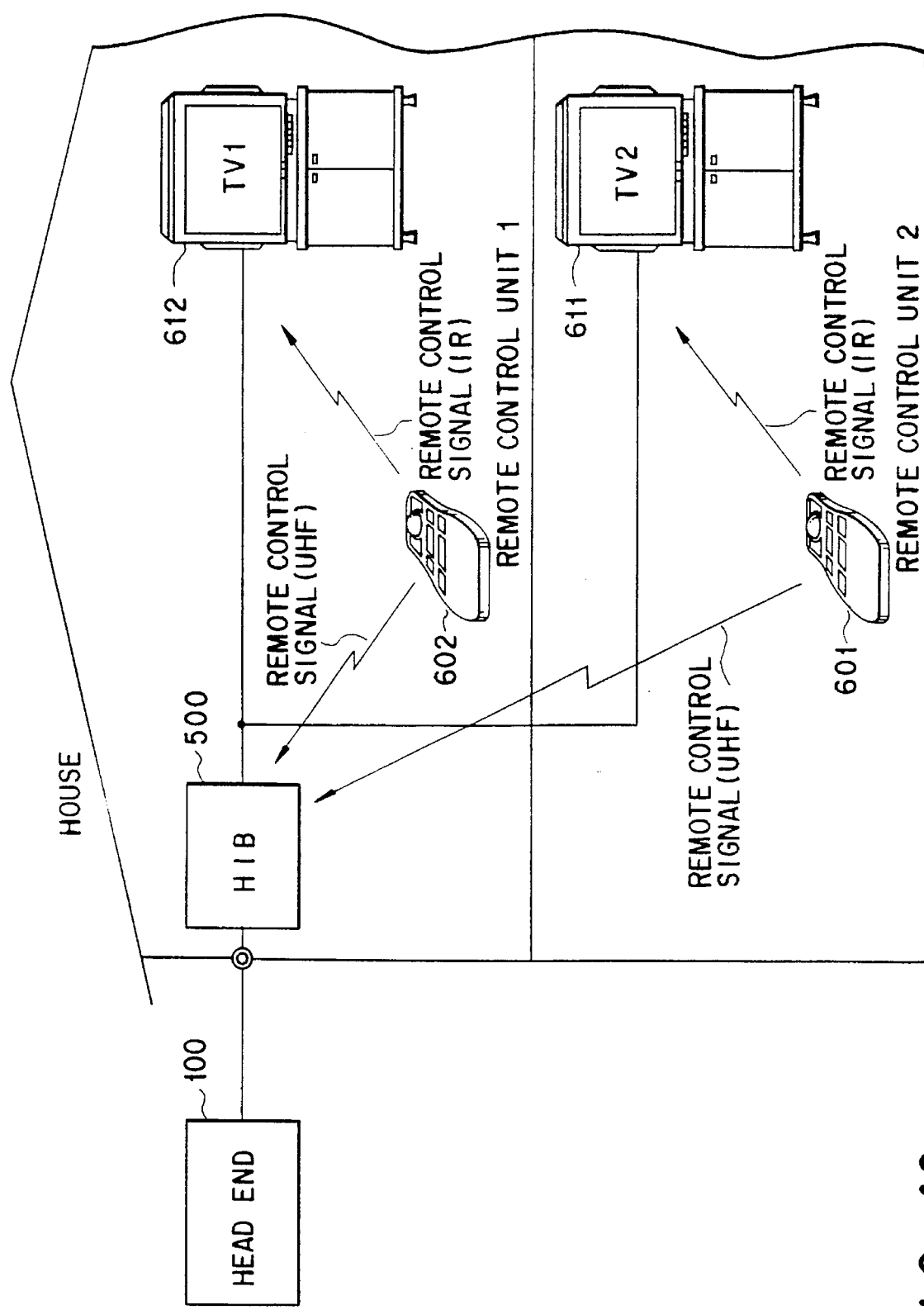
F I G. 40

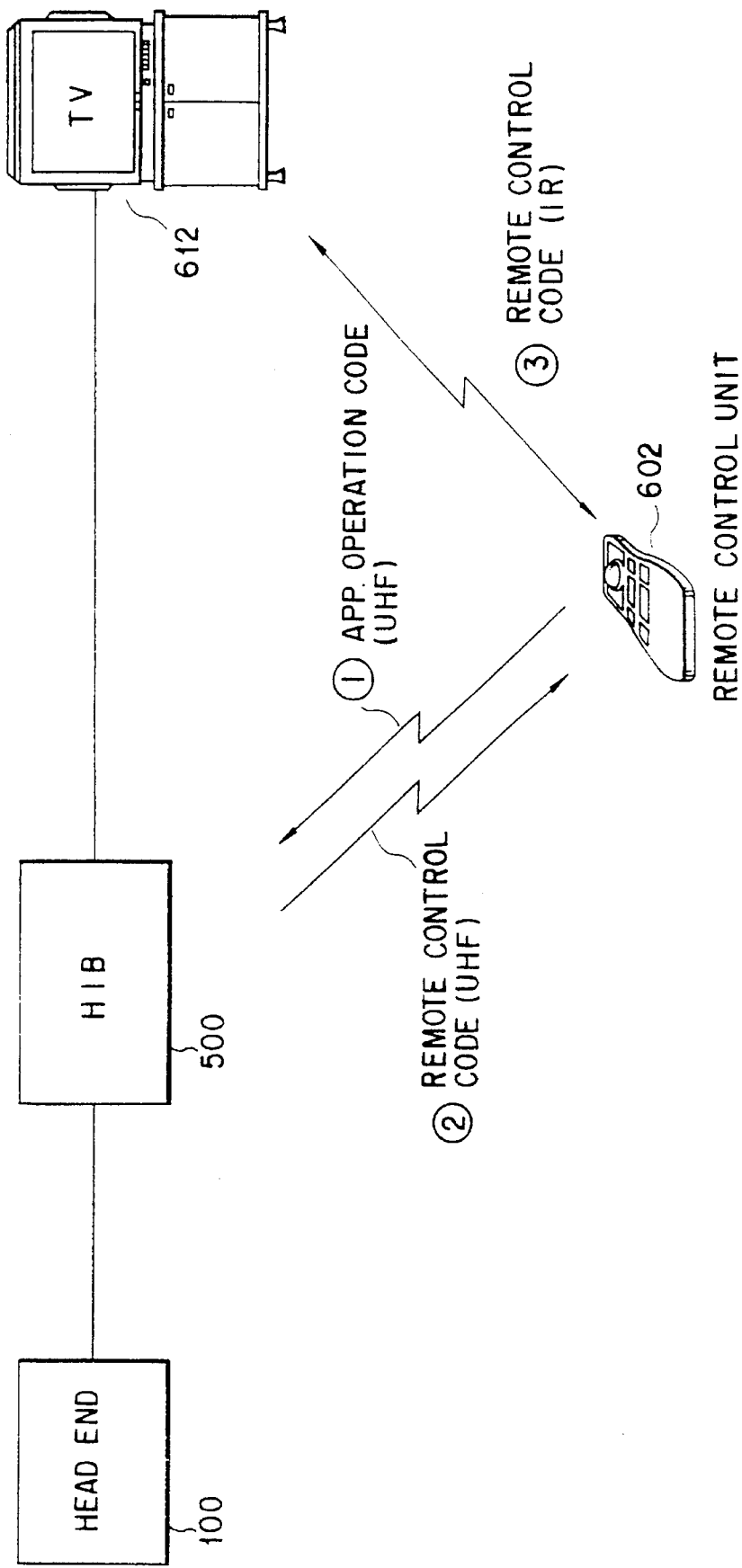
F I G. 43

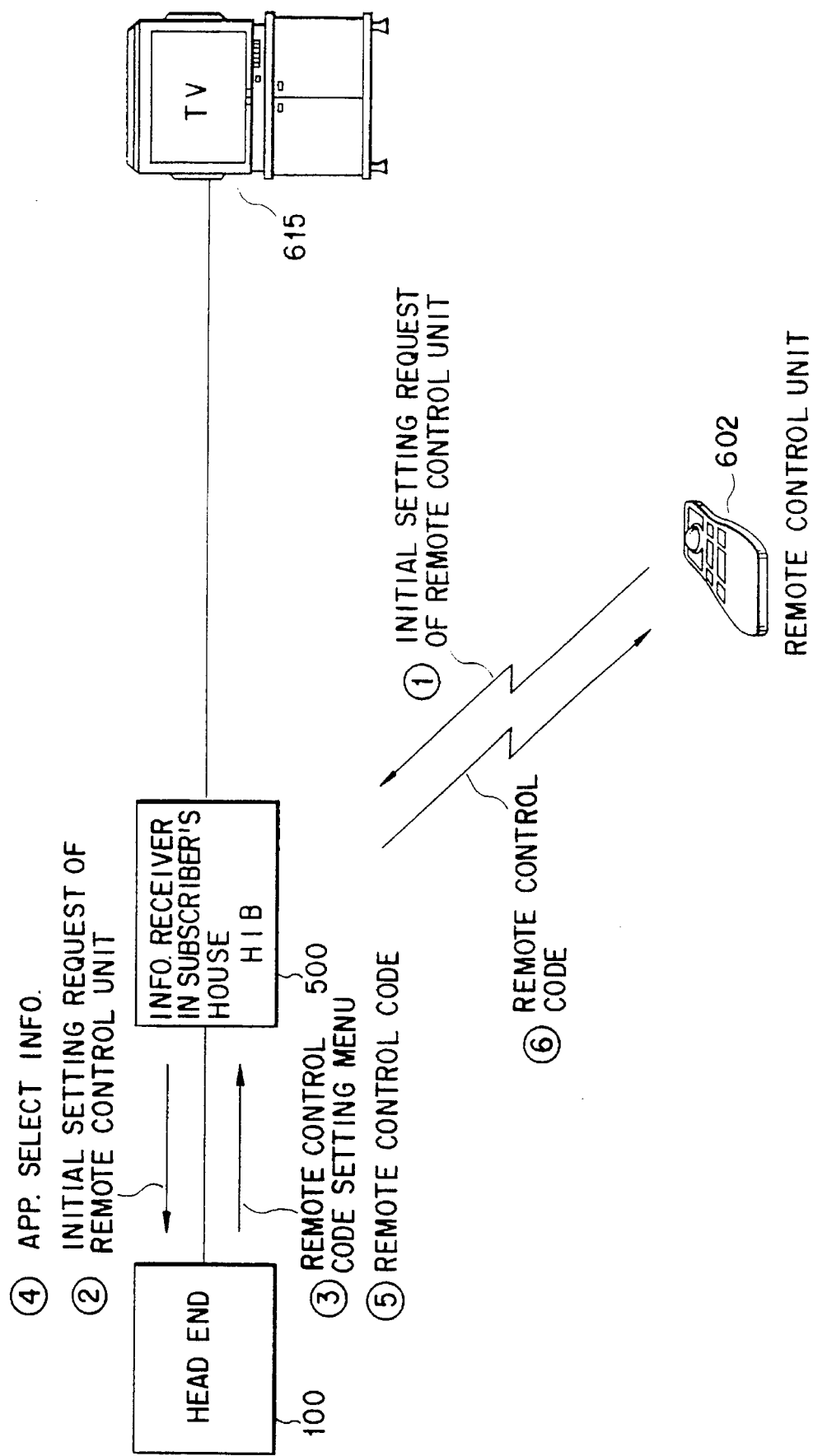
F I G. 44

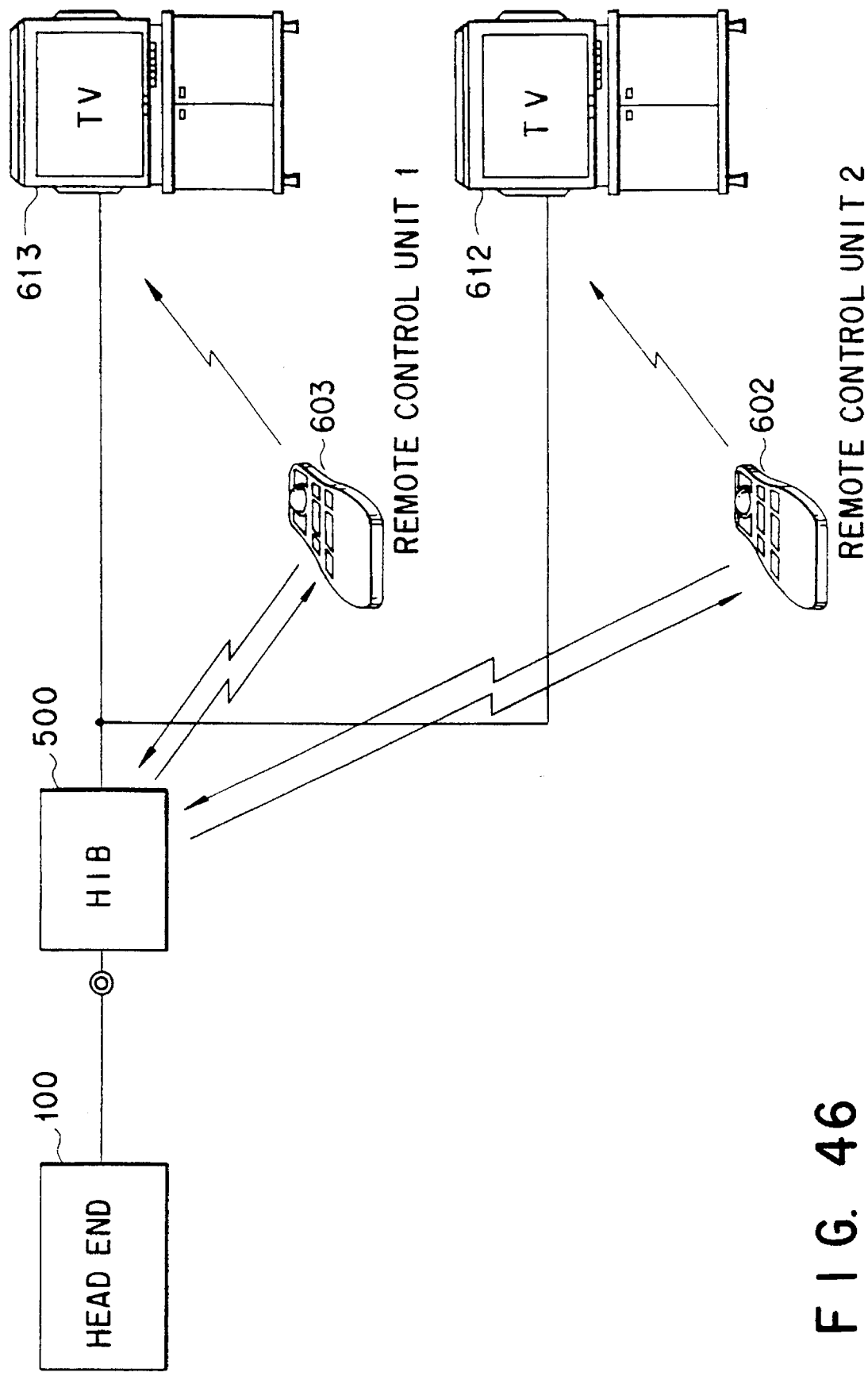
F I G. 46

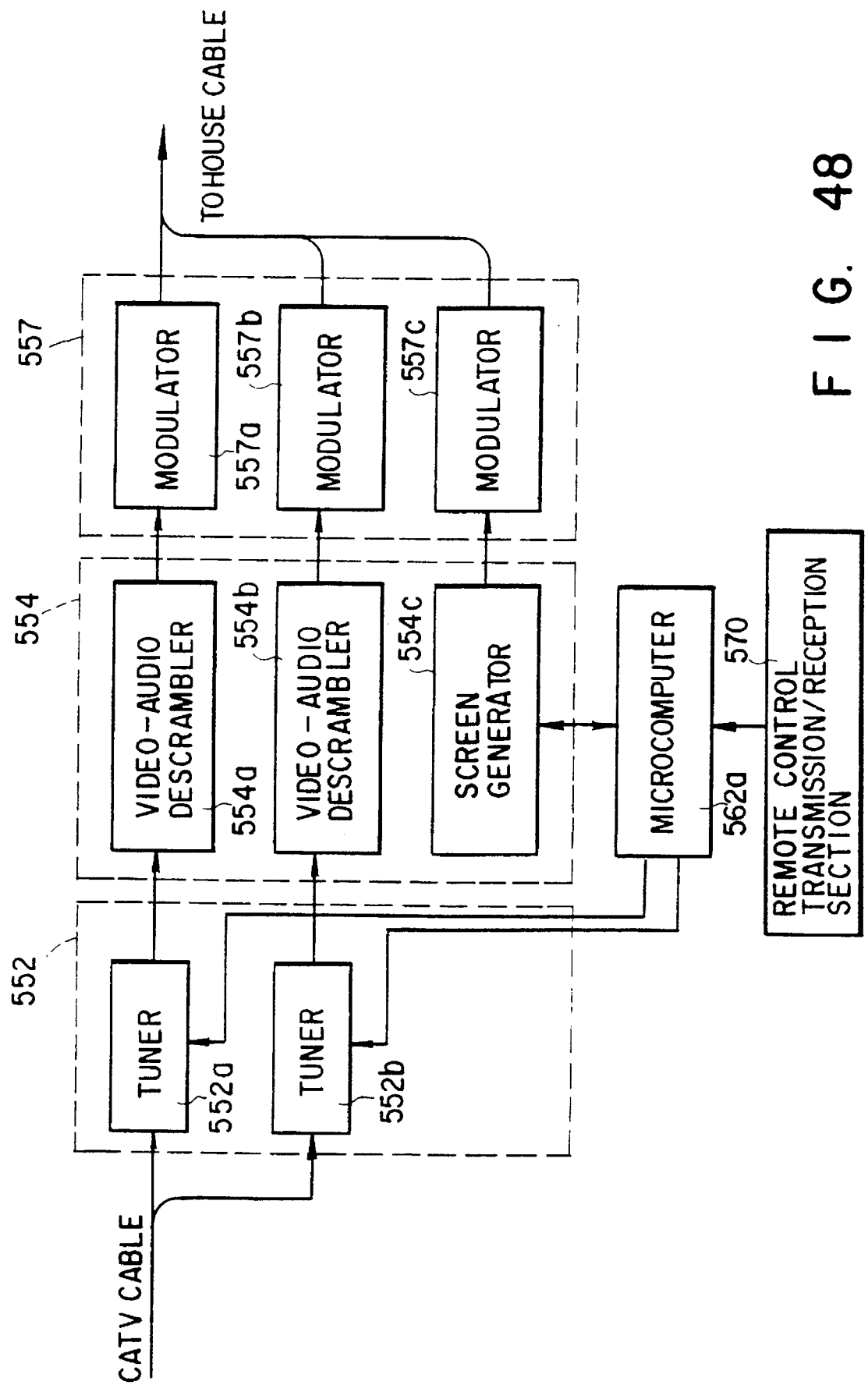
F I G. 48

FIG. 49A

MENU

SELECT THE DESIRED MENU BY NUMBER

1. CALLING
2. WAKE-UP CALL
3. CONTROL OF AIR CONDITIONER

TO CANCEL YOUR SETTING. TYPE 555

FIG. 49B

CALLING MENU 1

SELECT THE DESIRED ROOM BY NUMBER

1. CHILDREN'S ROOM
2. LIVING ROOM
3. BEDROOM

TYPING 000 WILL BRING YOU TO MENU

FIG. 49C

CALLING MENU 2

SELECT THE DESIRED WORDS BY NUMBER

1. THERE'S A TELEPHONE CALL
2. PLEASE COME TO THE LIVING ROOM
3. MORNING, WAKE UP !

TYPING 000 WILL BRING YOU TO MENU

FIG. 49D

THERE'S A TELEPHONE CALL

TYPE 777 FOR ACKNOWLEDGMENT

WAKE-UP CALL MENU 2

ENTER TIME (24-HOUR SYSTEM)

EXAMPLE: 0700 MEANS 7:00 AM

TYPING 000 WILL BRING YOU TO MENU

FIG. 50B

WAKE-UP CALL MENU 1

SELECT THE DESIRED ROOM BY NUMBER

1. CHILDREN'S ROOM
2. LIVING ROOM
3. BED

TYPING 000 WILL BRING YOU TO MENU

FIG. 50A

IT'S SEVEN O'CLOCK

TYPE 777 FOR ACKNOWLEDGEMENT

FIG. 50C

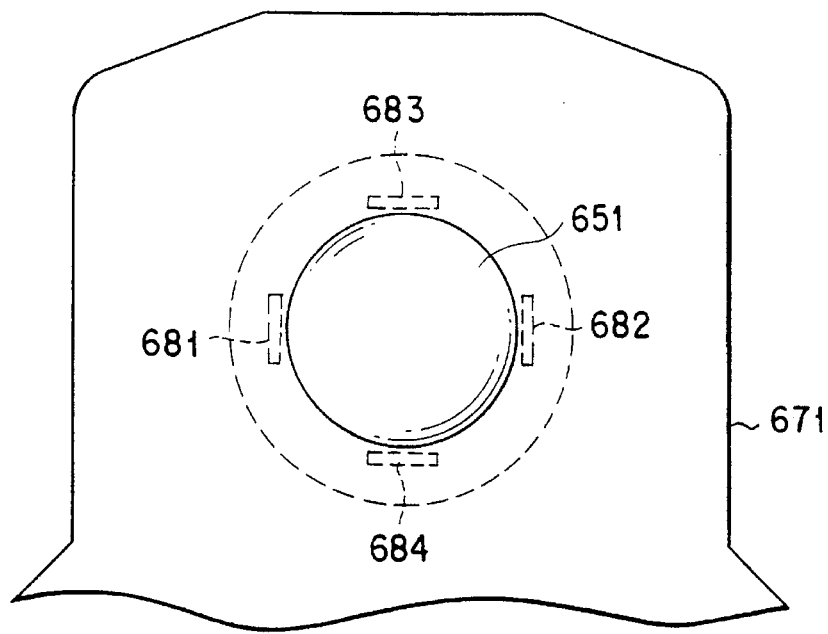
F I G. 52A
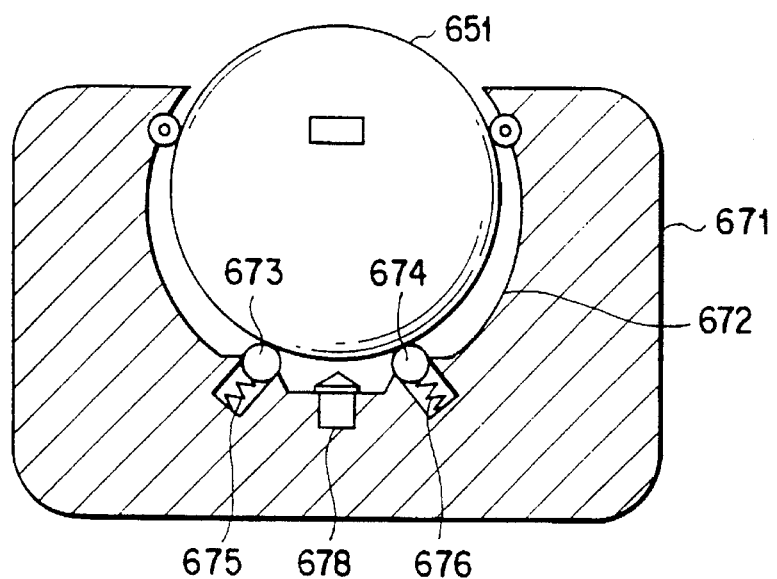
F I G. 52B

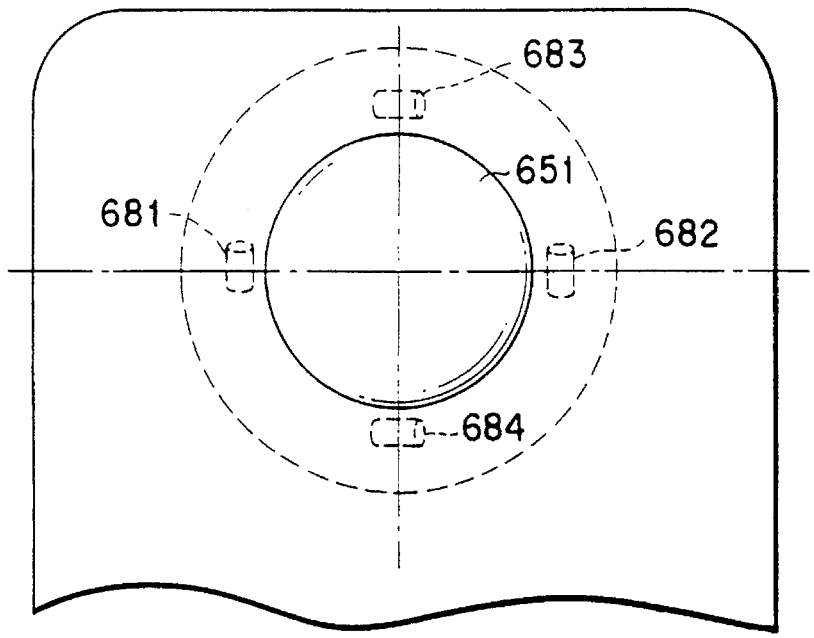
F I G. 53A
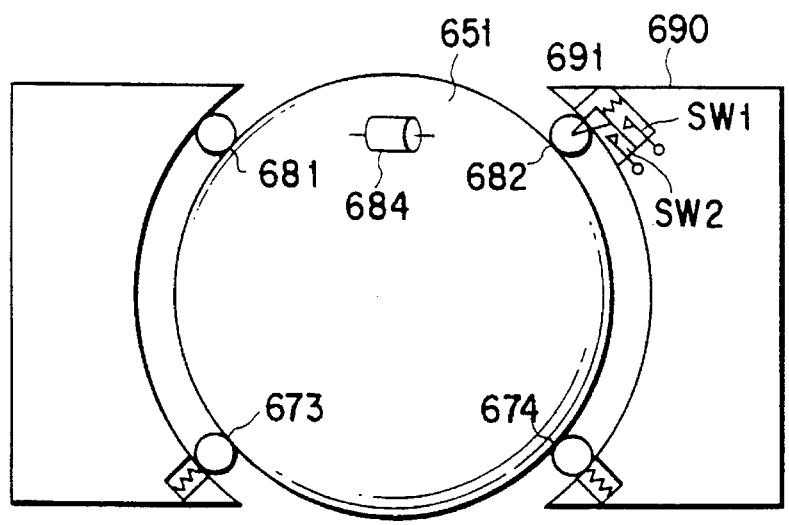
F I G. 53B

TWO-WAY CATV SYSTEM AND REMOTE CONTROL SYSTEM

BACKGROUND OF THE INVENTION

1. Field of the Invention

This invention relates to a two-way CATV system where a lot of terminal units are connected to what is called a center via cables and the center transmits image signals to the terminal units. It also relates to a remote control system.

2. Description of the Related Art

Recently, the environment of television broadcasting has been encountering a great turning point, especially in the United States. As examples, TV signals for nearly 150 channels in satellite broadcasting and a two-way interactive television signals using cellular phones are now being supplied. Another example is that telephone companies are now making a lot of proposals for and experiments with video service using telephone lines.

In this situation, the CATV systems, which have been a major role in transmitting television broadcast in the U.S., have also been undergoing a revolution. The revolution includes 150-channel near-video on-demand service provided in part of the New York district and the TCI's design for 500-channel transmission. The CATV system, which originally has a very inexpensive transmission system as compared with other media, has the potential of easily implementing the services that are now being realized by other media.

Furthermore, the CATV system itself is rapidly changing its structure and nature. We can point out technical factors for the changes are hybrid transmission as a result of introduction of optical fiber, image compression and transmission techniques. The introduction of optical fiber has not only replaced coaxial cables with optical fibers, but also changed the architecture of the CATV system itself. This is the hybrid structure using optical fibers/coaxial cables obtained in the course of expanding the using frequency band has become comparable in cost with the structure using coaxial cables only. In addition, it should be noted that the hybrid structure explained later is easier to maintain.

A conventional CATV system using coaxial cables has a distribution structure known as a tree and branch, whereas in the hybrid structure using optical fiber/coaxial cables, the portion using optical fibers has a full star structure, and the path from a photoelectric conversion point to a subscriber has a conventional tree and branch structure. Because the number of subscribers supported by the coaxial cables is limited and the optical fiber system has a star structure, the information supplied from the center may differ from node to node. This makes it possible to provide very different service from that in the prior art or to offer the currently available service in a different way.

With the recent advance in image compression technology, an image signal can be compressed to the volume as small as 1/10 to 1/30 that in the prior art. By combining this technology with transmission technology, three to six channels can be transmitted in a 6-MHz band, which was necessary for each channel in the analog system when this transmission line is used as a data channel, it is possible to offer as enormous as several Mbps of separate data channels to each subscriber by linking these techniques with the above-mentioned structures.

Although the subscriber terminals acting as a mere decoder for pay broadcasts should have undergone a revolution, any revolutionized terminal unit has not been proposed yet up to now. In addition, any satisfactory service or service form making use of such an infrastructure has not been proposed either.

Furthermore, concerning the terminal units, a solution to the problem with the conventional equipment, that is, a solution to unfriendly use due to poor connection with other units, has not been given yet. The unfriendly use stems chiefly from the terminal units themselves. For example, to be concrete, some of the causes are a physical wiring problem with TVs and VCRs, the relationship between the remote control unit for one terminal unit and that for another unit, and an interface with multiple TVs.

In the CATV system, in general, TV signal data and data transmitting and receiving facilities known as a center or a head end is connected to subscribers' houses by means of two-way or one-way transmission lines. In each subscriber house, a subscriber terminal unit for pay broadcasts called a converter, a decoder, or a home terminal is installed. With such a system, to provide a subscriber terminal unit with an additional function, the operating company must modify the unit installed in the subscriber's house, which limits its popularization and the cost-effectiveness.

As described above, the system configurations proposed until now are insufficient to meet the diversifying needs of each subscriber arising from the expansion of the contents of CATV service expected in the future. From the viewpoint of the CATV operating company, the maintainability and the expandability are insufficient, either.

On the other hand, household appliances in an ordinary house, especially, a group of video and audio appliances, or what is called audio-visual (AV) equipment, is provided with a remote control function using infrared rays. The group of AV appliances include television sets (TVs), video tape recorders (VTRs), video movies (VMs), optical video disc players (LDs), broadcast satellite (BS) tuners, teletext decoders, compact disc players (CD), and other stereo playback equipment.

Under such circumstances, to select and execute the desired function of each apparatus, it is necessary to operate the remote control unit corresponding to each apparatus. For example, in the case of a single function of viewing a TV program, a single corresponding remote control unit has only to be operated. To achieve a function covering more than one apparatus, e.g., to see and listen to the VTR-reproduced images and sound on a TV, more than one remote control unit must be operated. That is, the operator has to learn the operating procedure for each remote control unit with different specification made by a different manufacturer. He also takes time to find the desired remote control unit. Furthermore, more homes have more than one apparatus of each type, e.g., multiple TVs and VTRs, with the result that the complexity increases as the number of apparatuses increases.

To alleviate the complexity, to operate more than one apparatus with a single remote control unit, there have been provided what is called a learning remote control unit which memorizes the remote control code for each maker's apparatus, and a preset remote control unit for which the remote control codes for more than one maker are set previously.

However, with the learning remote control units, it is necessary to set the codes for the functions of the on-hand apparatus one by one for the learning remote control unit. Thus, as the number of functions increases, the setting procedures tend to increase. That is, the learning remote control unit has the disadvantage that the initial setting is complex. In addition, when a new apparatus is installed, it is necessary to add an operation function in the initial setting.

With the preset remote control units, the complexity of the initial setting found in the learning remote control unit is alleviated remarkably, no product memorizes the codes for all of the apparatuses. Only the major functions are stored in the remote control unit. To operate all functions for all apparatuses, it is necessary to operate together with a dedicated remote control unit provided for each apparatus. Thus, the dedicated remote control unit must be placed at hand, although not frequently.

Setting the learning remote control units etc. in more than one room in a house raises installation costs, because those remote control units have to be paid for, not expensive though, whereas the dedicated remote control units coming with the apparatuses are free of charge. In the case of the learning remote control units, the trouble of the initial setting becomes more serious.

Now, it is assumed that a person having a lot of apparatuses as mentioned above is a subscriber to a CATV system. In a subscriber unit in the CATV system, a converter (a form of terminal) installed in the subscriber's house receives the TV program signal transmitted from the head end (HE), descrambles the program to produce the original image if it is scrambled, converts the image into a predetermined specific channel, and then sends the converted signal to the TV at the subscriber, which displays it. In general, the converter is also provided with a remote control unit, which is basically designed for the converter only and consequently cannot control such peripherals as a TV, a VTR, or an LD satisfactorily. Although having a learning and a preset function, the remote control unit for the converter has the disadvantages of giving us the trouble of initial setting and being unable to control the function of each apparatus sufficiently.

Trouble in connecting the converter with its peripherals will be considered from a different point of view. As a significant example, when telerecording is reserved with a VTR being connected to the converter output, although the VTR starts recording at the reserved time, nothing may be recorded on the VTR in spite of telerecording reservation because neither the power supply for the converter nor its channel is operated. This problem arises from interface mismatching between apparatuses. To overcome this problem, an improvement has been disclosed in U.S. Pat. No. 5,151,789. Specifically, the VTR is provided with means for emulating the converter control code. This means sends the modulated infrared rays to the converter in accordance with VTR operation as if to allow the remote control unit to control not only the VTR but also the converter. Such a series of operations can be performed without giving the user any trouble, making the apparatus more user-friendly. With this method, however, the VTR must be provided with means for emulating the converter remote control code. To implement the function, it is necessary to purchase a new VTR provided with at least an emulation function. This makes the existing apparatus useless, which is uneconomical. In addition, the method has disadvantages in that the initial settings for the aforesaid learning function etc. are necessary and all functions cannot be executed satisfactorily.

As described above, when there are a plurality of AV apparatuses in the house, a conventional remote control system has disadvantages in that the operator must operate more than one remote control unit and learn the operation procedures for each maker's remote control unit, and that he takes the trouble of finding the desired remote control unit, which makes the operation more complex.

To alleviate this complexity, there are provided a learning remote control and a preset remote control, which allows a single remote control to operate more than one apparatus. However, they have disadvantages in that the initial setting is complicated and all of the functions of each apparatus cannot be operated.

SUMMARY OF THE INVENTION

An object of the present invention is to provide a CATV system which can deal with the expansion of CATV service and the future diversification of subscribers' needs, facilitates the maintenance and the expansion of equipment from a viewpoint of the CATV operating company, and makes it easier for the subscriber to operate the system.

Another object of the present invention is to provide a simpler and more effective method concerning the functions implemented on conventional subscriber terminal units, such as parental control.

Still another object of the present invention is to provide a remote control system containing an easier-to-use remote control unit with high expandability and flexibility.

Still another object of the present invention is to provide an easier-to-use remote control system which allows the user to operate each apparatus according to a similar procedure.

To achieve the foregoing objects, in the invention, a subscriber terminal unit is installed at or near the protector in the subscriber's house. The subscriber terminal unit is divided into a basic block common to all subscribers, and a function block based on the contents of provided service. The basic block is made up of a microcomputer, its peripheral circuit, and a common bus for communicating with the function blocks. It is possible to connect a plurality of different function blocks to the common bus. The function blocks include data receivers, digital TV-signal decoders, and remodulators, each of which has a detachable structure. The subscriber is provided with a dedicated remote control unit, which enables two-way communication with the subscriber terminal unit. The remote control unit also contains an infrared signal generator and can send the remote control code to such an apparatus as a TV or a VTR.

In addition to a remote control unit, an expansion unit can be connected to the subscriber terminal unit. The expansion unit has the function of performing two-way communication with the subscriber terminal unit via a coaxial cable and some control functions related to telephone modems, and can supply the data from the subscriber terminal unit to such an apparatus as a facsimile.

Furthermore, it is possible to connect a parental control unit to the subscriber terminal unit via a coaxial cable in the same manner as the expansion unit. The coaxial cable output terminal of the parental control unit is connected to a TV set or a VTR. When a specific program is watched, the subscriber terminal unit can send the television signal together with a jamming signal. The parental control unit contains a trap for providing on/off control of a TV or a VTR as well as two-way communication means. The output terminal of the subscriber terminal unit is connected directly to the coaxial wiring system in the subscriber's house. The signal that is supplied from a CATV network and has not undergone a normal scrambling process is also directly mixed at the output terminal of the subscriber terminal unit. The resulting signal is supplied to the coaxial wiring system in the subscriber's house.

With the above-described configuration, the subscriber terminal unit can deal with functions of various levels ranging from the minimum function of only receiving a pay broadcast to the function of accessing a database system offered by a CATV operating company, by adding or modifying function blocks. At the same time, an increase in the number of programs to watch and listen to and that in the number of VTRs and TVs used can be dealt with by adding function blocks. Since such apparatuses as TVs and VTRs are directly controlled by means of a remote control unit, it is not necessary to use the remote control units for multiple apparatuses in controlling them. Because addition of a parental control unit enables a jamming signal to be added at the output terminal of the subscriber terminal unit for programs unsuitable for young people, the programs cannot be watched in another TV set in another room without the parental control unit. Furthermore, use of an expansion unit enables the TV signal to be transferred as a still picture to a facsimile machine, which produces a hard copy. Because the expansion unit itself can effect two-way communication, use of a facsimile machine as an input unit enables the memorandum and information from the subscriber to be transferred to the CATV center, which acts as a bulletin board or a circular notice in this case.

The present invention contains a remote control unit and a remote control information managing unit separately. The remote control unit senses the data indicating the directions or movements in at least three directions of x, y, and z crossing at right angles with each other. After electromagnetic waves or infrared rays are modulated on the basis of the sensed indication data, the modulated signal is emitted toward the remote control information managing unit. The remote control information managing unit is placed between the remote control unit and a plurality of remote apparatuses. The remote control information managing unit generates the remote control codes for controlling the functions of the remote apparatuses.

Additionally, the invention provides interactive operation in setting the apparatuses or the functions. With the invention, the learning function block acting as a remote information managing unit is placed outside the remote control unit. By performing two-way communication with the learning function block, the remote control codes are set for the individual control units, and on the basis of the set codes, the remote apparatuses can be controlled.

With the above means, even if there are a plurality of remote apparatuses and a plurality of remote control units, not only the operation of each remote control unit can be effected easily, but also the expandability and the flexibility can be increased. In addition, one-dimensional operation procedure can be obtained concerning the operation of setting the apparatuses or the functions, and the interactive operation enables the user to operate the apparatuses or the functions in a clear-cut manner. Furthermore, the two-way communication function allows the learning function block to manage the status of each remote control unit one-dimensionally, thereby not only preventing interference between the remote control units, but also simplifying the operation of the apparatuses or the functions.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 shows an internal structure of the HIB of FIG. 1;

FIG. 8 is an explanatory diagram of channel allocation in digital broadcasting;

FIGS. 9A and 9B are an explanatory diagram of the frequency bands on the input and output sides of the HIB of FIG. 1;

FIGS. 12A to 12E are an explanatory diagram of an example of using the external bus of FIG. 3;

FIGS. 13A to 13D show the timing of taking in data on the external bus of FIG. 3;

FIG. 14 shows an example of the structure of a control packet in the system of FIG. 1;

FIGS. 20A to 20C show an example of the data tables provided in the HIB (FIG. 1) and the UHF modulator-demodulator (FIGS. 2 and 5) in connection with the control operation at the remote control unit in FIG. 1;

FIG. 21 is a block diagram of the expansion unit of FIG. 1;

FIG. 30 is a block diagram of the RCU of FIG. 1;

FIGS. 36A to 36C show a data transmission format between the apparatuses in FIG. 29;

FIG. 40 is an explanatory diagram of the initial setting operation of a remote control function in the present invention;

FIG. 43 shows an example of using the remote control function set in the second example in FIG. 42;

FIG. 44 shows a third example of the initial setting operation;

FIG. 46 shows another example of using the system of the invention;

FIG. 48 is another detailed block diagram of part of the HIB in FIG. 35;

FIGS. 49A to 49D show examples of displaying the menu screen when the HIB of FIG. 48 is used;

FIGS. 50A to 50C show examples of displaying the menu screen when the HIB of FIG. 48 is used;

FIGS. 52A and 52B show the construction of the track ball shown in FIG. 29; and FIGS. 53A and 53B show another construction of the track ball shown in FIG. 29.

DETAILED DESCRIPTION OF THE PREFERRED EMBODIMENTS

Hereinafter, embodiments of the present invention will be explained, referring to the accompanying drawings.
(FIRST EMBODIMENT)

Figure 1:
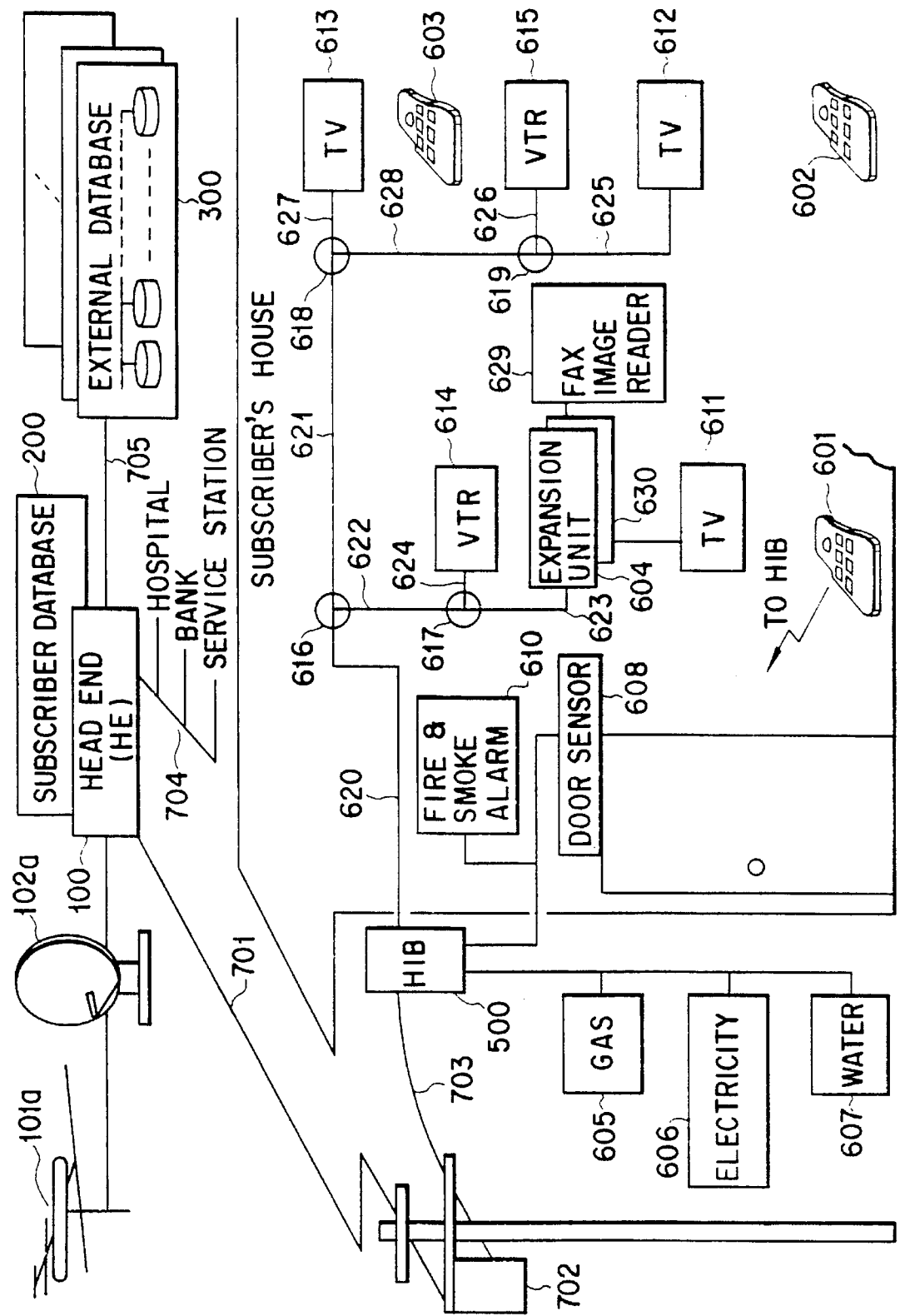
FIG. 1 shows the overall configuration of a two-way CATV service system according to an embodiment of the present invention.
Figure 26:
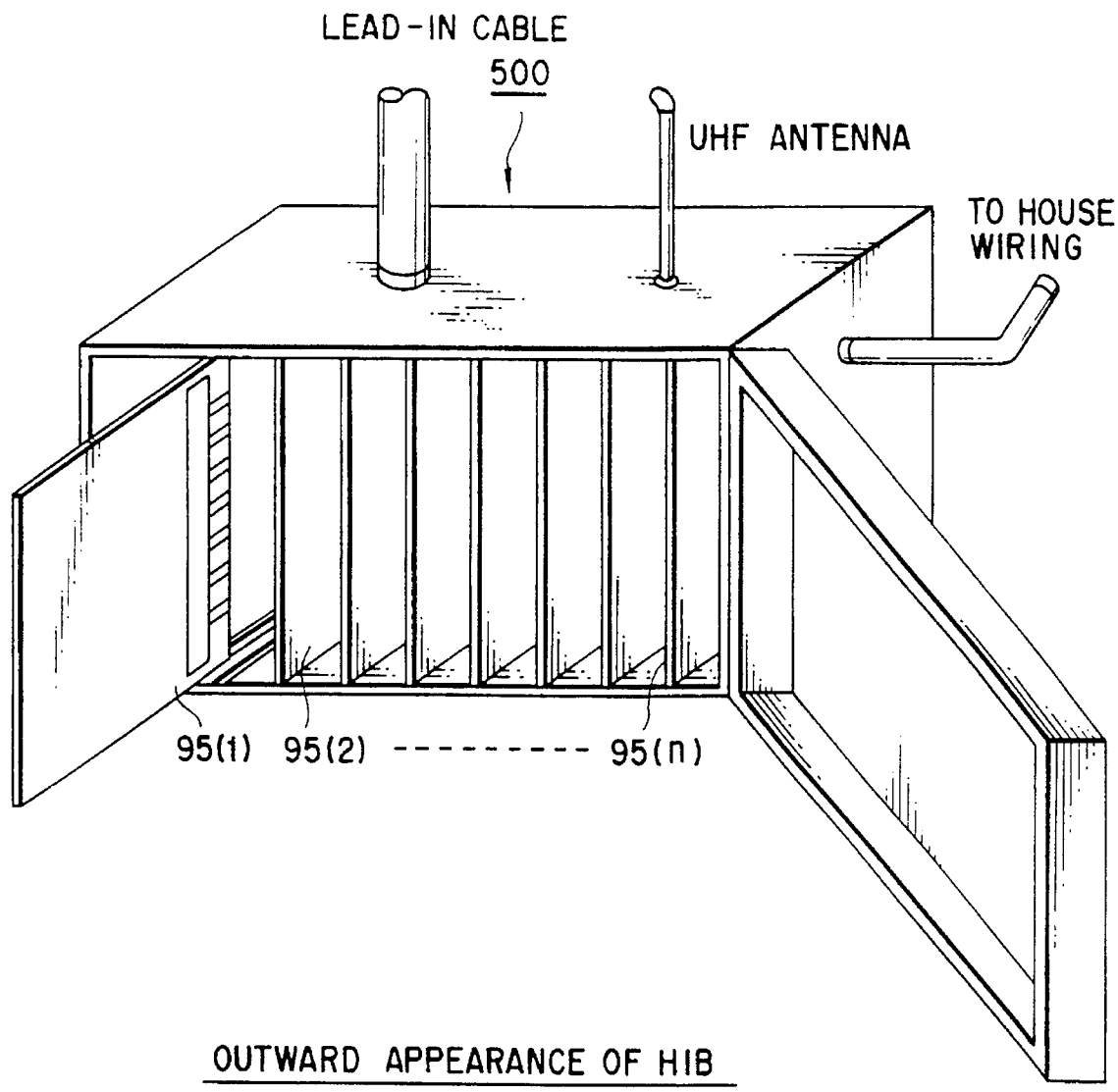
FIG. 26 is a perspective view of the HIB of FIG. 1.

FIG. 1 is a schematic diagram of a CATV system according to an embodiment of the present invention. A subscriber terminal unit or a home information box (hereinafter, abbreviated as an HIB) is at the core of this invention (FIG. 26 shows its outer appearance).

Using FIG. 1, a two-way CATV system will be explained. A head end (HE) 100 contains an over-the-air broadcast (conventional) receiving system 101a, a satellite broadcast receiving system 102a, and a subscriber database management system 200. The subscriber database management system 200 is used to refer to or update the contents of a subscriber's contract.

The head end 100 is connected to a plurality of external database facilities 300 via public lines of telecommunication or ISDN lines 705. The external database facilities 300 include airlines and railway companies.

The TV signal received at the over-the-air receiving system 101a or the satellite receiving system 102a is directed to the head end 100. In the head end 100, the free broadcast is converted into a conventional NTSC format and then amplitude-modulated, whereas the pay broadcast undergoes a digital process, a scramble process, and also 64QAM process, is mixed, and then converted into an optical amplitude-modulated (AM) signal. This optical AM signal is sent to the light output terminal of the head end 100.

A two-way communication path is established between the subscriber database 200 and control computer (not shown) and HIBs 500. The downstream data from the head end 100 to the HIB 500 undergoes QPSK modulation and is mixed with the aforementioned pay and free broadcast signals, and converted into an optical AM signal, and then sent to the light output terminal of the head end 100. The upstream data from the HIB 500 is demodulated at a QPSK demodulator in the head end 100 and then directed to the control computer. The light input terminal of the head end 100 is connected to a QPSK data demodulator via a photoelectric converter.

The head end 100 allows star connection and has a plurality of light input terminals and a plurality of light output terminals corresponding to the light input terminals. The figure shows an example of using one of them. A pair of a light input terminal and a light output terminal of the head end 100 is connected to the light output terminal and the light input terminal of a photoelectric converter 702 via optical fibers 701. The TV signal and data signal are converted by the photoelectric converter 702 into electric signals, which are supplied to the HIB 500 via a drop cable 703.

The upstream data from the HIB 500 to the head end 100 undergoes QPSK modulation and the modulated signal is transferred to the head end 100 by way of the drop cable 703, the photoelectric converter 702, and the optical fibers 701. The photoelectric converter 702 is installed for 200 to 500 subscribers.

The output signal of HIB 500 is supplied in parallel to television sets (hereinafter, abbreviated as TVs) and video cassette recorders (hereinafter, abbreviated as VCRs) (612, 613, 614, 615) in the individual rooms via a house coaxial cable link (620, 621, 622, 623, 624, 625, 626, 627, 628). The output signal is also supplied to a TV 611 via a parental unit 630. Specifically, for example, the output terminal of the HIB 500 is connected to a splitter 616 via a coaxial cable 620. One distribution output terminal of the splitter 616 is connected to a splitter 618 via a coaxial cable 621, and its other distribution output terminal is connected to a splitter 617. One distribution output terminal of the splitter 617 is connected to the parental unit 630 and an expansion unit 604, and its other distribution output terminal is connected to a VTR 614. A TV 611 and a facsimile machine 629 are connected to the parental unit 630 and expansion unit 604 via twist pairs. One distribution output terminal of the splitter 618 is connected to a TV 613, and its other distribution output terminal is connected to a splitter 619 via a coaxial cable 628. One distribution output terminal of the splitter 619 is connected to a VTR 615 via a coaxial cable 626, and its other distribution output terminal is connected to a TV 612 via a coaxial cable 625.

The HIB 500 can also receive each usage data item from a gas meter 605, a wattmeter 606, and a water meter 607 in the form of a baseband for serial data. The switch data from a fire alarm 610 and a door sensor 608 are supplied to the HIB 500 in on/off form.

The remote control units (601, 602, 603) are each given addresses, one for one. Making use of a 1-MHz bandwidth in a 454-MHz band, communication is effected from the HIB 500 to the remote control units (601, 602, 603). Using a 1-MHz bandwidth in a 455-MHz band, communication is effected from the remote control units (601, 602, 603) to the HIB 500.

The CATV signal supplied from the drop cable 703 is supplied to a splitter 539 (FIG. 2) via an input terminal 537 and a surge protector 538. The CATV signal distributed at the splitter 539 is supplied to a filter 540, a processing section 547, and a QPSK data modulator-demodulator 546. The CATV signal from which the high frequency bands are cut off by the filter is supplied to a mixer 541. The modulation serial data is supplied from the processing section 547 to the QPSK data modulator-demodulator 546. Similarly, the downstream communication data from the head end 100 is supplied from a QPSK data modulator-demodulator 546 to the processing section 547. The two-way communication data is transmitted and received between the HIB 500 and the remote control units (601, 602, 603) via a UHF antenna 545 and a UHF modulator-demodulator 544. The output signal of the splitter 539 is supplied to the processing section 547, which converts the TV signal into an ordinary NTSC signal and remodulates into a UHF channel, and then supplies these signals to the mixer 541. The two-way communication is effected between the expansion unit 604 or the parental unit 630 and the processing section 547 via a data modulator-demodulator 543, the mixer 541, and an output terminal 542.

Figure 3:
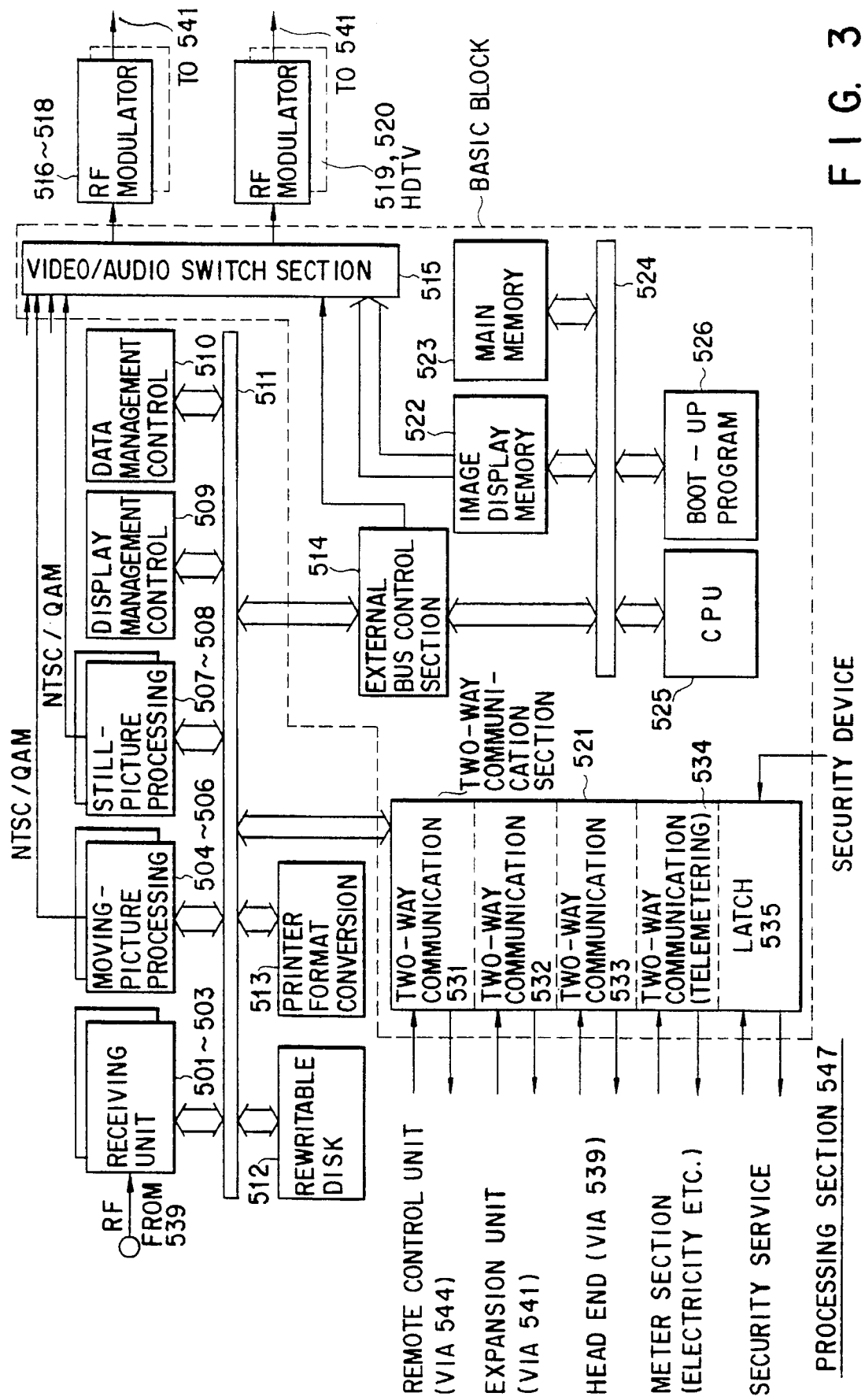
FIG. 3 is a block diagram of the processing section of FIG. 2.

FIG. 3 shows a structure of the processing section 547. The processing section 547 is broadly divided into two groups: a basic block group and the other remaining function block group.

The basic block group comprises an external bus control section 514, a video/audio switch 515, a two-way communication section 521, an image display memory 522, a main memory 523, an internal bus 524, a CPU 525, a boot program memory 526, and an external bus 511. The remaining function block group is further subdivided into two groups: those not connected to the external bus 511, such as NTSC-RF modulators 516, 517, 518 and HDTV-RF modulators 519, 520, and those connected to the external bus 511, such as the other units. Although there is a physical limit to the number of function blocks used, there is no logical limit. The function blocks connected to the external bus 511 include receiving units 501 to 503, moving-picture processing units 504 to 506, a display management control section 509, and a data management control section 510.

In reproducing ordinary moving pictures, the CATV signal supplied from the distribution unit 539 (FIG. 2) is received by the receiving units (501, 502, 503). After the data is demodulated, the demodulated data is supplied to the external bus 511. The data is inputted to the moving-picture processing units (504, 505, 506), which convert the data into analog signals. The analog signals are supplied to the NTSC-RF modulators (516, 517, 518) by way of the video/audio switch 515. The modulators supply the resulting signals to TVs and VTRs (611 to 613, 614, 615) (FIG. 1) via the mixer 541 (FIG. 2) and house coaxial wiring.

Still picture processing units 507, 508 are used to process still pictures various types of information can be used as still-picture data. For example, weather forecast information and stock prices information may be used as still-picture data. The still-picture signal converted into an analog image signal is supplied to the NTSC-RF modulators (516, 517, 518) via the video/audio switch 515. The modulators supply the resulting signals to TVs and VTRs (611 to 613, 614, 615) (FIG. 1) via the mixer 541 (FIG. 2) and house coaxial wiring.

The reason why more than one system containing the receiving unit, the moving-picture processing unit, the still-picture processing unit, the modulator, etc is provided, is to receive and demodulate a plurality of channels or a plurality of programs simultaneously and then supply each channel or program signal to a given TV or VTR. It is easy to add units of this type to the external bus 511.

It is also possible to connect a rewritable disk control unit 512 and a printer format conversion control unit 513 to the external bus 511 when the rewritable disk control unit is used, a disk reproducing unit can be controlled. When the printer format conversion control unit 513 is used, format conversion suitable for a printer can be effected by connecting the printer. Furthermore, the image can be converted into a form suitable for facsimile output. In this case, the converted data is inputted via the external bus 511 to the two-way communication section 521, which sends it to the expansion unit 623 (FIG. 1).

Furthermore, it is also possible to connect the display management control section 509 and the data management control section 510 to the external bus 511. When the display management control section 509 is connected, it is possible to create the function of temporality storing the video signal of the moving pictures transmitted to reproduce still images and outputting the still images.

The data management control section 510 manages each function block connected to the external bus 511. For example, with the data management control section 510 in operation, while still pictures are being reproduced from the video signal in a certain channel, the still pictures can be transmitted to the image display section of another channel system, which mixes them.

The basic block is further explained. The basic block comprises the external bus control section 514, the video/audio switch 515, the two-way communication section 521, the image display memory 522, the main memory 523, the internal bus 524, the CPU 525, the start-up program memory 526, and the external bus 511. The system start-up program is stored in the start-up program memory 256. The CPU 525 reads the start-up program via the internal bus 524, and operates the system on the basis of the program. The main memory (RAM) 523 is connected to the internal bus 524, and used to store various data items temporarily. The image display memory 522 is connected to the internal bus 524. The image display memory 522 is used to superimpose, for example, reception channel data, warning data, and operation guide data. The output of the image display memory is sent to the display section in the corresponding channel via the video/audio switch section 515. The external bus control section 514 is connected between the internal bus 524 and the external bus 511.

The external bus control section 514 supervises the operation of each component of the basic block and the operation of each component of the remaining blocks via the internal bus 524 and the external bus 511. For example, the external bus control section keeps track of the function blocks and sets the operation timing. The external bus control section 514 can send control data to the data management control section 510. On the basis of the control data, the data management control section 510 can control the function blocks connected to the external bus 511.

The two-way communication section 521 will be explained further.

The two-way communication section 521 comprises a communication section 531 for performing two-way communication with a remote control unit, a communication section 532 for performing two-way communication with an expansion unit, a communication section 533 for performing two-way communication with the head end, a communication section 534 for performing two-way communication with a meter such as a wattmeter or a gas meter, and a latch section 535 for sending security-related information.

Figure 4:
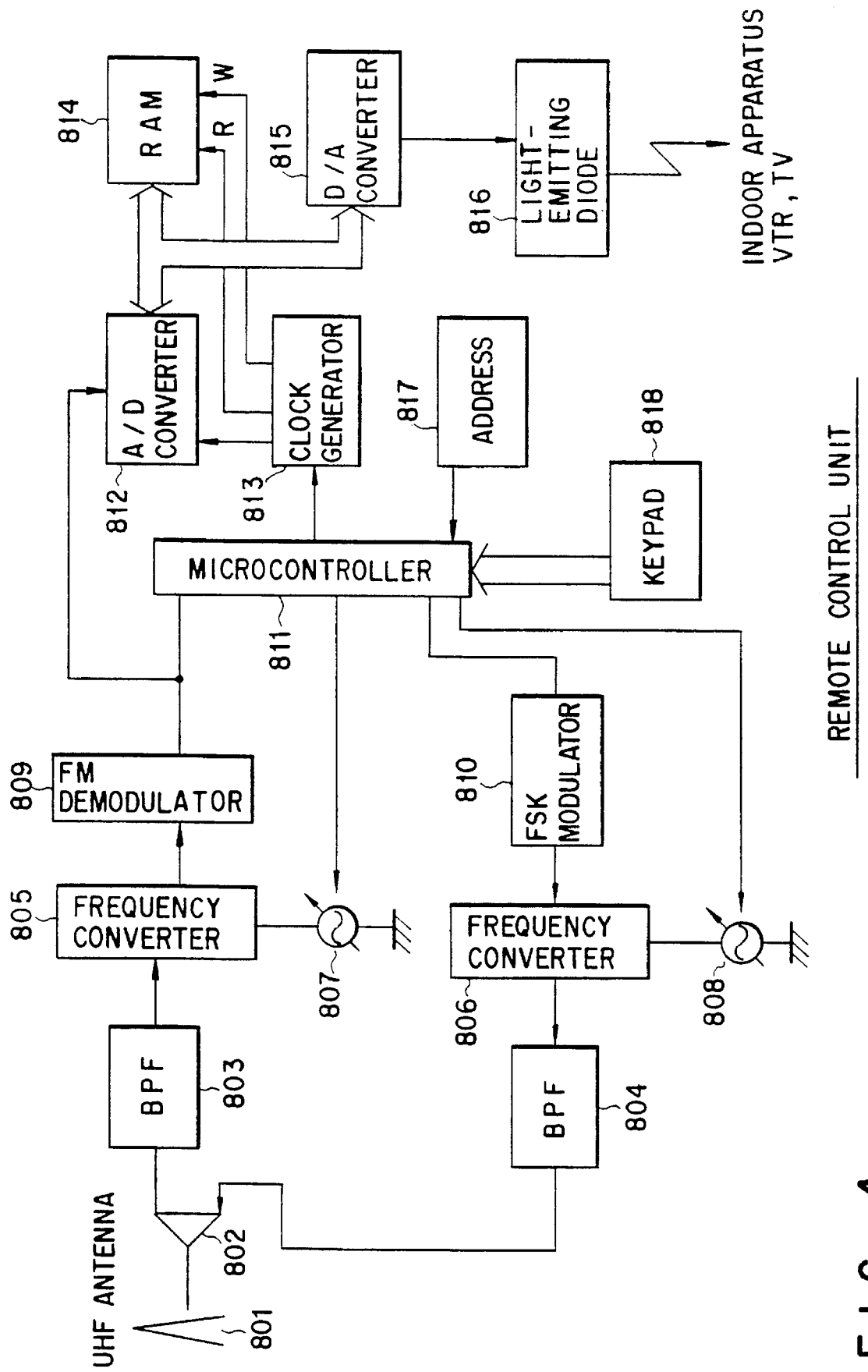
FIG. 4 is a block diagram of the remote control unit of FIG. 1.

FIG. 4 shows a configuration of one of the remote control units (601, 602, 603) as the representative. The remote control units (601, 602, 603) have the same configuration except that only the contents of the address differ from unit to unit.

A UHF antenna 801 is connected to a splitter 802. Thereafter, the system is divided into a reception system and a transmission system. One output terminal of the splitter is connected to a band-pass filter (BPF) 803. The band-pass filter 803 removes the undesired band from the input signal and then supplies the resulting signal to a frequency converter 805. To one input terminal of the frequency converter 805, the output of a variable frequency generator 807 is supplied. The oscillating frequency of the variable frequency generator 807 is controlled by a microcontroller 811 so that oscillation may take place at a frequency of the data signal frequency from the UHF modulator 544 (FIG. 2) plus 10.7 MHz. The output of the frequency converter 805 is inputted to an FM demodulator 809, which frequency-demodulates the signal and supplies the demodulated signal to the microcontroller 811 and an analog/digital (A/D) converter 812. The digital output of the A/D converter 812 is outputted to a common bus for a random access memory (RAM) 814 and a digital/analog (D/A) converter 815. The necessary timing signals for the A/D converter 812, RAM 814, and D/A converter 815 are supplied from a clock generator 813. The control data for the clock generator 813 is supplied from the microcontroller 811.

An infrared light-emitting diode 816 is connected to the output terminal of the D/A converter 815. The address data items from an address holder 817 and a key-pad 818 and the remote control operation data items for subscribers are also inputted to the microcontroller 811. The transmission data from the remote control unit is created at the microcontroller 811, undergoes FSK modulation at an FSK modulator 810, is frequency-converted at a frequency converter 806 and waveform-shaped at a band-pass filter (BPF) 804, and then is supplied to a UHF antenna 801 via the splitter 802. The variable frequency oscillator 808 is a local oscillator for frequency-converting the output of the FSK modulator 810. The oscillating frequency of the oscillator is determined by the control signal from the microcontroller 811.

Figure 5:
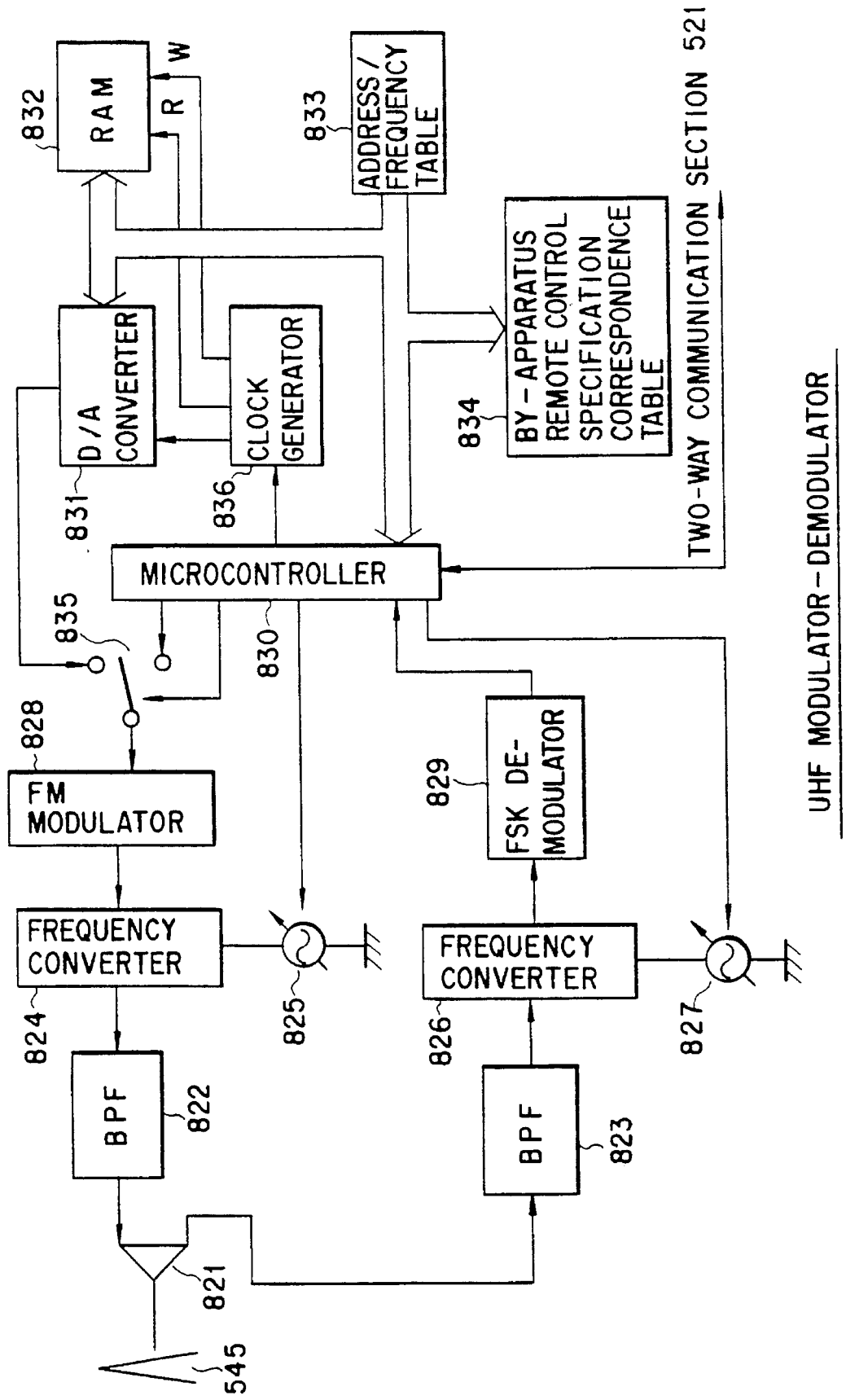
FIG. 5 is a block diagram of the UHF modulator-demodulator of FIG. 2.

FIG. 5 shows a structure of the UHF modulator-demodulator 544 (FIG. 2).

The UHF data signal generated at the remote control units (601, 602, 603) and transmitted via the UHF antenna 545 (FIG. 2) is inputted via a splitter 821 to a band-pass filter 823, which eliminates the unnecessary band components. Then, the resulting signal is inputted to a frequency converter 826. The frequency conversion output is inputted to an FSK demodulator 829. The oscillation output of a variable frequency oscillator 827 is supplied to the frequency converter 826. The frequency control data from a microcontroller 830 is inputted to the control data input terminal of a variable frequency oscillator 827. The serial data outputted from the FSK modulator 829 is directed to the serial data input terminal of the microcontroller 830. The serial data outputted from the microcontroller 830 to the remote control units (601, 602, 603) are inputted to an FM modulator 828, which frequency-modulates it. The resulting signal is then inputted to a frequency converter 824. The oscillation output of a variable frequency oscillator 825 is supplied to the frequency converter 824. The frequency control data is supplied from the microcontroller 830 to the frequency control data input terminal of the variable frequency oscillator 825. The output terminal of a D/A converter 831 is connected to the other input terminal of an analog switch 835, whose control input terminal is connected to the control output terminal of the microcontroller 830. The data input section of the D/A converter 831 is connected to a common bus for the microcontroller 830 and a RAM 832. Its clock input terminal is supplied with a clock from a clock generator 836.

The clock for the D/A converter 831 and the timing signals for the W/R terminal of the RAM 832 are generated at the clock generator 836. The clock generator 836 is controlled by the control output from the microcontroller 830. The microcontroller 830 can expand an address/frequency table 833 and a by-apparatus remote control specification table 834 on its own RAM and refer to and modify the contents. Additionally, the microcontroller 830 can effect mutual communication with the two-way communication section 521 (FIG. 3) through serial data channels. In the address/frequency table, the remote control units (601, 602, 603) and the reference addresses for communication and using frequency data items are stored. In the by apparatus remote control specification table 834, the contents of the control data items for controlling the apparatuses (e.g., TVs and VTRs) are stored. This is done because the contents of the control data items differ from maker to maker.

Figure 6:
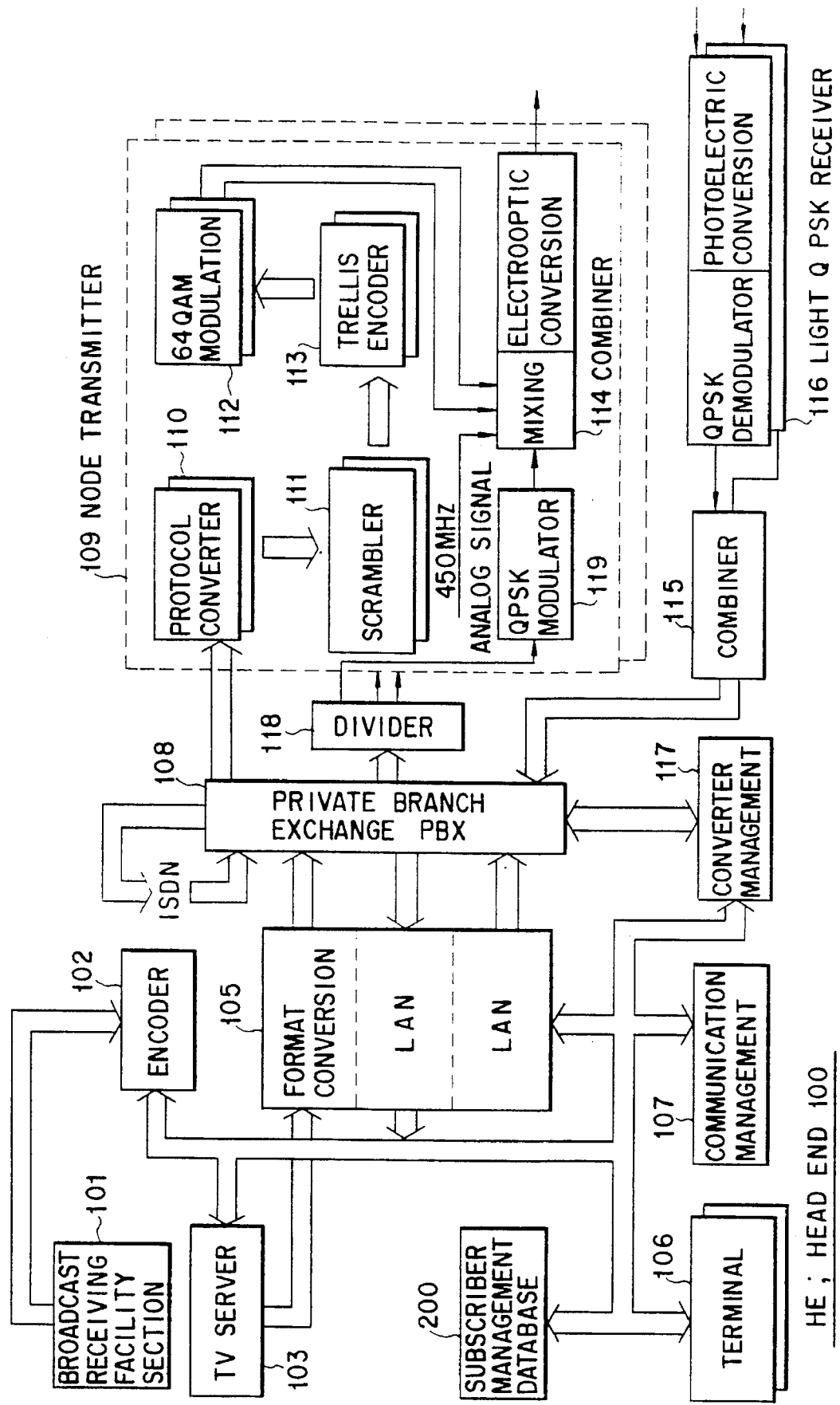
FIG. 6 is a block diagram of the head end of FIG. 1.

FIG. 6 shows a structure of the head end 100 (FIG. 1).

The pay broadcasts in satellite broadcasting and non-government broadcasting are dealt with by a broadcasting facility section 101. There, a real-time encoder 102 converts the broadcasts into digital data by effecting a compression process in real time. The TV signal that is already compressed, converted into digital data and stored in a hard disk or an optical disk, like movies, is managed by a TV data server 103. The TV data items from the TV data server 103 and the real-time encoder 102 are both inputted to the TV signal input section of a format converter 105, which converts them into telephone packet format (ds-3). After the conversion, the TV data is inputted to a telephone exchange 108. Part of the output of the exchange is inputted to a node transmitter 109.

The node transmitter 109 is installed so as to correspond to the photoelectric converter 702 (FIG. 1). Thus, since in a star-connection CATV system centered on the head end 100, a plurality of photoelectric converters are installed, a plurality of node transmitters are provided accordingly. The node transmitter 109 comprises a protocol converter 110, a scrambler 111, a trellis encoder 113, a 64QAM modulator 112, a combiner 114, and a QPSK modulator 119.

Here, using FIGS. 7 and 8, explanation will be given as to the output signal of the protocol converter 110 and channel allocation.

Figure 7:
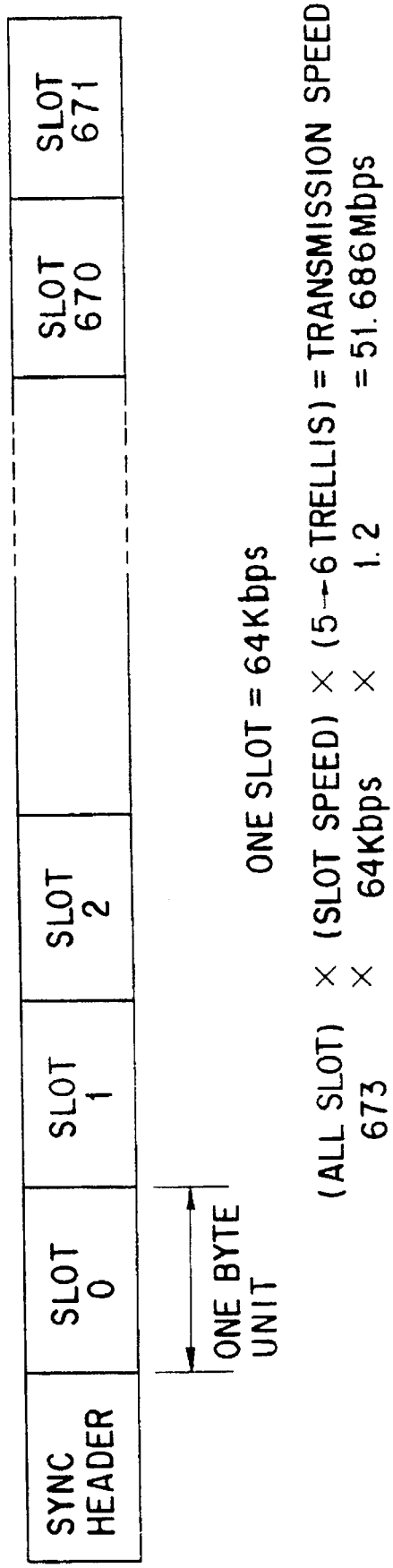
FIG. 7 is an explanatory diagram of slots constituting a digital broadcast.

In the output section of the protocol converter 110, the TV signal, teletext data, etc. are expanded within 673 slots as shown in FIG. 7. A single slot consists of one byte. The first slot is a sync header for synchronizing reproduction. The input specification of the protocol converter 110 is for a three-order group interface, with the result that the protocol converter has 672 lines at 64 kbps per line. That is, a single slot corresponds to 64 kbps.

Normally, the purpose of each slot is determined and as shown in FIG. 8, the contents are allocated to the individual slots. In the case of the NTSC television signal, 63 slots (4032 Mbps) are allocated to the video signal and 10 slots (640 kbs/4 channels) are allocated to the audio signal. The other slots are allocated to the teletext and the telephone lines. FIG. 8 shows the correspondence between each TV channel and the slot number allocated to that channel. Four channels are set for audio signals, whereas a single channel is for a TV signal.

In FIG. 6, the output of the protocol converter 110 undergoes a scramble process at the scrambler 111, which inputs the resulting signal to the trellis encoder 113. The trellis encoder 113 performs a convoluting process on one of five bits and treats the result as the 6-bit output, so that the entire bit rate takes the values calculated as shown in FIG. 7.

The data stream of 51.6864 Mbps outputted from the trellis encoder 113 is inputted to the 64QAM modulator 112, which allocates it to a band of 12 MHz above 450 MHz (see FIG. 9(A)). That is, nine channels of TV signals (see FIG. 8) are allocated to the 12 MHz band. As many apparatuses as a multiple of the channel combinations are installed according to the subscriber's needs. If 90 pay channels are needed, 10 sets of the protocol converter 110, scrambler 111, trellis encoder 113, and 64QAM modulator 112 are required for the node transmitter. The occupied frequency band is 12 MHz× 10=120 MHz.

Naturally enough, the output frequency of the 64QAM modulator 112 in each node transmitter 109 must differ from each other.

The output of each of the 64QAM modulators 112, the other analog TV signals for free broadcasts, and the output of the QPSK modulator 112 undergo RF mixing at the combiner 114. The resulting signal then undergoes AM photo conversion at a laser diode. Then, the converted signal is transmitted to the photoelectric converter 702 (FIG. 1) by means of the independent optical fibers 701 (FIG. 1).

On the other hand, the upstream signal is received by a light QPSK receiver 116. The light QPSK receiver 116 is composed of a photoelectric converter and a QPSK demodulator. As many light QPSK receivers as there are nodes are installed. The upstream data from the HIB 500 (FIG. 1) is received by the light QPSK receiver 116, which QPSK modulates it. The combiner 115 multiplex the resulting signal of primary rate from the receivers, and operates as a third-order rate interface. The resulting signal is inputted to the telephone exchange 108. When there are 28 nodes, a light QPSK receiver and a combiner are provided for each node. The data from the HIB 500 (FIG. 1) outputted from the telephone exchange 108 is inputted to a format converter 105, which transmits it to a communication management processor 107 via a LAN 104. The data from the communication management processor 107 to the HIB 500 (FIG. 1) is converted by the format converter 105 into the third-order group interface speed, which is inputted to the telephone exchange 108, which transmits it to a divider 118. The divider distributes to the transmitter of each node, which converts it into the first-order group interface speed. Then, the converted signal is inputted to the QPSK modulator 119, which QPSK modulates it.

As seen from the above explanation, the divider 118 and the combiner 115 are provided for each of 28 nodes.

A converter management processor 117, the communication management processor 107, a terminal 106, a subscriber management database server 200, a TV data server 103, a real-time encoder 102, and the format converter 105 are connected to each other through the LAN 104 and can exchange data with each other. The converter management processor 117 controls the telephone exchange 108. Part of the line of the telephone exchange 108 is connected to an external ISDN line, so that the TV data from another head end can be exchanged and the data from an external database facilities 300 (FIG. 1) can be received.

As described above, the broadcast/data signal generated at the head end 100 (FIG. 1) and the QPSK upstream data from the HIB 500 (FIG. 1) exist, and the input terminal signal of the HIB 500 (FIG. 1) takes the frequency layout as shown in FIG. 9A. As shown in FIG. 9A, TV broadcasting frequency bands on a conventional analog system are allocated up to 450 MHz. Since these signals have not undergone a scramble process, they can be received by a VTR or a TV compatible with the current CATV. Concerning the digital broadcast/data signal, it is first handled by the HIB 500 (FIG. 1) and then delivered to each home as described above. Below the analog broadcast, the frequency band of the upstream data signal from the HIB 500 (FIG. 1) is placed, which is used for data communication with the head end 100 (FIG. 1).

FIG. 9B shows the frequency layout of the output terminal of the HIB 500.

The analog TV signal from which the digital TV signal has been removed is modulated again and the resulting signal is supplied to each TV set. The downstream data from the head end 100 (FIG. 1), which is related to a QPSK data channel for control and system and a large capacity channel for 64QAM, is built in the digital broadcast and downstream data signal shown in FIG. 9A. As compared with conventional 450 MHz and 550 MHz bands, the frequency bands are broadened, so that the number of channels handled is increased. To suppress distortions due to cross modulation or intermodulation generated in the tuner of a TV 611 or a VTR 614 (FIG. 1), the digital broadcast and downstream data signal is transmitted at a level nearly 10 dB lower than a conventional analog broadcast signal (FIG. 9A).

The CATV signal arrived at the HIB 500 (FIG. 2) is inputted to the receiving unit 501 (FIG. 3) via an input terminal 537 and a splitter 539 (FIG. 2). The receiving unit demodulates it into digital data and outputs the result to the external bus 511 (FIG. 3), the process of which will be explained below.

Figure 10:
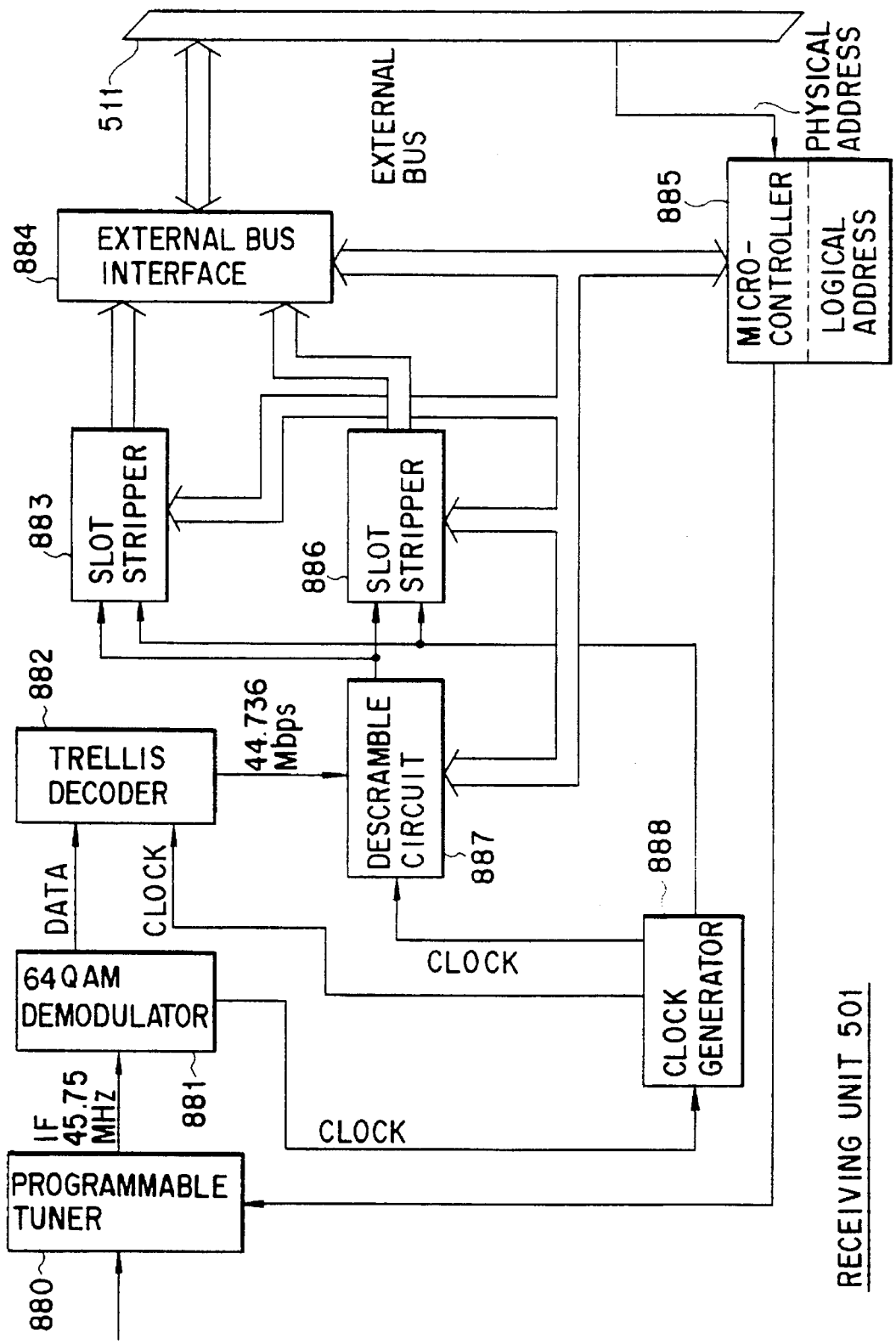
FIG. 10 is a block diagram of the receiving unit of FIG. 3.

FIG. 10 shows a structure of the receiving unit (FIG. 3) concretely. The CATV signal is selected at a programmable tuner 880 (FIG. 10), which frequency converts it into a signal with an IF frequency of 45.75 MHz, and then inputs the converted signal to a 64QAM demodulator 881. The 64QAM demodulator 881 supplies the demodulated data and the bit synchronizing clock to a trellis decoder 882 and a clock generator 888.

Furthermore, the output of the trellis decoder 882 undergoes a descramble process at a descramble circuit 887, which expands it into data strings as shown in FIG. 7 or 8. The data is inputted to slot strippers 883, 886, which extract the necessary data stream only. Each of the slot strippers 883, 886 has the ability to process a single channel of TV data shown in FIG. 8. The receiving unit constructed as shown in FIG. 10 can extract two channels of TV data. The output data from the slot strippers 883, 886 is outputted to the external bus 511 via an external bus interface 884. A microcontroller 885 controls the programmable tuner 880, a descramble circuit 886, and the data strippers 883, 886 on the basis of the control command via the external bus. For example, tuning frequency data is given to the programmable tuner 880, and the necessary slot number is handed over to the data strippers 883, 886. This makes it possible to take out the data out of the channel specified.

The external bus 511 provides all of the units (function blocks) connected thereto with the physical addresses determined by the physical position connected. All of the units connected to the external bus 511 are allocated logical addresses according to their functions. In the case of the unit of FIG. 10, a logical address is set in the program area of the microcontroller 885.

Hereinafter, the physical and logical structures of the external bus 511 (FIG. 3) and the operation of its related units will be explained.

Figure 11:
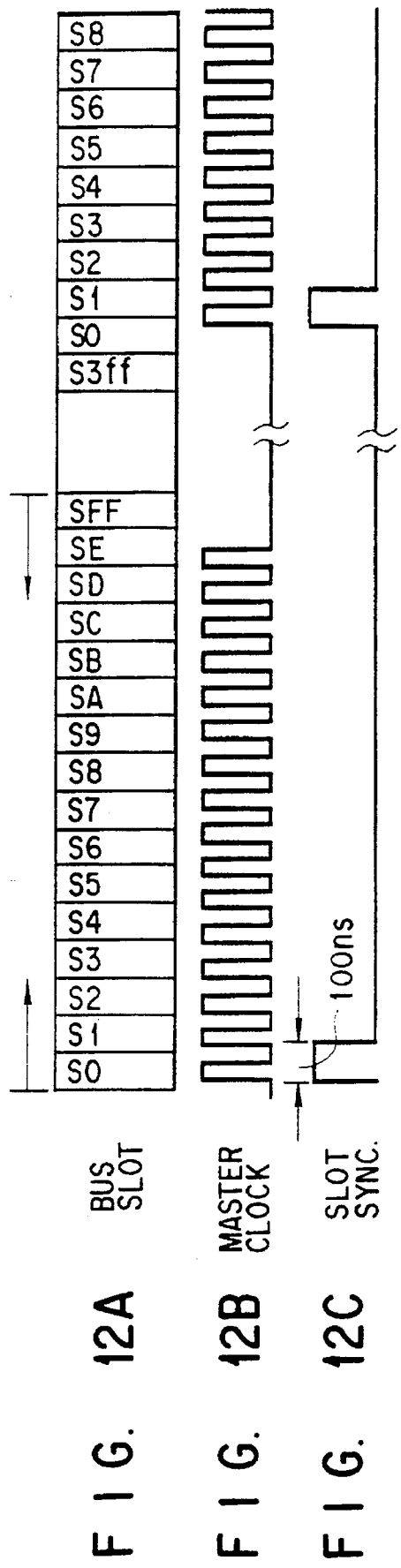
FIG. 11 is an explanatory diagram of the terminal layout of the external bus in FIG. 3.

FIG. 11 shows the terminal layout of the external bus 511 (FIG. 3). The external bus is composed of 8-bit control and data terminals (terminal numbers 2 to 5, 11 to 14), a master clock terminal (terminal number 6), a slot synchronizing timing system (terminal number 15), bus control (B/C) (terminal number 10), physical addresses (terminal numbers 7, 8, 16, 18), etc. The physical address varies with the physical position at which connection is made to the external bus. For example, a total of 16 (the square of 4) units can be installed. Furthermore, the external bus 511 is expanded in time division and treated with a different meaning for each divided slot.

FIG. 12 shows the structure of time-division monitoring on the external bus 511.

As shown in FIG. 12A, the external bus is divided into 1024 equal pieces or slots. The master clock of FIG. 12B supplies the timing of the divided slots. The slot synchronization shown in FIG. 12C gives the 0th slot (s0), whereby the times for all the other slots are defined. Because a single slot is given in 100 ns and the word size of the bus is one byte, a transmission capability of 97.65625 kilobyte per slot is achieved.

The 1024 slots are broadly divided into two functional groups: a control slot group and a data slot group. The control slots are used to transfer control data between the external bus and each unit. The data slots are used to transfer such data as image data or file data. This relationship is shown in FIG. 12D, from which it is understood that 16 control slots and 1008 data slots are provided.

Furthermore, the 16 control slots are defined as dedicated slots for the basic devices as shown in FIG. 12E, that is, the external bus control section 514 (FIG. 3), the display management control section 509, and the data management control section 510. For example, the communication from the external bus control section 514 to the display management control section 509 is effected by always using slot number 1. The communication in the opposite direction uses slot number 5.

At this time, for example, at slot number 1, the output terminals of the bus and bus control (B/C) are open to the external bus control section 514. At slot number 5, the bus and bus control are open to the display management control section 509.

Hereinafter, the bus control (B/C) will be described.

FIG. 13 shows the relationship between the control and data slots and bus control (B/C).

In FIG. 13A, k, k+1, . . . are given every 1024 slot period for slot number 0. In FIG. 13C, this is done for slot number 5.

For example, FIGS. 13A and 13B show that (1–1) bytes and (m+n) bytes of the control data are transferred consecutively during the time when bus control (B/C) is "1." In the control slot, the control data used is continuous and during the effective period, bus control (B/C) must always be "1." In other words, this means that the slot is not used during the time when bus control (B/C) is "0."

FIGS. 13C and 13D provide a similar explanation of the data slot, meaning that data is not transferred (used) during the time when bus control (B/C) is "0." For example, this is used to compensate for the portion that cannot be divided because in the digital broadcasting in FIG. 7, while the transfer speed from the head end 100 is a multiple of 64 kbps, the transfer speed per slot of the external bus 514 is 97.65625 bytes/sec. This operation enables the external bus 511 (FIG. 3) to handle any type of transfer data in the range not exceeding the upper transfer speed limit of about 10 Mbyte.

FIG. 14 shows a structure of a control packet. As described earlier, the transmitting devices for the 16 slots are determined for each slot, but the destination has not been determined yet for some of them. Specifically, slot numbers 0, 8, and C have no destination. For this reason, the control packet is composed of a destination address, a command, and command control data, and is transmitted consecutively (see FIG. 13B).

As shown in FIG. 14, the same code may be given to the packet start code and the packet end code. There is no problem in using separate code for these codes. For an error sensing function, a byte counter is added to the second byte and CRC data is placed before the packet end code. Of course, the value of the byte counter may or may not include the packet start/end codes, or may include either of them.

Figure 15A:
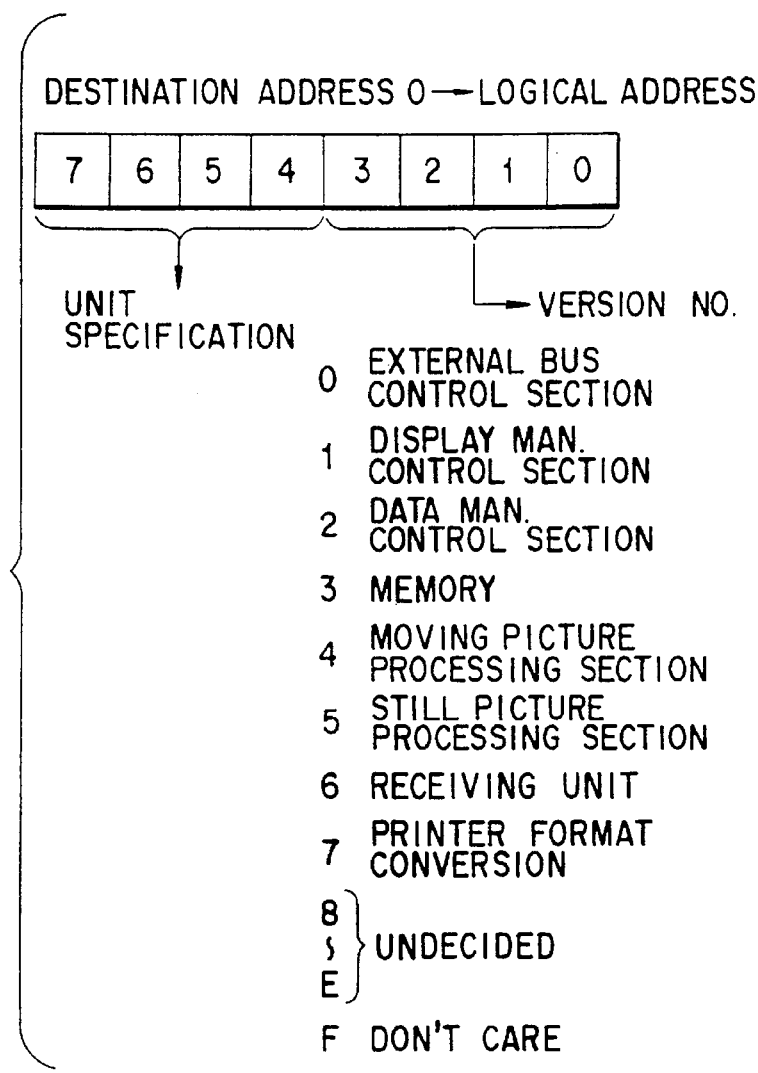
FIGS. 15A and 15B show an example of destination addresses on the external bus.
Figure 15B:
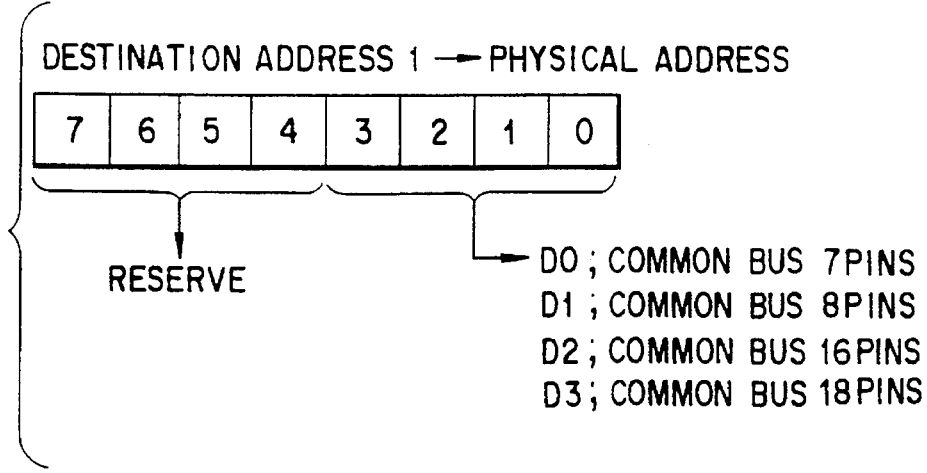

FIG. 15 shows a structure of a destination address having an information plane and a control plane at the same time. The destination address, as shown in FIG. 14, has two types: one type whose third byte has address 0 (FIG. 15A) and the other type whose forth byte has address 1 (FIG. 15B). As shown in the figure, the destination address consists of two bytes. The least significant byte (address 0) of destination address is allocated to a logical address. This logical address is held in each unit connected to the external bus 511 (FIG. 3), and is peculiar to each unit. The most significant four bits are allocated to a device. Only "F" is common to all units and is used in accessing by only a physical address explained later.

The least significant four bits are allocated to the version number of each unit. For example, when two routes such as slot strippers 883 and 886 are used even if the receiving units have the same function as shown in FIG. 10, the number given to the receiving unit that can deal with two TV data items at the same time differs from that given to the receiving unit that can handle only one channel of data because it has only one slot stripper.

The least significant byte (address 1) of the destination address is used as a physical address offered by the external bus 511 (FIG. 3). For example, to know which unit is installed in what position of the external bus 511, the external bus control section 511 runs self-diagnosis by making use of bus slots S0 (transmission) and S3 (reception) at the physical address and the aforesaid destination address 0="FX." Because the installed units are inputted to the subscriber database at another head end, communication can be effected between them for reference.

Hereinafter, using FIGS. 16 and 3, the operation of the external bus control section 514, external bus 511, and related units will be explained. The external bus control section 514 is a coprocessor on the internal bus 524 of a CPU 523, supervises the external bus 511, transmits what a CPU 525 wants to do, and controls the system. A display management control section 509 and a data management control section 510, receiving the instruction from the external bus control section 514, supervises each unit. These control sections are both composed of microcontrollers and provided with a RAM for additional calculation and a high-speed bus interface chip for the external bus.

Figure 16:
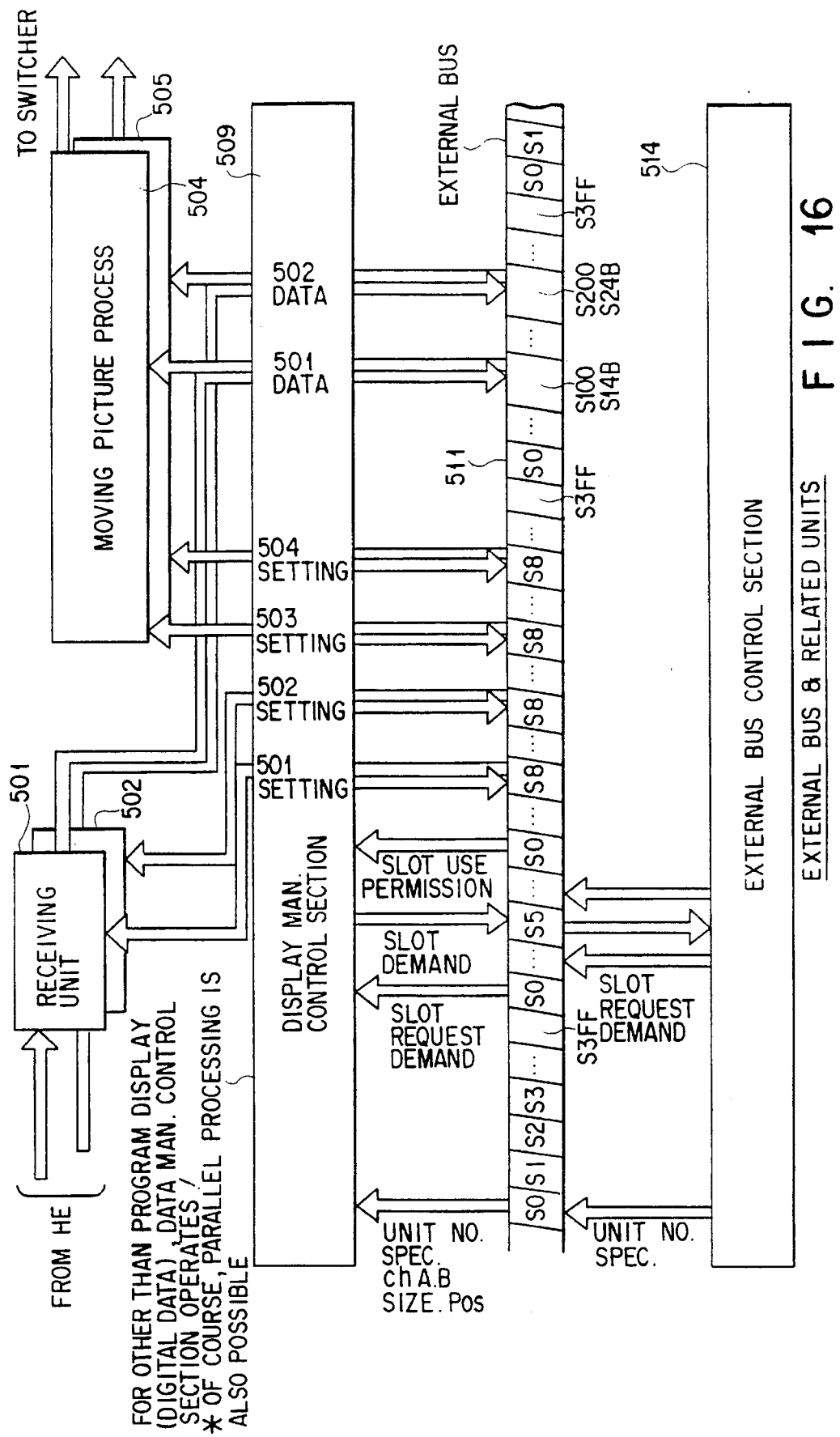
FIG. 16 is an explanatory diagram of the data taking-in operation at the external bus, external bus control section, and related unit.

FIG. 16 shows an example of offering two pay channels to a home at the same time. In response to the instruction from the CPU 525 (FIG. 3), the external bus control section 514 provides the display management control section 509 with the necessary control data, that is, the unit used, the tuning frequency, the channel number, the screen size displayed, the screen position, etc. by using bus slot 1. In this connection, the display management control section 509 sets the slot layout, taking into account the number of slots for the necessary data and the specification of unit.

At the request of the external bus control section 514, the display management control section 509 reports the number of slots and the slot layout for each unit. Receiving the report, the external bus control section 514 compares the reported items with those related to the bus slot and unit given to another management control (specifically, data management control). If there is no problem, the external bus control section gives permission to the bus slot.

After having obtained permission to use the bus slot and unit, the display management control section 509 sets the tuning information and the bus slot to be used for the receiving units 501, 502, and the display information and the slot to be used for the moving-picture processing sections 504, 505 through its occupied the control slot. In the example of FIG. 16, the digital TV data from the receiving unit 501 to the moving-picture processing section 504 is transferred by using 60 slots ranging from bus slot (100)H to (14B)H. Furthermore, the digital TV data from the receiving unit 502 to the moving-picture processing section 505 is transferred by using 60 slots ranging from bus slot (200)H to (24B)H.

The outputs of the moving picture processing sections 504 and 505 become a composite analog video signal, which is supplied from the video/audio switch 515 to a TV via NTSC-RF modulators 516, 517.

The operation of each unit taking in the necessary slot is performed on the basis of the timing generation information given by the display management control section 509.

From this time on, the display management control section 509 periodically monitors the status of the units under its control and reports abnormalities to the external bus control section 514, if any. Furthermore, it continues trick play control such as multichannel display or PIP. For example, when several channels are tuned sequentially, the external bus control section 514 does not operate at all as long as the mode continues, and the display management control section 509 periodically updates the reception information for the receiving units 501, 502.

The data management control section 510 has the same function as that of the display management control section 509 in terms of the teletext data from the head end the function data requiring no display function.

As described above, the external bus 511 is time-divided and allocated the information field and control field as the contents to be transferred, whereby the restrictions of multiple units are minimized, assuring effective use of the external bus. Because the time-division bus provides the information field and the control field at the same time, the entire system can be constructed on the minimum physical scale. Although the time-divided bus itself operates at a high speed, the units connected can operate in a state where the slots to be used are placed discretely, so that a high-speed large-capacity buffer memory is not necessarily required. It is possible to construct a buffer memory of a medium- or low-speed, large-capacity, low-cost memory and a high-speed small-capacity memory.

Hereinafter, the communication operation between the remote control unit 601 (FIG. 1) and the HIB 500 (FIG. 1) will be explained.

The subscriber's intention, for example, a tuning operation such as receiving a TV signal, begins with the communication operation between the remote control unit 601 and the HIB 500. The microcontroller 830 (FIG. 5) of the UHF modulator-demodulator 544 (FIG. 2) searches for a request from the remote control unit 601, which is usually called frequency polling. Concretely, the oscillating frequency of the variable frequency generator 827 of FIG. 5 is changed by the microcontroller 830, and the carrier from the remote control unit 601 is sensed (see FIG. 17). Specifically, the HIB 500 has allocated different transmitting frequencies to the remote control units 601, 602, 603 (FIG. 1). Using those frequencies, each of the remote control units 601, 602, 603 transmits signals to the HIB 500. For example, the remote control units and oscillating frequencies are linked on a one-to-one correspondence in such a manner that the remote control unit 601 corresponds to oscillating frequency f1, and similarly, 602 corresponds to f2 and 603 corresponds to f3. As described earlier, to achieve this, a frequency band of nearly 1 MHz is prepared and FSK modulation is effected at a communication bit rate of 9.6 kbps, so that a total of nearly 50 communication channels are prepared.

Use of those 50 channels is managed at the subscriber database 200 (FIG. 6) of the head end 100 (FIG. 1) so that the channels may not bat each other between the remote control units used by adjacent subscribers. Furthermore, about 50 channels from the HIB 500 to the remote control units are provided as in the opposite direction in the present embodiment. In this case, too, the subscriber database 200 manages them so that the remote control unit in the house next door may not be interfered with.

Figure 17:
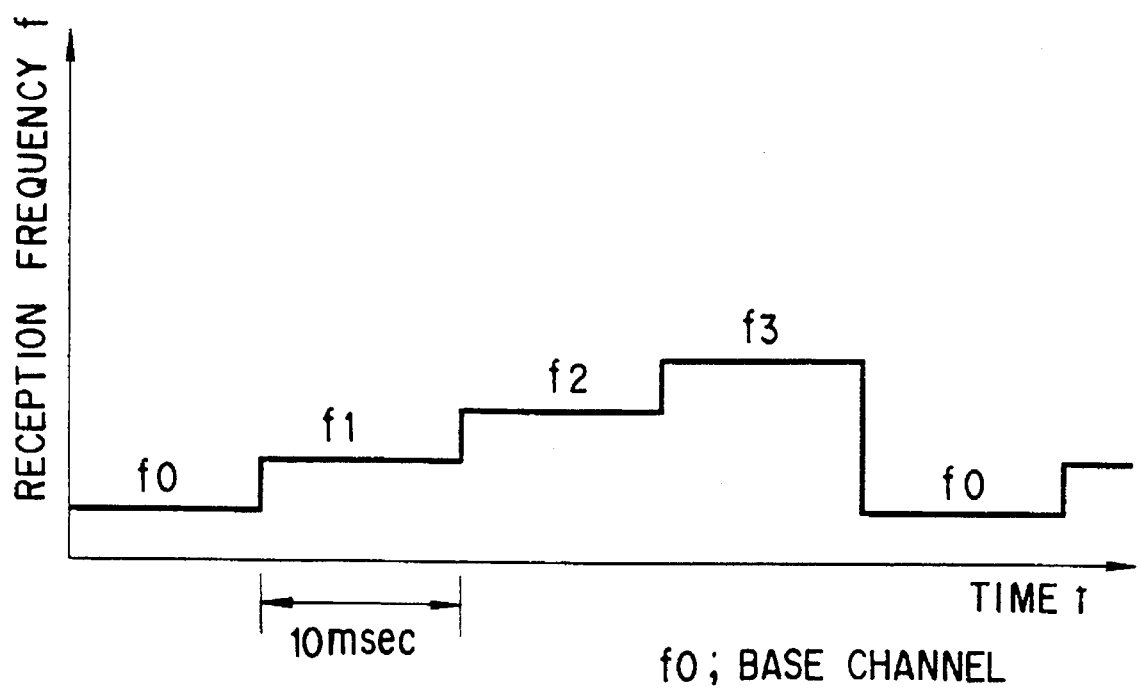
FIG. 17 shows an example of frequencies for frequency polling for the remote control unit of the UHF modulator-demodulator in FIGS. 2 and 5.

The frequency f0 shown in FIG. 17 is a special base channel used for operations other than allocation, and can be used at the HIB installed any subscriber's house (included in the range of frequency polling). This is used before a using channel is allocated to a remote control unit for the first time, or when the address 817 (FIG. 4) of remote control unit is set. When the carrier of frequency f0 of the base channel is sensed, the UHF modulator-demodulator 544 controls the variable frequency oscillator 825 at a predetermined frequency to effect two-way communication.

Hereinafter, using FIGS. 18 and 19, the operation procedure and the operation of HIB 500 will be described.

Figure 18:
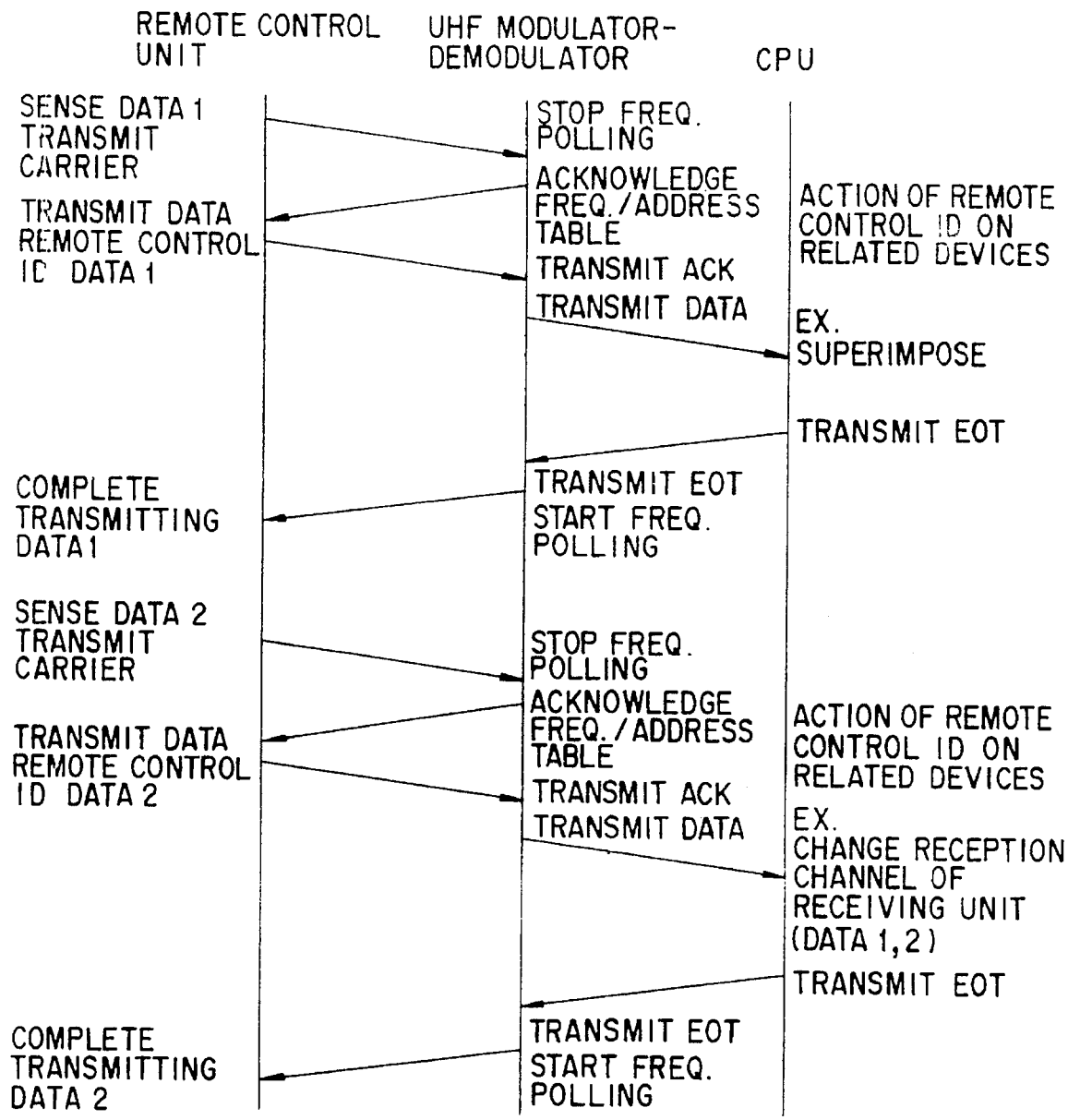
FIG. 18 shows an example of the control operation at the remote control unit in FIG. 1.
Figure 19:
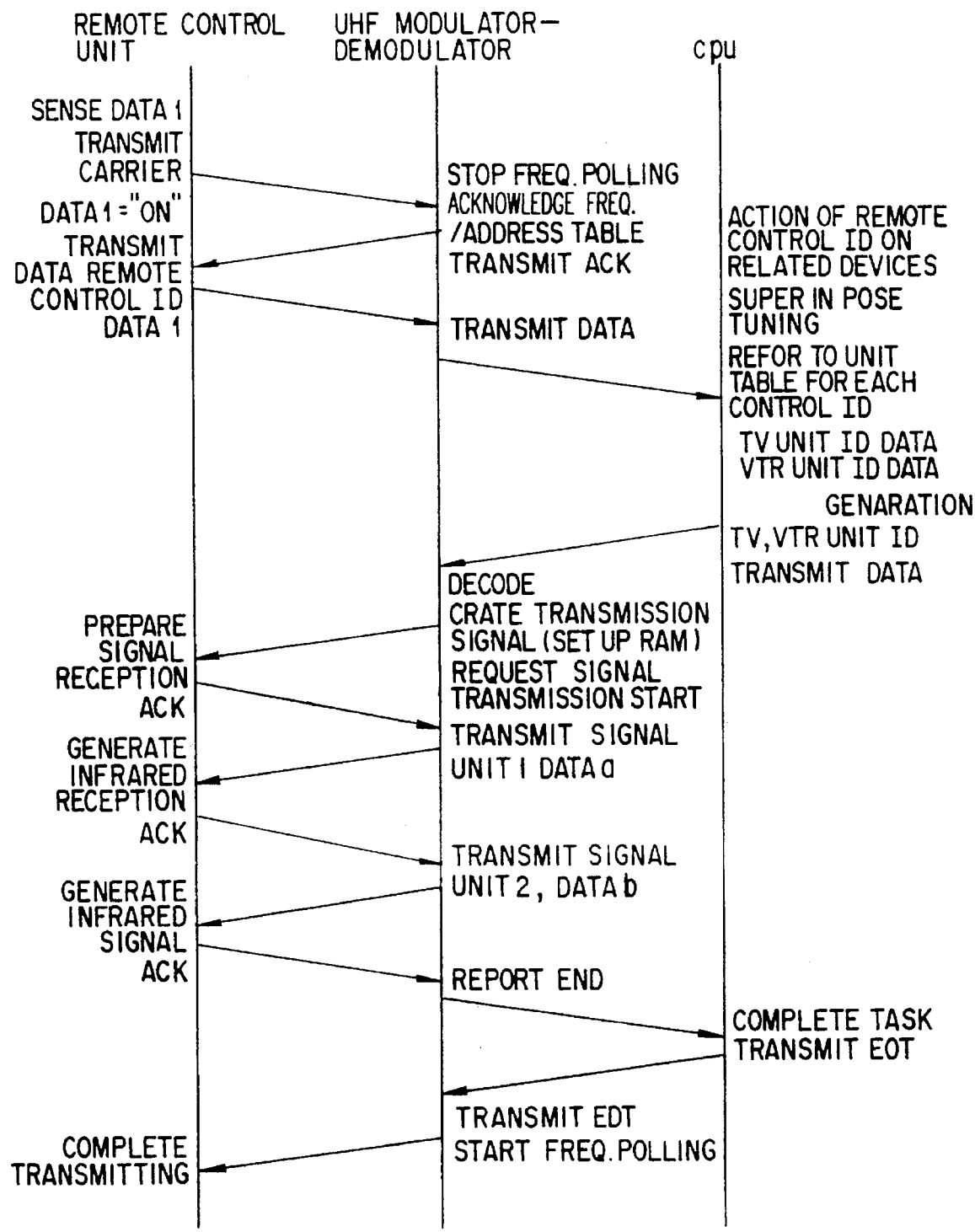
FIG. 19 shows an example of the control operation at the remote control unit in FIG. 1.

FIG. 18 shows the operation of tuning out from one pay channel to another, which is performed within the HIB without influencing the other units. FIG. 19 helps explain the on/off operation of a power supply as a typical example of having an effect on other units such as TVs or VTRs. For the sake of convenience, explanation will be given in connection with the remote control unit 601 (FIG. 1), the UHF modulator-demodulator 544 (FIG. 2), and the CPU 525 (FIG. 3). Actually, however, the data transmission from the UHF modulator-demodulator 544 to the CPU 525 is effected with the two-way communication section 521 (FIG. 3), the external bus 511 (FIG. 3), and the external bus control section (FIG. 3) intervened between them. The system between them is completely transparent and no information is added at all.

In FIG. 18, the microcontroller 811 (FIG. 4) that has sensed the subscriber entered a numeral from the keypad 818 (FIG. 4), sends a carrier at a frequency of, for example, f1 allocated by the variable frequency modulator 808 (FIG. 4). The microcontroller 830 of the UHF modulator 544 (FIG. 5), which has sensed the carrier in frequency polling as explained in FIG. 17, stops frequency polling. The analog switch 835 is changed to the microcontroller 830, which transmits an ACK signal. At this time, the microcontroller 830 refers to an address/frequency table and gives a remote control address to produce an ACK signal.

The remote control unit 601 that has received the ACK signal from the UHF modulator-demodulator 544, compares the added address with the address in the selfaddress holder 817 (FIG. 4) and then sends the data from the keypad 818. At this time, the remote control unit adds its own address to the ACK signal and transmits the resulting signal (preamble) when two or more control units send carriers simultaneously, they are identified by the address added to the ACK signal. The remote control units that have not been selected in the frequency polling continue sending the carrier at this time, waiting for the remote control unit now being served to complete its process.

The UHF modulator-demodulator 544 that has received the keypad data from the remote control unit 601 checks the frequency and address again and transfers the data on the results to the CPU 525 (FIG. 3) by way of the aforesaid path. The CPU 525 performs a suitable process, that is, in this case, hands over the keypad data for superimposing to the image display memory 522, which superimposes the data on the image of the TV frequency allocated to the remote control unit now communicating through the video/audio switch 515 (FIG. 3) (representation of the number in the first digit of the tuning channel). At the time when the series of processes has been completed, an EOT signal is supplied to the UHF modulator-demodulator 544 to terminate the communication.

The UHF modulator-demodulator 544 that has received the EOT signal transmits an EOT signal again to the remote control unit and then terminates the communication. The UHF modulator-demodulator restarts frequency polling at this time.

The sequence for entering a number in the second digit from the keypad 818 (FIG. 4) is shown in FIG. 18, and is almost the same as the operation described above except that the CPU 525 (FIG. 3) only changes the tuning channel. By this operation, the CPU of FIG. 3 catches the channel data to be received and the target display information. After this, a receiving unit, for example, unit 501 is controlled to change the reception channel. In this way, by suitably changing the permanent address holder 817 (FIG. 4) of the remote control unit 601 and the allocated frequency, radio interference is prevented in the communication between the remote control unit and the HIB. The adjacent HIBs are free from radio interference because of the layout of the head end.

Next, referring to FIG. 19, the operation with existing units such as TVs or VTRs will be explained.

The HIB system is provided with the function of controlling another unit by means of an infrared remote control unit. Explanation will be given, centering on this point.

As shown in FIG. 20A, such apparatuses as TVs or VTRs linked for each remote control unit are filed on the main memory 523 (FIG. 3) by unit IDs. Furthermore, the apparatus IDs are linked with actual TVs and VTRs according to an apparatus table filed on the main memory 523 as shown in FIG. 20B. It goes without saying that the apparatus table is used in connecting each of the subscribers' rooms to a remote control unit 601 and a VTR and a TV at the time of HIB installation. As shown in FIG. 20C, an apparatus ID/code table is also filed on the main memory. In the table, the code for each function is defined clearly. In most cases, the specification of an infrared remote control signal for apparatus ID is written in the program area of the microcontroller 830. In some cases, the specification is written in a by-apparatus remote control specification table 834, consisting of a RAM.

The apparatus table and apparatus ID code table are periodically updated on the subscriber database at the head end 100 to offer the latest data. For the infrared remote control signal specification that cannot be dealt with in the program area of the microcontroller 830 (FIG. 5), the CPU 525 (FIG. 3) inquires the subscriber database and loads the specification into the by-apparatus remote control specification table 834 (FIG. 5).

When the subscriber presses the on/off key on the keypad 818 of the remote control unit, the key data is transferred to the CPU 525 (FIG. 3) in the same sequence as in FIG. 18. The CPU 525 performs the tuning and superimposing processes described above, refers to the apparatus correspondence table for each remote control address on the main memory 523 (FIG. 3), and sends the apparatus ID to be controlled by an infrared signal and its data to the UHF modulator-demodulator 544 (FIG. 5).

Receiving this data, the microcontroller 830 (FIG. 5) creates a remote control signal corresponding to apparatus ID on the RAM 832 (FIG. 5), referring to the program area or the by-apparatus remote control specification correspondence table, and transmits a signal transmission start request to the remote control unit 601. The remote control unit 601 prepares for signal reception by setting up the A/D converter 812 (FIG. 4), clock generator 813, and RAM 814, and after the preparation, sends back an ACK signal to the UHF modulator-demodulator 544. In the UHF modulator-demodulator 544, a single remote control code for a single apparatus changes the analog switch 835 (FIG. 5) to the D/A converter 831. The microcontroller 830 controls the clock generator 836 to transfer data to the remote control unit.

In the remote control unit 601 that has received the remote control signal, the microcontroller 811 uses the A/D converter 812 (FIG. 4) and clock generator 813 to store the signal in the RAM 814. After the reception is complete, the microcontroller uses the clock generator 813 to perform a suitable speed conversion, and then uses the D/A converter 815 to convert into an analog signal again. Then, the microcontroller sends infrared rays at the light-emitting diode 816, and transfers a control signal to such an apparatus as a TV or a VTR. At the end of the transfer, the remote control unit 601 transfers an ACK signal to the UHF modulator-demodulator 544.

Thereafter, the UHF modulator-demodulator 544 transfers the control signals for the other related apparatuses to the remote control unit 601 one after another. When the UHF modulator-demodulator 544 has run out of data, an end notice is sent to the CPU 525 (FIG. 3). The CPU 525 transfers an EOT to the UHF modulator-demodulator 544 and remote control unit 601 to terminate the communication. At this stage, the UHF modulator-demodulator 544 restarts frequency polling as in FIG. 18.

As explained above, in this system, the HIB 500 is provided with a remote control learning function. The HIB 500 is connected to the subscriber database at the head end through a two-way communication line to update the information constantly. In addition to this, use of specification adding means enables almost all of apparatuses including TVs and VTRs to be controlled. The by-apparatus remote control specification correspondence table 834 has only to be defined for the remote control unit for an apparatus used by only one subscriber, so that a large-capacity memory is not needed, thereby reducing installation costs.

Explained next will be the operation of the expansion unit 604 (FIG. 1).

The expansion unit 604 is connected to the HIB 500 through a coaxial cable, and further connected to a telephone FAX. The expansion unit is placed between the telephone FAX and the HIB 500 to exchange image data.

FIG. 21 shows an embodiment of a system containing the expansion unit 604.

The data (hereinafter, referred to as downstream data) transferred from the HIB 500 to a facsimile machine (hereinafter, referred to as a FAX) is the image data used to make a hard copy by means of the printer function of the FAX. This data is the data obtained by converting a TV broadcast image signal into a transfer format to FAX at the printer format conversion unit 513 (FIG. 3) of the HIB 500. In the HIB 500, the compressed image data is expanded into a single frame of data for the NTSC system by means of the still-picture processing section 507. The expanded data is inputted via the external bus 511 to the printer format conversion unit 513, which format-converts the NTSC frame data into FAX data. The format-converted data is transferred via the common bus 511 to the two-way communication processing section 521, which transmits it to the expansion unit 604.

The data transferred from the FAX to the HIB 500 (hereinafter, referred to as upstream data) is the data read by the image data read function of the FAX.

The data communication method over the two-way cables between the HIB and expansion unit is as follows:

Modulation method: FSK

Transfer frequency: 20 MHz for upstream, 30 MHz for downstream

Transmission rate: 9.6 Kbps

The transmission frequency is a frequency in a data transmission band away from the band for TV broadcast signals. The transmission speed of 9.6 Kbps coincides with the transmission speed of the G3 facsimile machine widely used on a telephone network. The advantage of standardizing the transmission speed is that the communication control unit needs no buffer memory.

The downstream signal from HIB 500 passes through a branching filter 863 and enters a modulator 864, which demodulates it and supplies the demodulated signal to a microprocessor 866. The upstream signal outputted from the microprocessor 866 is modulated by a modulator 865, which sends the modulated signal to the HIB 500 via the branching filter 863. Receiving the data from the microprocessor 866, a communication control section 867 can control a switch 868 to effect on/off control between FAX 870 and the telephone line and connect FAX 870 to microprocessor 866. An address section 871 is connected to the microprocessor 866. In the address section 871, a unique address of the expansion unit 604 is set. An LED 869 is used to check the state of the switch 868 in transmitting data from FAX 870, for example.

Figure 22:
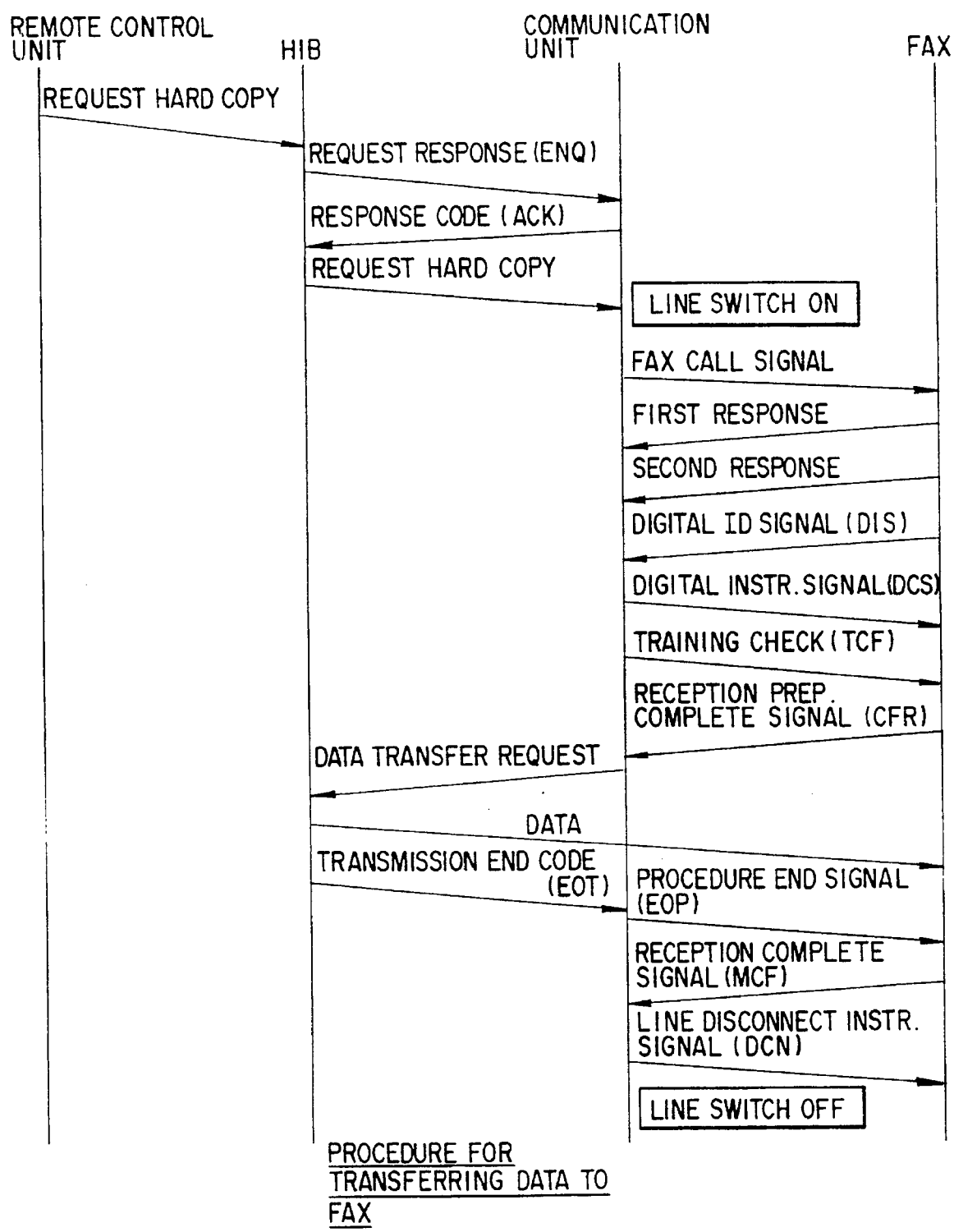
FIG. 22 is an explanatory diagram of the operation when a fax is controlled remotely via the expansion unit.

FIG. 22 shows the procedure for transmitting downstream data.

When a screen hard copy request occurs during TV watching, an instruction is given to the HIB 500 by means of remote control unit 601. Receiving this, the HIB 500 converts the image signal requested (the TV screen broadcast at the time when the copy request occurred) into the image data of FAX format, and sends a response request (ENQ) to the expansion unit 604.

The microprocessor 866 in the expansion unit 604 that has received the ENQ, outputs a response signal (ACK) to the HIB 500 to make sure that it is ready to communicate with the HIB 500. Receiving the response signal, the HIB 500 sends a hard copy request to the expansion unit 604. The microprocessor 866 in the expansion unit 604 reports this to the communication control section 867.

The communication control section 867, receiving this, changes the line select switch 868 to disconnect FAX 870 from the telephone line. After securing the telephone line, the communication control section executes the communication control procedure with FAX 870 as shown in FIG. 22. It goes without saying that at this time, when FAX 870 is communicating with an external public line, this procedure is canceled at this point. In that case, the message for TV 611 (FIG. 1) is offered to the subscriber by way of HIB 500.

The communication control procedure is the same as when FAX receives data from another FAX via a telephone line. The communication control section 867, receiving a reception preparation complete signal (CFR) from FAX 870, informs the microprocessor 866 that the data transfer preparation is complete. Receiving this, the microprocessor 866 sends a data transfer instruction to the HIB 500. The HIB 500 outputs image data in response to the instruction. The expansion unit 604 transfers data to FAX 870. The data received at FAX 870 is outputted on the printer of FAX 870. When completing the data transmission, the HIB 500 outputs a control code of EOT to end the transmission to the expansion unit 604.

When sensing the EOT, the microprocessor 866 of the expansion unit 604 sends an instruction to the communication control section 867 and terminates the communication with FAX 870 according to the procedure of FIG. 22. Finally, the communication control section 867 changes the switch 868 and completes the process.

Figure 23:
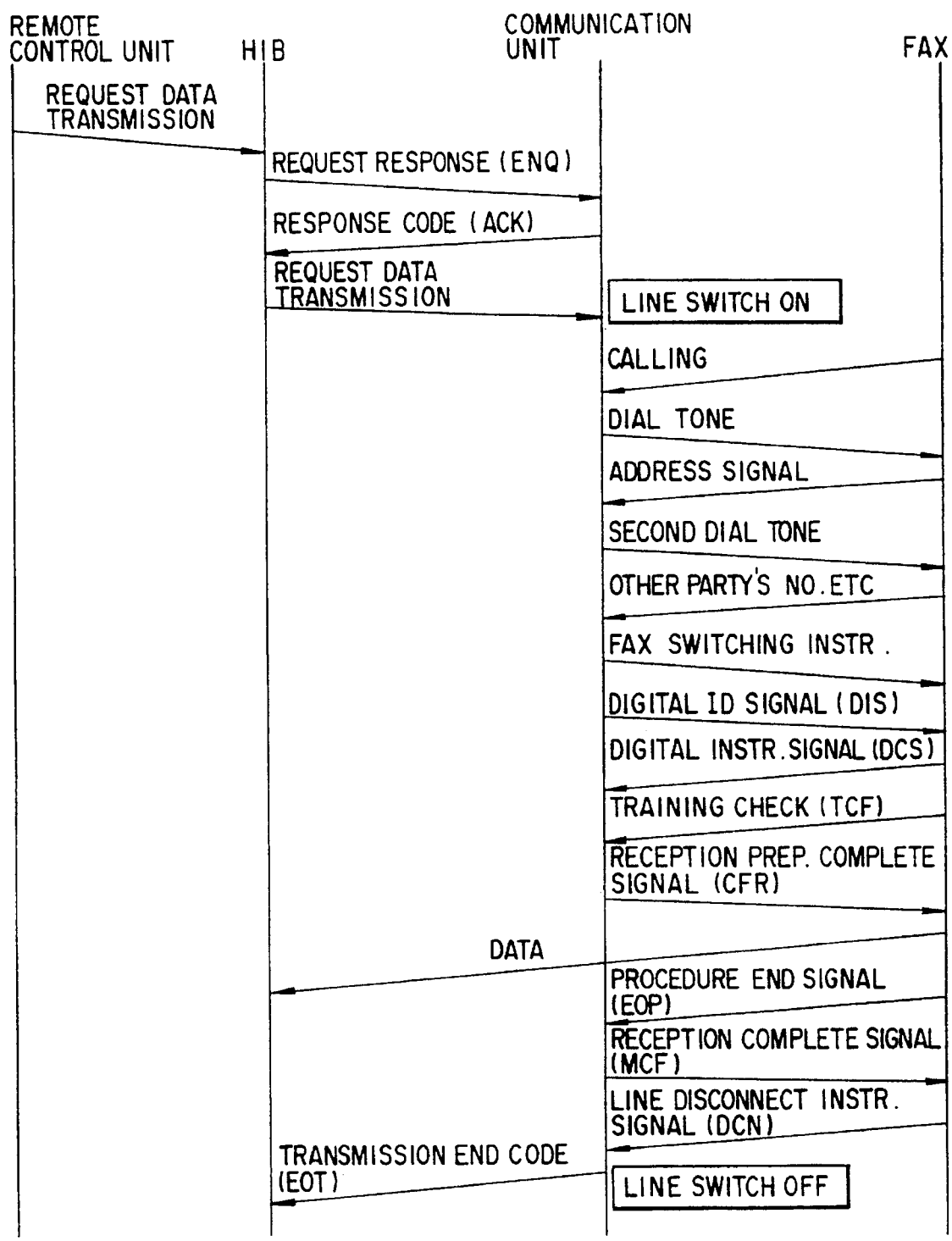
FIG. 23 is an explanatory diagram of the operation when data is transmitted from the fax through the expansion unit.

FIG. 23 shows the procedure for transmitting upstream data. The upstream data transmission procedure is almost the same as the downstream data transmission procedure except that they differ from each other in the direction of data transmission and the contents of control. The communication control procedure between expansion unit 604 and FAX 870 follows the control procedure between ordinary FAXes via telephone lines.

The data transmission from FAX 870 must be started after it is verified that the switch 868 has been turned on. The verification of the switch turning on is effected by means of an LED 869. The other party's number in FIG. 23 may be any number. The expansion unit 604 verifies that a given number has been received and sends a FAX switching instruction.

By the method as described above, communication is effected between the HIB 500 and FAX 870. Because the address section 871 in the expansion unit 604 identifies the expansion unit 604 during the above procedure, more than one expansion unit can be connected to the HIB. The operation at this time is completely the same.

Explained next will be parental control, a typical function of the CATV apparatus, will be explained. As described above, an ordinary NTSC signal is sent from the video/audio switch 515 (FIG. 3) to the NTSC-RF modulation units (516 to 518) in the form of a baseband signal, which transmit the signal to TVs via house wiring. In this system, two types of the NTSC-RF modulation unit structure can be used: a standard structure shown in FIG. 24A and a structure for parental control shown in FIG. 24B.

Figure 24A:
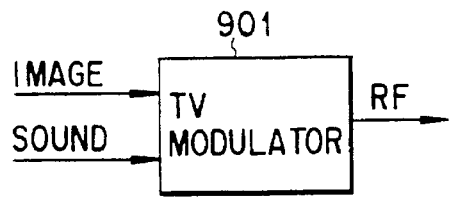
FIGS. 24A to 24C are a block diagram of the RF modulation unit when a parental unit is used and example of TV signal jamming carrier when the unit is used.
Figure 24B:
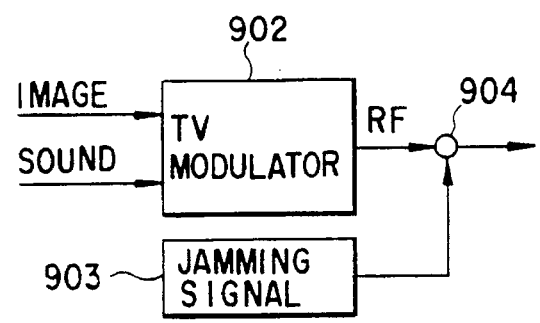
Figure 24C:
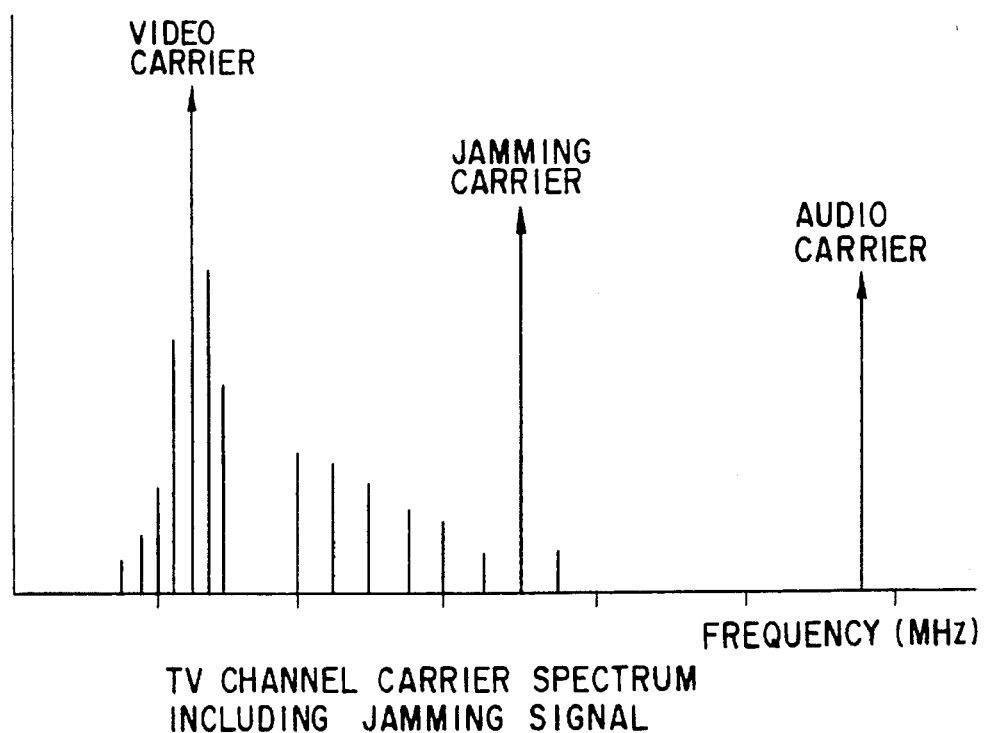

Specifically, when the RF modulation unit (TV modulator 901) of FIG. 24A is used, an ordinary analog broadcast signal is provided. When a parental control modulation unit (TV modulator 901, jamming signal generator 903, adder 904) is used, jamming carrier as shown in FIG. 24C is inserted. This prevents an ordinary TV set from receiving TV signals.

Figure 25:
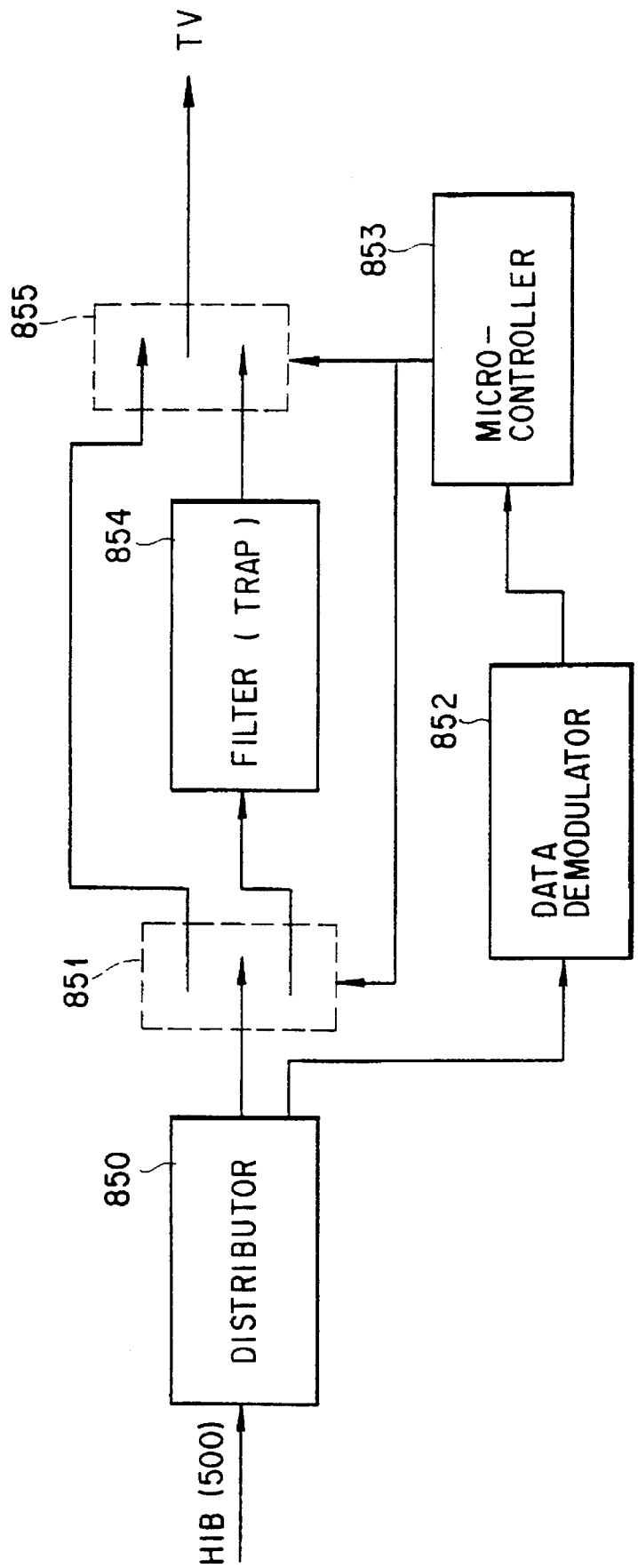
FIG. 25 is a block diagram of the parental unit.

FIG. 25 shows a structure of a parental unit 630.

The coaxial output from the HIB 500 is inputted to a splitter 850 via house wiring, which divides it in two, one of which is inputted to a data demodulator 852. This demodulator decodes it and inputs the decoded signal to a microcontroller 853. The other output of the splitter 850 is inputted into a selector switch 851. One output of the selector switch 851 is connected to one input terminal of a selector switch 855, and the other output of the selector switch 851 is connected to an input terminal of a trap filter 854. The output of the filter 854 is connected to the other input terminal of the selector switch 855. The output of the selector switch 855 is supplied to a TV 611 via a coaxial cable.

In the operation of the parental function, the channel placed under parental lock by the subscriber via the remote control unit is listened in by using a code number, for example. When the subscriber selects a channel with a code number, the CPU 525 in the HIB 500 instructs the microcontroller 855 (FIG. 25) to turn switches 851, 855 to the filter 845 via house wiring. This eliminates only jamming carriers from the TV signal of FIG. 24(C), thereby enabling the subscriber to watch a program on an ordinary TV set.

As with a conventional CATV apparatus, the switches 851, 855 is turned to the trough position, when the CPU 525 (FIG. 3) has judged that the subscriber finished watching the program while in the drawings, the NTSC system has been explained, the same operation can be effected in HDTV transmission using a QAM signal by preparing an image frequency in an internal tuner of a TV set as jamming carrier.

FIG. 26 shows the outer appearance of HIB 500. In the external case 950, board-like function units 95(1), 95(2), . . . 95(n) can be added. When function units are inserted, they are connected to the external bus and their physical addresses are determined automatically.

(SECOND EMBODIMENT)

Figure 27:
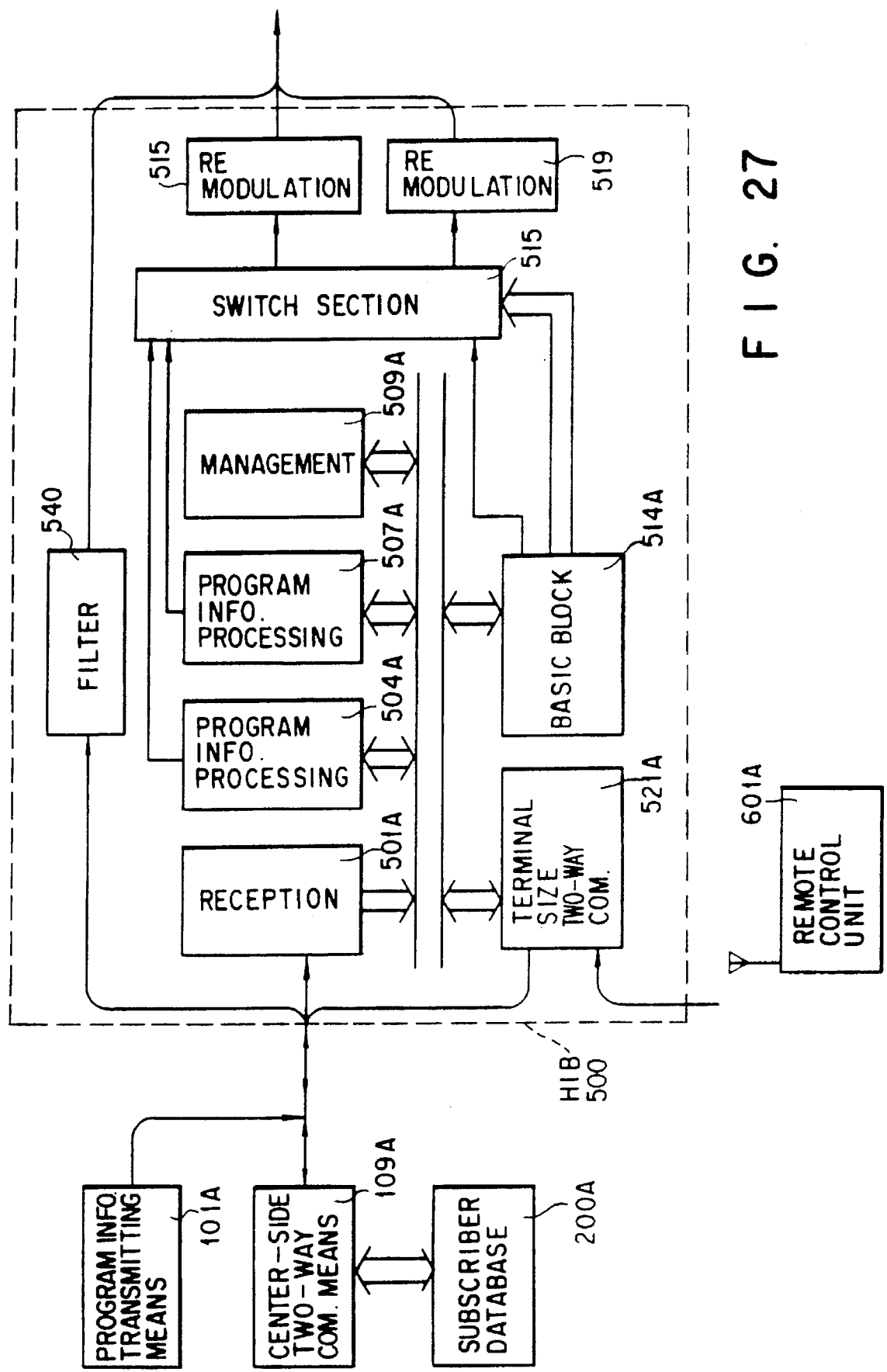
FIG. 27 is the overall block diagram of a CATV system according to the present invention.

FIG. 27 is a schematic diagram of a CATV system according to the present invention. The invention is featured in that the basic structure of HIB 500 is divided into the basic block 514A centering on a common bus 511 and the other function block.

The center side is provided with program information transmitting means 101A for transmitting program information including a plurality of TV signals and center-side two-way communication means 109A for exchanging data with a subscriber database 200A and also transmitting and receiving data with the outside world. The output terminal of the program information transmitting means 101A and the transmission/reception section of the center-side two-way communication means 109A are connected to a two-way transmission line. The other end of the two-way transmission line is connected to HIB 500.

HIB 500 has a common bus 511. The external terminal of a receiving block 501A is connected to the two-way transmission line and receives program information from the program information transmitting means 101A, digitizes it, and outputs the digitized signal to the common bus 511. A terminal-side two-way communication block 521A has its external terminal connected to the two-way transmission line and its internal terminal connected to the common bus 511, and exchanges data with the two-way communication means 109A and also transmits and receives data with a remote control unit 601A. Program information processing blocks 504A, 507A process the reception program information received and outputted by the receiving block 501A to the control bus 511. A management block 509A is connected to the common bus 511, stores the management data on each block, and gives at lest timing setting data to each block in order to manage the address on the common bus of the receiving block 501A, the output timing of reception program information to the receiving channel and the common bus, the input/output timing of the address on the common bus of the terminal-side two-way communication block 521A and the data on the common bus, the taking-in timing of the address on the common bus of each of the program information processing blocks 504A, 507A and the reception program information on the common bus, and the contents of the process. A switch section 515 is supplied with the processed program information processed at a plurality of program information processing blocks 504A, 507A. The basic block 514A has its data input/output terminal connected to the common bus. Its address on the common bus is fixed. The basic block has the function of grasping the physical addresses when each of the above-described blocks is connected to the common bus, the function of communicating data with the terminal-side two-way communication block 521A via the common bus, the function of entrusting as management data to the management block 509A the grasped address of each block, the channel select information obtained from remote control unit 601A through the data communication function, the specifying information specifying the contents of the process and the output destination of program information processing blocks 504A, 507A, and the function of controlling the select state of the switch section 515 on the basis of the specifying information. RF modulating sections 516, 519 are connected to the switch section and have each different modulation frequencies.

With the above-described CATV system, it is possible to expand the contents of CATV service, and keep up with the diversity of subscribers' needs. Furthermore, it is also easier to maintain, expand, and operate the system. In addition, the parental control function can be made simpler.

The head end 100 and the subscriber terminal unit (HIB) 500 have two-way communication means and are connected to each other via a two-way transmission line 701. The HIB 500 and subscriber remote control units 601 to 603 also have two-way communication means. The output of HIB 500 is supplied to various apparatuses (TVs, VTRs, etc.). The HIB 500 can exchange data with the expansion unit 604. To control various apparatuses with a remote control unit, the remote control unit communicates with the HIB 500, receives the necessary data under the control of the HIB 500, and together with the HIB 500, controls the various apparatuses.

As described above, with this system, expanding the contents of CATV service or meeting the increasing needs of the subscribers can be effected only by changing the number of or the functions of units detachably connected to the common bus. CATV operating companies can insert a unit to which a change is made into another subscriber's HIB, assuring maintainability and expandability. The effect of bit errors due to ghost arising from house wiring found in the prior art can be minimized, because the system is installed at the position of or closely near a protector. The subscribers are free from complex wiring and many remote control units found in a conventional CATV apparatus, without scarifying any functions coming with the conventional apparatus.

Explained next will be a remote control system effective in the above-described CATV system will be explained.

Figure 28:
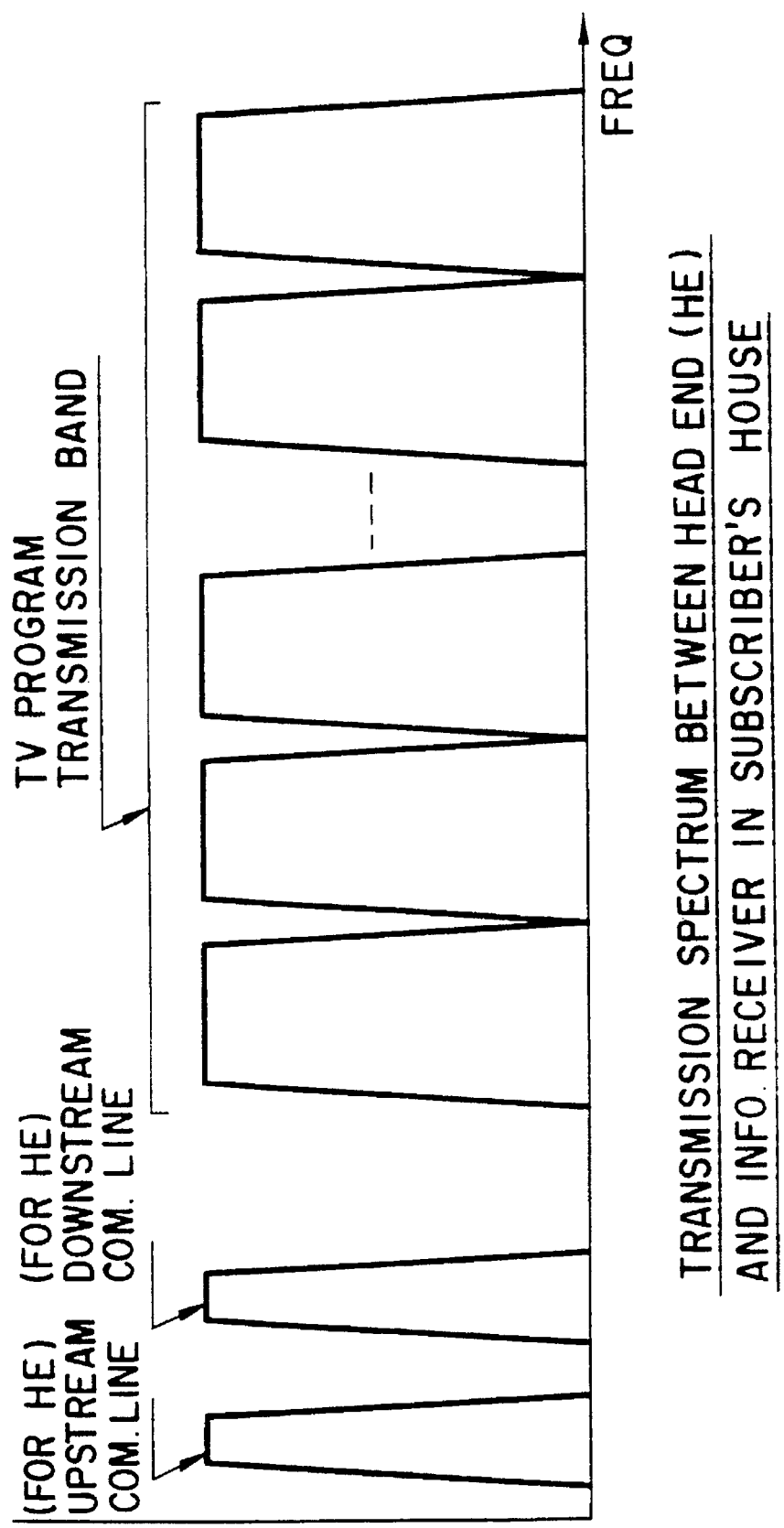
FIG. 28 shows the transmission spectrum between the head end and HIB to help explain the system operation in FIG. 1.
Figure 29:
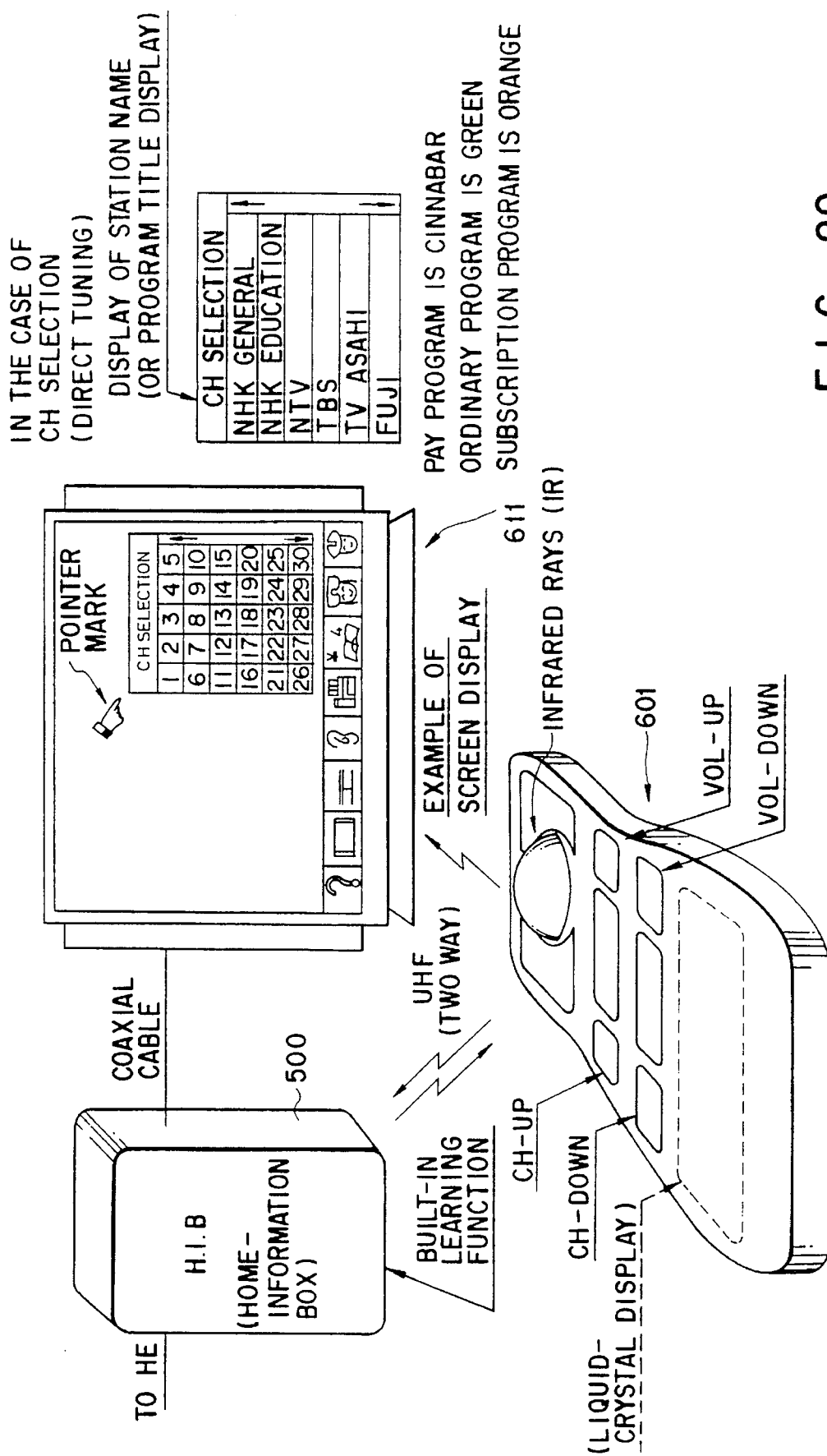
FIG. 29 shows the basic components of an embodiment of a remote control system according to the present invention.

FIG. 1 shows a configuration of a CATV system according to the present invention. FIG. 28 shows a frequency band used in a CATV system associated with the invention. FIG. 29 shows a use mode of a remote control unit according to the invention and a display mode of an interactive TV screen. FIG. 30 shows a structure of a remote control unit. Hereinafter, using these figures, explanation will be given.

In FIG. 1, a head end (HE) 100 contains a ground-wave broadcast receiving system 101, a satellite broadcast receiving system 102, and a subscriber database 200. The subscriber database 200 is used to refer to or update the contents of a subscriber's contract. The head end 100 is connected to a plurality of external database facilities 300 via public lines of telecommunication or ISDN lines 705. The external database facilities 300 include airlines and railway companies.

A program distribution network in the CATV system is constructed as follows.

The distribution network comprises a central station composed of the head end 100 serving as a source of providing pieces of information including TV programs and the subscriber database 200, a home information box in the subscriber's house (hereinafter, referred to as an HIB), an optical fiber trunk line 701 connecting the central station to the HIB 500, a photoelectric converter unit 702, and information transmission lines composed of coaxial cables 703 (coaxial lead-in cables to the subscriber's house).

FIG. 28 shows the transmission spectrum on the optical cable trunk line 701. In addition to the TV program transmission band, a data channel band (upstream communication channel, downstream communication channel) for communication between head end 100 and HIB 500 is also set in the two-way transmission band. Specifically, the downstream data from the head end 1000 to HIB 500 also undergoes QPSK modulation and is mixed with the aforementioned pay and free broadcast signals etc. The resulting signal then undergoes light AM conversion and is sent to the light output terminal of the head end 100. The upstream data from HIB 500 is demodulated at the QPSK modulator in the head end 100 and the modulated signal is directed to the control computer. The light input terminal of the head end 100 is connected to the QPSK data demodulator via a photoelectric converter. The head end 100 allows star connection and has a plurality of light input terminals and a plurality of light output terminals corresponding to the light input terminals. The figure shows an example of using one of them.

The HIB 500 receives the information transmitted and decodes or descrambles it. Then, the HIB 500 converts the demodulated TV signal into the TV frequencies allocated to the individual TV sets (hereinafter, abbreviated as TVs) 611, 612, 613, and transmits them via indoor coaxial cables 620, 621, 622, 623, 624, 625, 626, etc., as explained earlier. While in the figure, the HIB 500 is install outside the subscriber's house, the installation place is not limited to this. For example, it may be installed inside the subscriber's house.

The TV sets 611 to 613 in the house are previously provided with corresponding remote control units (hereinafter, abbreviated as RCUs) 601 to 603.

The RCUs (601, 602, 603) are each given addresses for identification. Using a bandwidth of 1 MHz in a 454-MHz band, communication from HIB 500 to RCUs (601, 602, 603) is effected. Furthermore, using a bandwidth of 1 MHz in a 454-MHz band, communication from RCUs (601, 602, 603) to HIB 500 is effected. That is, HIB 500 also functions as a remote control information managing unit, which will be seen from the explanation given later.

Using RCU 601 as the representative of RCUs (601, 602, 603), a use is shown in FIG. 29.

The RCU 601 is provided with a device which senses directions and is represented by a track ball with a sensor for sensing movements in three axes of x, y, and z. By using the track ball, an operation menu screen is displayed on the corresponding TV 611. The menu screen is linked with the track ball operation to effect major operations interactively. To require direct operations, a volume control keypad and a program channel keypad are provided. The x, y, and z direction sensed by the track ball provided for the RCU 601 correspond to movements in the horizontal, vertical, and depth directions respectively, on the TV display on which the corresponding menu screen appears.

FIG. 30 shows an internal arrangement of the RCU.

The track ball 650 comprises movement sensing sensors 652, 653, 654 in the respective directions, a movement sensing ball 651, and a counter pulse generating section 666 for generating pulses according to the movement. When the subscriber touches and rotates the movement sensing ball 651, the pulse generating section 666 of the track ball 650 produces as many pulses as corresponds to the movement of the movement sensing ball 651. These pulses are supplied to a multiplexer 659 in the form of x, y, and z signals.

The pulse generating section 666, which is composed of counters 655, 656, 657, is supplied with clock pulses CP periodically supplied from a timing generating section 660 and clear pulses CLR for resetting the counter.

The instruction data transmitting operation from the RCU to the HIB 500 is effected according to the following procedure.

The output of the track ball 650 (x, y, and z data) generated by the subscriber's operation is given in time division to the timing generating section 660 via the multiplexer 659. The timing generating section 660 perform time-division control of the multiplexer 659. When the contents indicates by the x, y, and z data arrived remain unchanged, that is, the number of pulses is zero, the timing generating section resets the counter in the pulse generating section 666 at a specific period. When the number of pulses is not zero, the identification number of the RCU is read from an ID memory 658 in which the RCU identification code is stored. The timing generating section 660 adds the data items x, y, and z to the identification number, attaches a transmission start code, and then transmits the resulting signal to a transmitting section 661. The transmitting section 611 converts the signal into a serial transmission form determined between this section and the HIB 500, then into an FSK signal, and transmits the resulting signal in the form of an electromagnetic wave at a transmitting frequency of Fun (n=1, 2, 3), where n corresponds to each of RCUs 601, 602, 603.

The operation of receiving the data transmitted from the HIB 500 to RCU is effected according to the following procedure.

The received Fu 5 electromagnetic wave is received by a receiving section 662, which FSK decodes it and inputs the decoded signal to the timing generating section 660 and to an RF/IR converter 664. The timing generating section 660 judges whether or not the supplied data is the remote control code for controlling an apparatus other than the RCU. If it is judged to be the remote apparatus control code, the timing generating section operates the RF/IR converter 664, which converts data into IR (infrared rays) form and sends the converted signal at an IR light-emitting section 665. This makes it possible to control such apparatuses as TVs or VTRs.

The RCU has a communication function of transmitting command codes or instruction data in electromagnetic waves to the HIB 500. An IR format table memory 663 is connected to the timing generating section 660. The memory 663 is used to perform code conversion using the table in the memory when the HIB 500 itself does not directly manage the infrared remote control codes unique to controlled apparatuses (e.g., TVs or VTRs).

Figure 31:
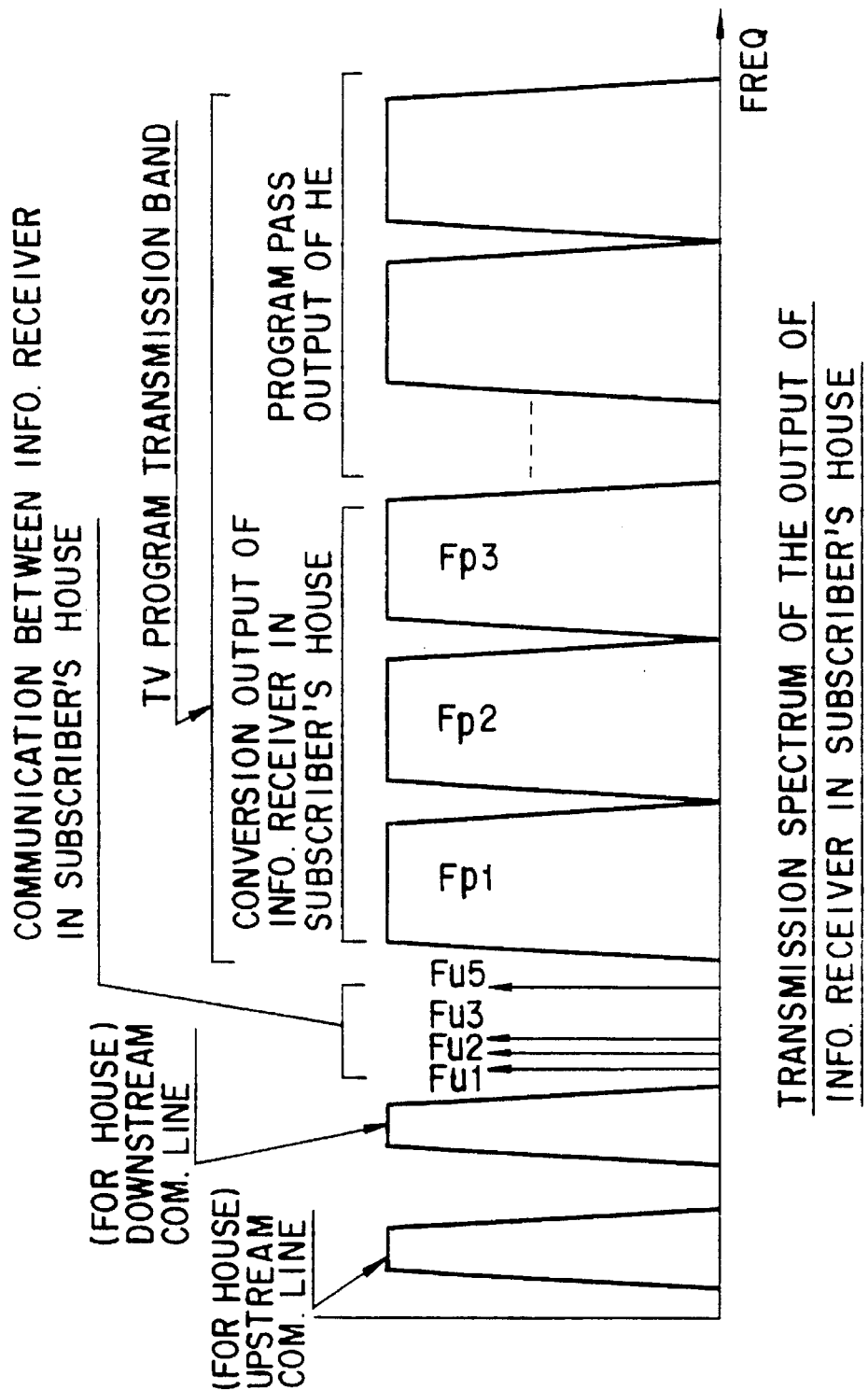
FIG. 31 shows the transmission spectrum between the RCU and HIB in FIG. 29.

FIG. 31 shows the layout of communication frequencies between each RCU and HIB 500. The RCUs 601, 602, 603 transmit in bands of Fu 1, Fu 2, Fu 3, respectively. On the other hand, the HIB 500 transmits to the RCUs in a band of Fu 5. These communication bands are placed outside of the band including TV program transmission channels. Fu 1, Fu 2, Fu 3 and Fu 5 may, of course, be contained in part of the house upstream and downstream communication lines.

FIG. 29 shows a TV screen display as an example of interactive operation. On the TV screen, symbol marks (function marks) indicating different functions or characters indicating simplified forms of functions are displayed in a small area at the bottom or the screen. By moving the track ball with fingers to move the specifying mark onto any of the symbol marks or characters in the small area, and then pressing the track ball, the execution instruction for the function is generated, and on the basis of the select result and the execution instruction, instruction data is produced. Then, on the basis of the instruction data, the modulated electromagnetic wave is transmitted to the HIB 500, which control a remote apparatus.

Figure 32A:
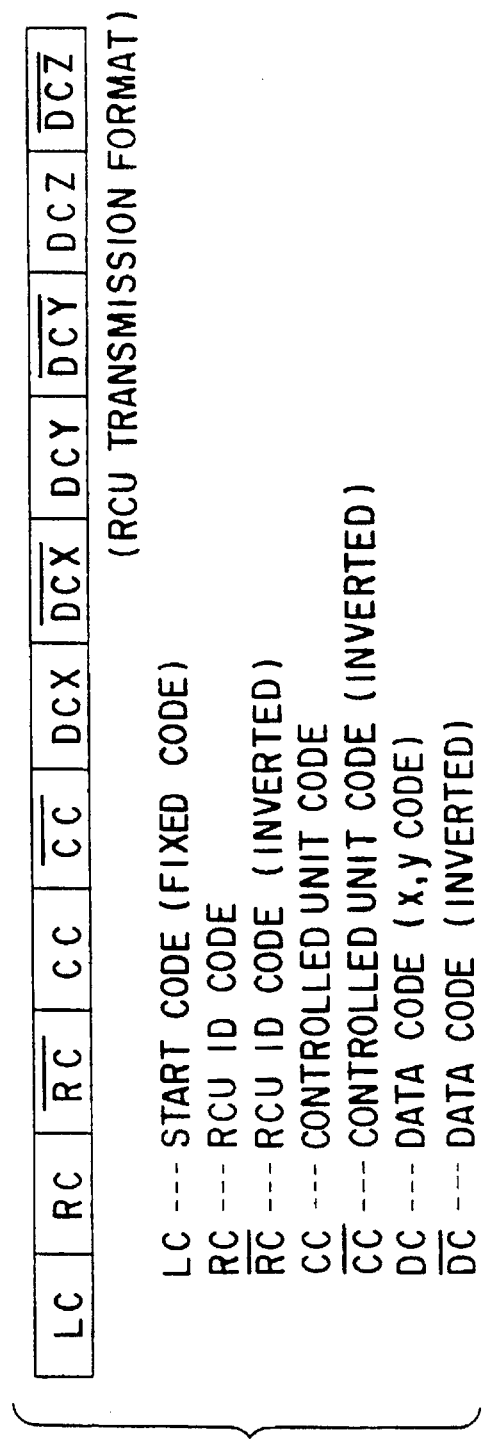
FIGS. 32A and 32B show an example of a data transmission format between the RCU and HIB.

The transmission code (upstream RCU code) from the RCU to the HIB 500 is transmitted in the format shown in FIG. 32A. Specifically, following a start code LD, an RCU identification cod RC, a controlled apparatus code CC, and a data code DC, each of which contains a specified number of bits, are transmitted serially in that order.

Figure 32B:
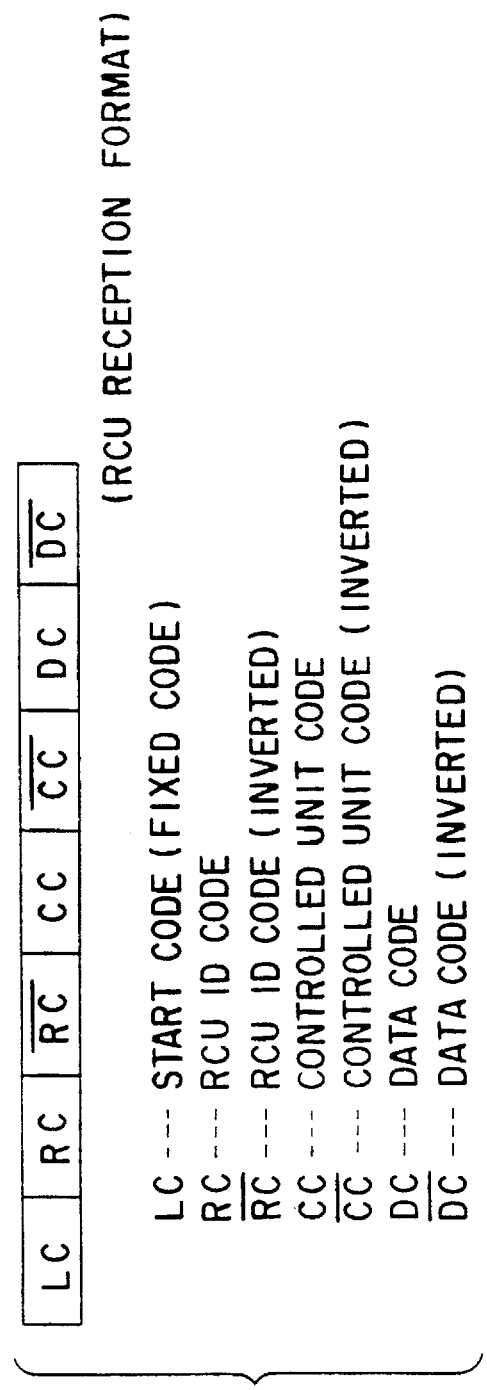

When having received the upstream RCU identification code transmitted from the RCU, the HIB 500 determines an RCU with which it should communicate, and then sends the remote control code for the controlled apparatus specified (e.g., a TV or a VTR) in electromagnetic wave. The transmission code for each of the RCUs is transmitted in the format shown in FIG. 32B. Specifically, following a start code LD, an RCU identification cod RC, a controlled apparatus code CC, and a data code DC, each of which contains a specified number of bits, are transmitted serially in that order. The data code DC also contains a start code corresponding to a by-model remote control code.

The electromagnetic wave transmitted from HIB 500 to the RCU directly manages the timing of transmitting the infrared by-apparatus code issued from the RCU. Specifically, when the remote control code for at least a controlled apparatus is transmitted, the remote control code for the corresponding controlled apparatus transmitted from the RCU is modulated in electromagnetic waves with the data period timing, and the modulated signal is transmitted. The RCU receives this, modulates the infrared rays for each of the remote control codes for the controlled apparatuses other than the start code and RCU identification code, and then transmits the resulting signal to each apparatus.

Figure 33:
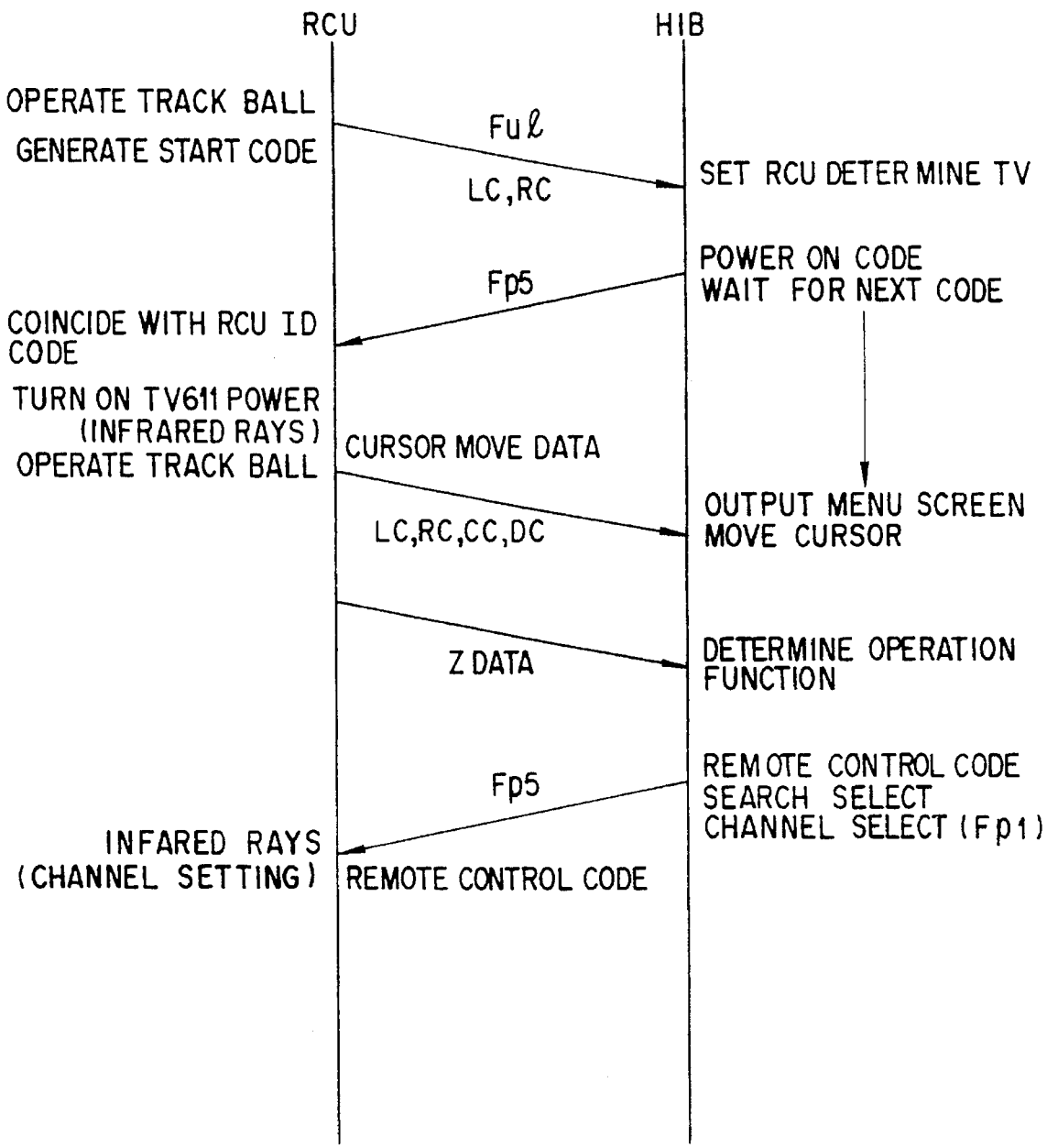
FIG. 33 is an explanatory diagram of data transmission and reception between the RCU and HIB.

FIGS. 33 and 34 show the procedures for communication between RCU and HIB 500.

Communication by means of the RCU is effected in the following procedure. As an example, steps ranging from turning on TV 611 to specifying a channel will be explained.

When the track ball of the RCU 601 is operated with fingers, the rotation or movement of the track ball is sensed. From the sense result, an operation start code is automatically created in the RCU 601. On the basis of the created operation start code, an operation start code LC and an RCU identification code RC unique to RCU 601 are transmitted from the RCU 601 to the HIB 500 in a frequency band of Fu 1 shown in FIG. 31. Then, HIB 500 receives the signal from RCU 601 and determines the RCU 601 to be communicated with from the reception frequency Fu 1 and RCU identification code RC, and at the same time, identifies the corresponding TV 611. Then, the HIB 500 transmits the RCU identification code, apparatus code, and data code (for turning on TV 611) to RCU 601. The RCU 601 receives the RCU identification code transmitted in a band of Fu 5, and compares it with the RCU identification code that RCU 601 itself holds. If the comparison result shows correspondence, it receives the apparatus code and remote control data code following the RCU identification code, and on the basis of the received apparatus code and remote control data code, modulates the infrared rays generated in the RCU 601, and transmits the modulated signal as power on information to the TV 611.

This causes the power supply of the TV 611 to be turned on automatically, thereby setting the reception channel.

Next, the HIB 500, as shown in FIG. 29, transmits a menu screen (the apparatus select menu at the bottom of the screen) onto the reception channel, displays it on TV 611, and waits for a subsequent input. The menu screen is obtained by superimposing the data stored in the memory within the HIB 500.

When the menu screen appears on the TV, the user can operates the track ball to select the desired controlled apparatus (e.g., TV 611 or VTR 614). When the specifying mark comes over the desired function mark, the user presses the track ball in the z direction. This allows the HIB 500 to catch the controlled apparatus code CC (apparatus code for TV 611 or apparatus code for VTR 614). Then, the HIB 500 can search the apparatus code storage section for the remote control code for the target apparatus. When the controlled apparatus is TV 611, the channel select menu screen (the upper right in FIG. 29) appears. When it is a VTR, a menu screen necessary for VTR operation, for example, power on, picture recording, playback, and timer reservation, appears. When the selection of the specifying mark (power on, picture recording, playback, timer reservation, etc.) is effected, the HIB transfers the remote control data code for effecting remote control of the target controlled apparatus to the RCU 601. Then, the RCU 601 converts the remote control data code into modulated infrared rays, and transmits the remote control signal to the controlled apparatus. A TV or VTR receives the modulated infrared rays emitted from the RCU 601, and on the basis of the remote control data code, starts its own function. In the case of TV 611, because the power is already turned on before the menu screen appears, the menu display channel select operation will be effected after the function is started up.

The HIB 500 contains an apparatus code storage section for storing the remote control data codes for the previously entered individual controlled apparatuses, and an RCU code storage section for storing the RCU identification code for each RCU.

When TV 611 is used, the HIB 500 sends a function select menu screen to TV 611 through Fp 1 channel (FIG. 31) to display a channel select menu screen.

When the user operates the RCU 601 to move the cursor according to x, y data and presses the track ball in the z direction at the position of the desired channel number, the HIB 500 catches the channel that the user wants. Then, the HIB 500 adds the remote control data code for TV 661's reception channel setting to the start code, RCU identification code, and controlled apparatus code and transfers it to the RCU 601 through Fu 5 band. As in the above operation, the RCU 601 receives the RCU identification code transmitted through Fu 5 band, and compares it with the RCU identification code that RCU 601 itself has. If the comparison result shows correspondence, it receives the apparatus code and remote control data code following the RCU identification code, and on the basis of the received apparatus code and remote control data code, modulates the infrared rays generated in the RCU 601, and transmits the two codes to the TV 611. The TV 611 receives the modulated infrared rays emitted form the RCU 601, and on the basis of the remote control data code, sets so as to receive its own channel Fp 1.

Executing such a series of operations instantaneously and automatically makes the subscriber feel as if he was operating the TV directly.

In the system, more than one RCU are managed. To avoid erroneous operations due to radio interference, the RCU identification code for each RCU and its transmission frequency are previously set on the side of HIB 500.

Specifically, a temporary identification number and a temporary transmission frequency Fud are previously set for the RCU. By using a frequency of Fud from one RCU, a RCU setting request can be made for HIB 500. The HIB 500 receives this setting request, and if it is not entered yet, gives the correct RCU identification code and transmission frequency generation data to the RCU, and at the same time, stores them in the identification code storage section in the HIB 500. On the other hand, the RCU stores the given correct RCU identification code and transmission frequency generation data in the RCU identification code storage section in the RCU. Examples of the identification code storage section and the RCU identification code storage section is a rewritable ROM such as an EEPROM.

Another method is to build in an identification code setting switch in the RCU and set the switch to set an RCU identification code. Each RCU identification code is allocated the transmission frequency data on a corresponding electromagnetic wave. Setting the identification code determines a transmission frequency.

Figures 34A, 34B, 34C:
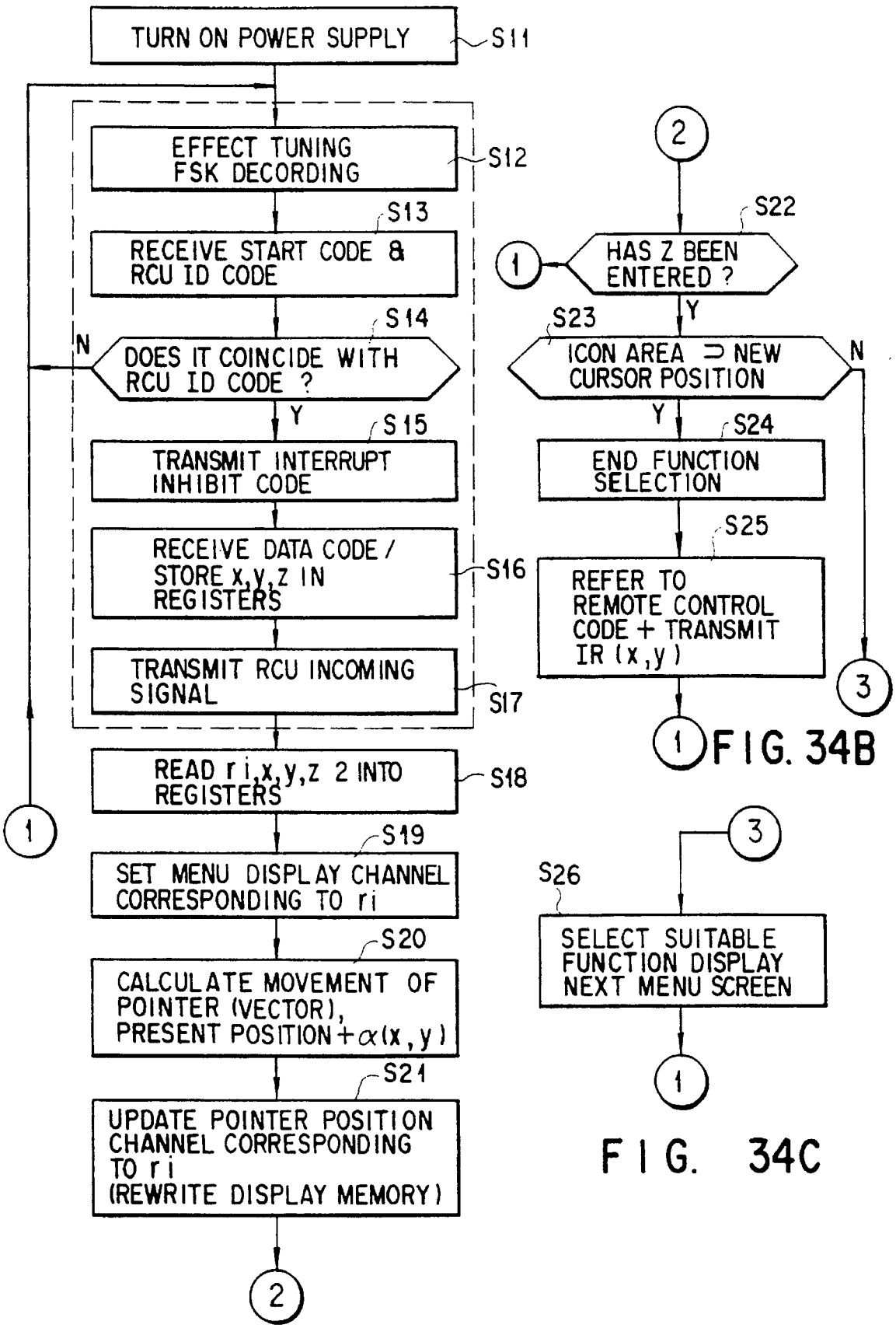
FIGS. 34A to 34C show an explanatory diagram of data processing procedure for the RCU and HIB.

Using the flowchart of FIGS. 34A to 34C, the operation of RCU receiving the data in electromagnetic waves from the RCU will be explained again.

Since the power supply is usually on, explanation will start at the step next to step S11. At step S12, the frequency corresponding to the transmission frequency of each RCU is selectively received and FSK decoding is effected. At step S13, a check is made to see if the received and decoded data has a start code. If a start code LC is present, then, an RCU identification code RC is sensed, and the sensed code is compared with the identification code of the RCU to be received. If an identification code which does not coincide with the predetermined transmission frequency is sensed (step S14), the operation will be started at step S12 again. AT this time, the reception frequency may be changed to receive a code from the next RCU.

If the identification codes of the RCU coincide with each other, the contents of the identification code are determined to be ri and stored in a register temporarily. At step S15, a transmission inhibit command may be sent to the other RCU. Next, at step S16, data of x, y, and z is received and each data item is stored in separate registers. At the time when the reception code set from the RCU is completed, a RCU incoming signal is sent to a computation block as shown in step S17. Receiving the signal, the computation block reads data of ri, x, y, z stored in the registers at step S18, and sets a menu screen transmission channel corresponding to ri at step S19. At step 20, the movement of the pointing mark (cursor) on the menu screen is computed, and at step S21, the pointing mark position is updated. At step S22, z information is checked to sense whether an input is present or not. If there is no input, or the value is zero, the operation will be started at step S12. If the value is not zero, when the updated position of the pointing mark on the menu screen is within the area indicated by the characters or icons, the function select operation will be terminated at step S24, and at step S25, the necessary remote control code (data code) for the target apparatus such as a TV or a VTR will be determined at step S25. This data code is transmitted to the RCU during communication. If the pointing mark is outside the area where the characters are displayed at step 23, the next menu screen is generated and displayed at step S26. The above series of operations is repeated.

Because at step S25, the remote control codes (data codes) necessary for the target apparatus such as a TV or a VTR, the HIB 500 may perform IR (infrared) modulation of remote control codes directly and transmit them to the TV or VTR to control them remotely. In this case, the installation place of HIB 500 is limited.

The operation described above will be explained in more detail with reference to the configuration of the HIB 500 in FIG. 35 and the RCU communication frequency band layout in FIG. 31.

Figure 35:
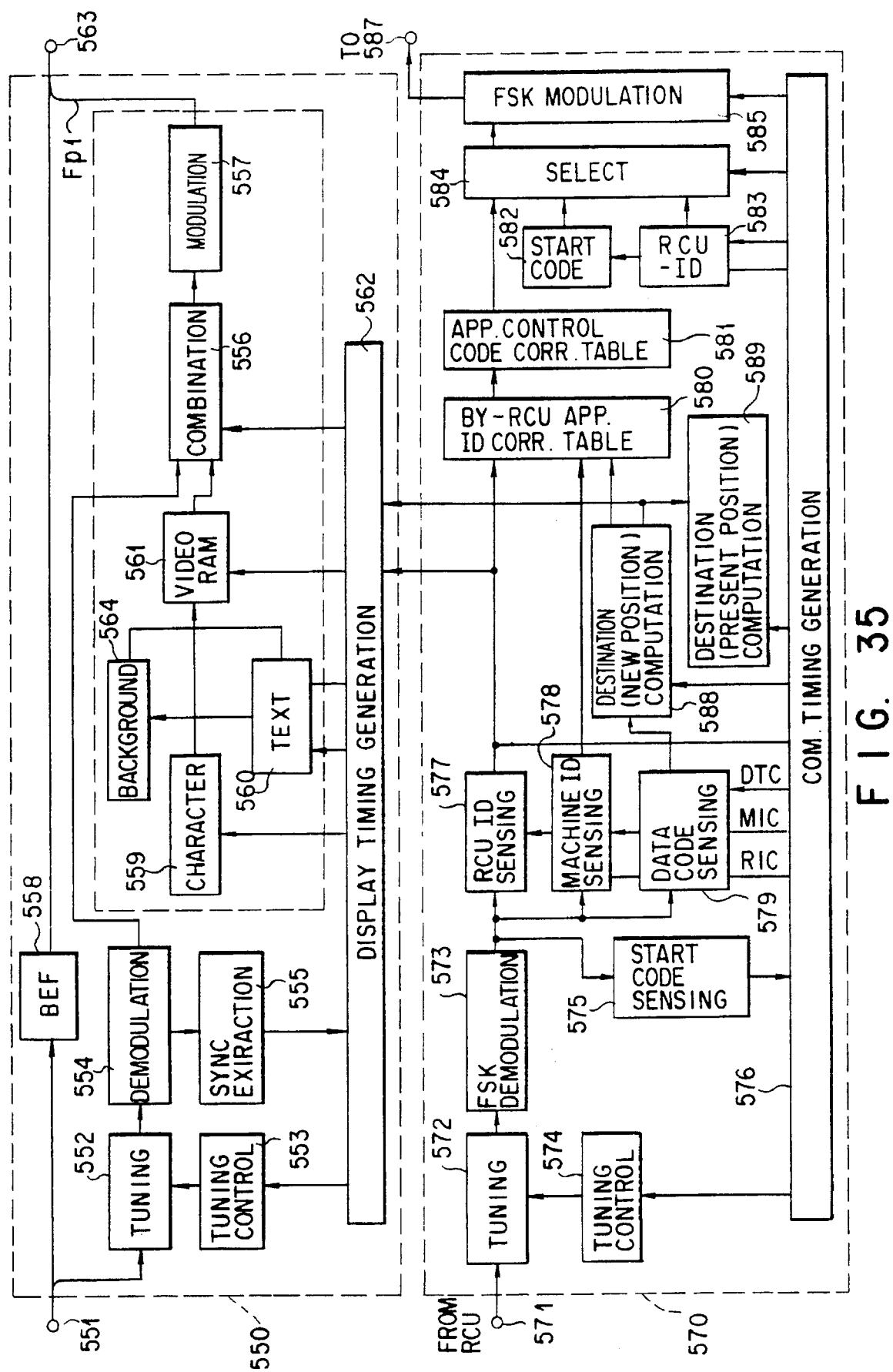
FIG. 35 is a block diagram of the HIB of FIG. 29.

As shown in FIG. 35, the HIB 500 is broadly divided into a display processing section 550 and a remote control transmission/reception section 570. A plurality of TV program signals are supplied from HE 100 of FIG. 1 to an input terminal 551, passes through a tuning circuit 552, and enters a demodulating circuit 554, which demodulates it into a baseband video signal. The tuning data is given from a tuning control circuit 553. The demodulated video signal is modulated again by a combining circuit 556 into an Fp 1 band channel, which is supplied at an output terminal 563 or to a TV or a VTR. A band limit filter (BEF) 558 suppresses Fp 1 band channel, combines the resulting signal with Fp 1 band channel outputted from the modulator 557, and transmits the combined signal to a TV or a VTR.

The electromagnetic wave Fu 1 emitted from RCU 601 is inputted to an input terminal 571, which supplies it to a tuning circuit 572, which tunes to the channel. The tuned signal is demodulated by an FSK demodulating circuit 573, which reproduces a code signal. The tuning circuit 572 time-division tunes in to and receives the frequency for which the RCU is entered. The tuning of the tuning circuit 572 is controlled by a tuning control circuit 574. One output of the FSK demodulating circuit 573 is sensed by a start code sensing circuit 575 for a start code. The sensed start code is given to a communication timing generating circuit 576.

The communication timing circuit 576, on the basis of the timing of the given start code, supplies code sensing pulses RIC, MIC, and DTC to an RCU identification code sensing circuit 577, apparatus ID sensing circuit 578, and data code sensing circuit 579 respectively, which sense an RCU identification code, a controlled apparatus identification code, and x, y, and z data codes, respectively. The output of the RCU identification code sensing circuit 577 is given as data for identifying the RCU to the communication timing generating circuit 576, which senses whether the data coincides with the entered RCU identification code. If they do not coincide with each other, the timing generating circuit resets data in the RCU identification code sensing circuit 577, apparatus ID sensing circuit 578, and data code sensing circuit 579.

The output of the data code sensing circuit 579, on the basis of x, y, z instructions, is given to a pointing mark destination computing section 588, which calculates the cursor destination on the menu screen. The computing section calculates the movement from the current pointing mark position stored in a destination storage section 589. The computation result is stored in the destination storage section 589 as a new destination and is supplied together with the RCU identifying data, the output of the RCU identification code sensing circuit 577, to a display timing generating circuit 562. The Fp 1 menu screen outputted from the modulator 557 corresponds to RCU 601 and TV 611. According to this, the pointing mark position moves on the menu screen.

The outputs of the RCU identification code sensing circuit 577, apparatus ID sensing circuit 578, and data code sensing circuit 579, which are the sense results of the respective codes, are inputted to an apparatus identification code correspondence table 580 which stores the controlled apparatus ID codes by RCU and are referred to for the manufacturers of the controlled apparatuses, the models, and the control codes. As a result of this, the controlled apparatus and the contents of control are determined. The information on the controlled apparatus and the contents of control is supplied to a controlled apparatus code correspondence table 581. This determines the control (remote control) code, which is inputted to a select circuit 584. The select circuit 584 is also supplied with the identification code for RCU 601 to which the remote control code should be sent and the start code for communication are supplied and arranges these in a specified format and outputs the resulting signal. The RCU identification code is outputted from an RCU identification code generating circuit 583, and the start code is outputted from a start code generating circuit 582. These codes are both given to the select circuit 584. The output of the select circuit 584 undergoes FSK modulation at an FSK modulating circuit 585, which transmits the signal in the form of electromagnetic waves in Fu 5 band.

The output of the RCU identification code sensing circuit 577 and that of the destination computing circuit 588 are also supplied to a display timing generating circuit 562. The display timing generating circuit 562 refers to the entered RCU identification code, reads the characters, text, and background color data constituting the desired menu screen from a (symbol) character storage section 559, a text storage section 560, and a background generating section 564 in order to display a function select menu on the aforesaid program frequency band Fp 1, and stores them in a video RAM 561. The menu screen data written in the video RAM 561 is read out with timing synchronizing with the vertical, horizontal, and subcarrier extracted by a synchronizing extraction circuit 555, and inputs the read-out signal to a combining circuit 556. The output of the combining circuit 556 is combined with the baseband signal obtained by demodulating the TV program signal, the output of a demodulating circuit 554, to produce the menu screen shown in FIG. 29.

In the explanation, when the remote control code to control an apparatus remotely is transferred from HIB 500, a start LC is sent first. The start code LC is a start code for a RCU to receive data. Therefore, when the RCU itself sends a remote control code to a controlled apparatus, it is necessary to add a new start code for the controlled apparatus to receive data again. To omit this process, a start code for the controlled apparatus may be inserted in front of the remote control code in sending a remote control code from the HIB 500.

A breakdown of communication code between the RCU and HIB 500 will be described.

While in the above explanation, the direct remote control code for control an apparatus remotely is obtained from HIB 500, an indirect remote control code may be stored in HIB 500 instead of a direct remote control code, and a direct remote control code may be stored in the storage section of the RCU. Specifically, the RCU, receiving an indirect remote control code, may read (decode) the direct remote control code for the target controlled apparatus from the storage section on the basis of the indirect remote control code.

FIG. 36 shows a communication code for each communication mode between RCU and HIB 500.

FIG. 36A shows an example of an RCU transmission format transmitted from RCU to HIB 500. The RCU sends transmission codes as follows: a transmission start code LC is first sent, followed by an RCU identification code RC read from the memory, a controlled apparatus code CC, and data codes DCx, DCy, and DCz in three directions indicating the movement, moving direction, and position corresponding to track operation in that order. The codes other than the start code LC are inverted or not inverted in transmission to assure accurate communication. The data code may represent more than one pieces of information on the movement, moving direction, and position. As long as the transmitted codes are matched between RCU and HIB 500 in terms of transmission format, each data item may take the inverted form or the non-inverted form.

The HIB 500, receiving the code, judges from DCx, DCy, and DCz codes which function on the menu screen has been selected, and then moves the pointing mark to the position indicated by the contents of each data code on the menu screen. On the basis of the result, the subscriber looking at the menu screen, moves the pointing mark to the area of the desired function mark, and presses the track ball of RCU to determine the selection. Immediately after this, the RCU transmits a selection decide instruction in the format of FIG. 36A to HIB 500 in the form of a change in data code DCz. The HIB 500, receiving this selection decide instruction, refers to the apparatus table set for each RCU to be returned, generates apparatus code CC, apparatus control data code DC, and RCU identification code RC for the target RCU, creates the format shown in FIG. 36B, and transmits electromagnetic waves toward the RCU through Fu 5 transmission band. The RCU, receiving this, then performs infrared modulation of an apparatus code CC for specifying an apparatus and a control data code DC and sends the modulated signal in the format shown in FIG. 36C. Specifically, the RCU itself senses an identification code RC coinciding with its own RCU identification code, extracts the apparatus code and data code DC following the identification code, converts these into modulated infrared rays to each of the controlled apparatuses, and radiates them to operate a TV, a VTR, or a LD in the house remotely.

Figure 37A:
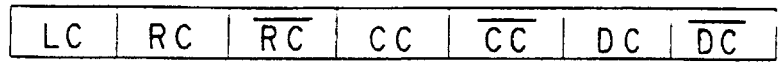
FIGS. 37A to 37C show another data transmission format.
Figure 37B:
Figure 37C:

The communication format between the RCU and HIB 500 may be as shown in FIG. 37. Specifically, instead of the three types of data codes shown in FIG. 36A, the corresponding apparatus code CC entered for each RCU as in the RCU transmission format of FIG. 37A, and the code DC corresponding to the selected function may be transmitted, the apparatus correspondence table for each RCU be referred to in the HIB 500, apparatus code CC, apparatus control data code DC, and identification number code RC for the target RCU be generated, the format shown n FIG. 37B be created, and electromagnetic waves may be radiated toward the RCU through Fu 5 transmission band. FIG. 37C shows the format of the data undergoing infrared modulation and transmitted from the RCU to the target RCU.

When the frequency of electromagnetic waves radiated by the RCU is fixed, or when there is no radio interference from adjacent houses, the RCU identification code RC may be omitted from the format shown in FIG. 37A.

Figure 38A:
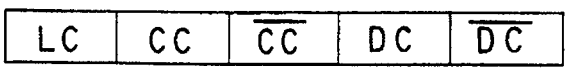
FIGS. 38A to 38C show still another data transmission format.
Figure 38B:
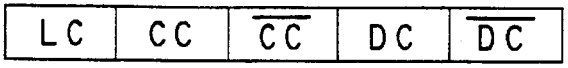
Figure 38C:
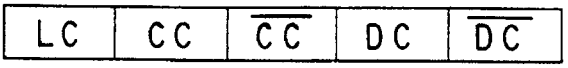

The form from which the RCU identification code RC is eliminated is shown in FIGS. 38A, 38B, and 38C. For the same reason, the RCU identification code may be eliminated from FIG. 36A.

While the method of directly controlling the transmission timing of the infrared by-apparatus code emitted from the RCU by means of the electromagnetic wave sent from HIB 500 to RCU has been explained, the following method may be used.

The electromagnetic wave transmitted from HIB 500 to RCU has only to be of the form that the RCU can receive and decode. Therefore, the HIB 500 can use a corresponding logical code with the RCU without directly controlling the transmission timing of the infrared by-apparatus code emitted from RCU. By inserting an IRF code specifying an infrared transmission form for a by-manufacturer code in the logical code, the transmission timing of the infrared by-apparatus code emitted from RCU is specified for RCU. In this case, the operation of RCU is as follows: using the infrared (IR) format conversion table 663 shown in FIG. 30, the reception data received at the receiving section 662 is converted into an IR format unique to a TV or a VTR in the timing generating section 660, which supplies the converted data to the RF/IR converter 664, which causes an IR light-emitting section 665 to control the apparatus.

Another approach may be used in which the RCU is provided with an infrared-ray transmission form converting section, the identification specified by the IRF code indicating an infrared transmission form or by the by-manufacturer code in the logical code received at HIB 500 is given to the infrared-ray transmission form converting section, the data bit length of the start code, apparatus code CC or CC' and control data code DC or DC' contained in the RCU code received at HIB 500 is converted at the infrared-ray transmission form converting section on the basis of the information, and the converted signal is transmitted to the controlled apparatus in the form of infrared rays.

Figure 39:
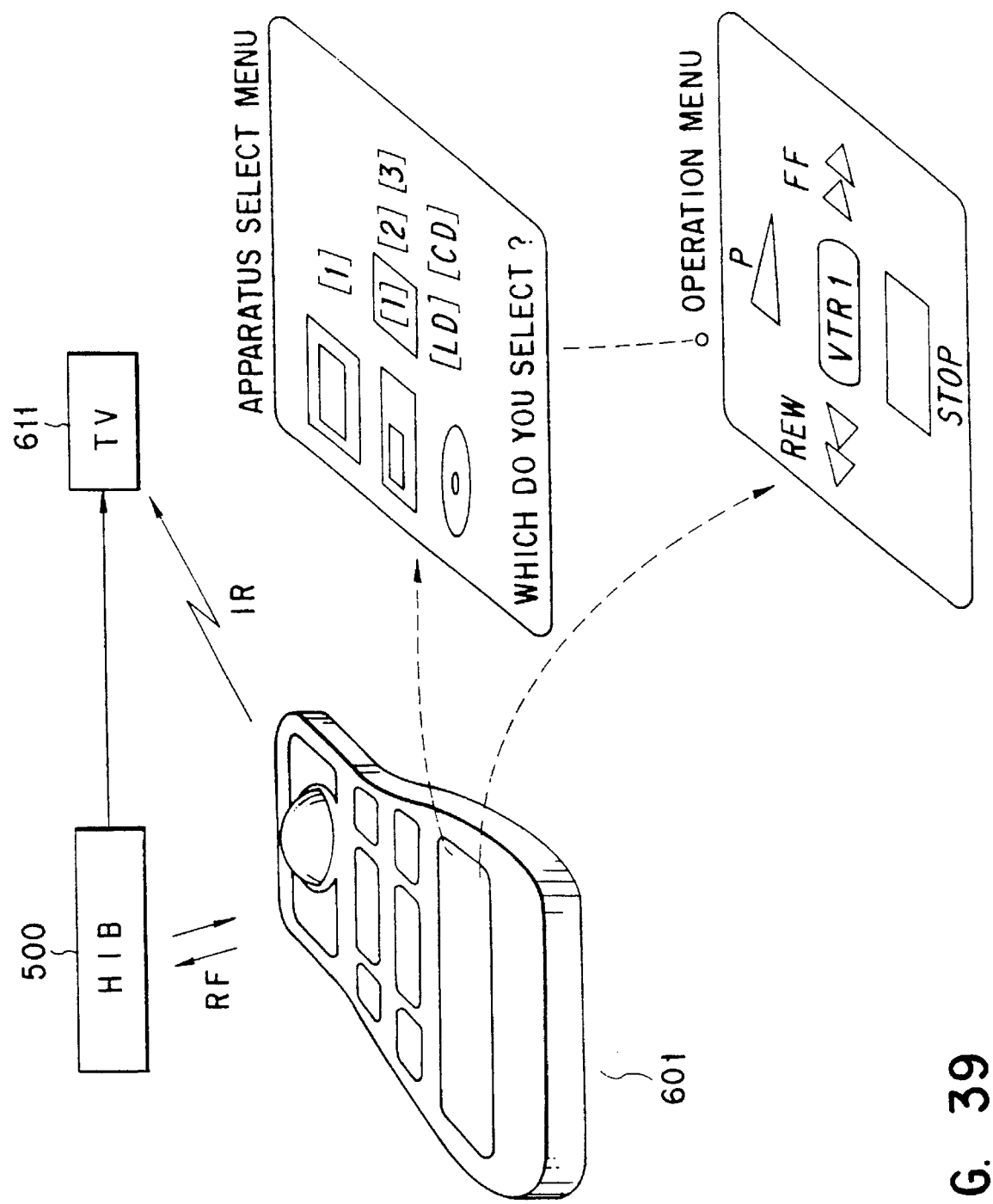
FIG. 39 shows another embodiment of the remote control system according to the invention.

In the above embodiment, for example, when a remote control request is made by RCU 601 to HIB 500, the circuit between RCU and HIB 500 is closed and the apparatus control code stored in HIB 500 is transmitted to RCU 601. Then, the RCU 601 can send infrared modulated waves to a TV or a VTR (the controlled apparatus) to control the function of the apparatus. After the circuit between the RCU 601 and HIB 500 has been closed and RCU 601 has transmitted x, y, and z data items to HIB 500, HIB 500 may directly control the apparatus by the modulated wave of infrared rays or electromagnetic waves. In this case, it is preferable that HIB 500 should be installed in the house. (Another embodiment) . . . Storing apparatus identification codes Using FIG. 39, a method will be explained which simplifies the operation procedure of the RCU when there are VTRs, LDs, and stereo sets in addition to a TV in the range that a single RCU can cover, for example, in a room.

The RCU comprises a liquid-crystal display panel section, a character generating section, a memory section for storing the apparatus identification code for selecting apparatuses such as VTRs, LDs, TVs, or CDs, and a display output section for generating an apparatus select menu screen that displays the characters indicating each apparatus stored in the memory section on the liquid-crystal display panel section. The characters or character strings corresponding to the apparatus identification code can be displayed on the liquid-crystal panel section on the RCU. A conversion table indicating the correspondence between the individual apparatus identification codes and the actual remote control code for controlling apparatuses is stored the apparatus identification code correspondence table for each RCU 580 (FIG. 35) in the HIB 500 and the apparatus control code correspondence table 581 (FIG. 35). The subscriber or viewer can select a character or character string on the liquid-crystal panel section and transmit the selected identification, that is, the apparatus identification code, to HIB 500. On the basis of the apparatus identification code received from RCU, HIB 500 refers to the by-apparatus code entered in the data memory section, creates operation menu information, and transfers it to RCU in the form of electromagnetic waves. On the basis of the transferred operation menu, RCU displays an operation menu on the liquid-crystal panel section. The viewer can operate the apparatus with the track ball or another operation keys.

Specifically, while in the previous embodiment, a menu screen appears on a TV, in this embodiment, it appears on the liquid-crystal display panel section of RCU at hand.

For example, on the apparatus select menu screen 670 displayed on the display panel of RCU, there are TV mark 671, VTR mark 672, and DISC mark 673 as the characters indicting the apparatuses entered for each RCU. The number displayed corresponds to the number of entries. In this example, next to a TV mark, [1] meaning one unit is displayed. Beside a VTR mark, (1), (2), and (3) are displayed meaning there are three VTRs. By a disk mark, (LD) and (CD) are displayed meaning there are a LD and a CD as disk apparatuses.

The menu screen for the apparatuses entered for each RCU is set for RCU by HIB 500 on the basis of the downstream RCU identification code in storing information in the apparatus identification code correspondence table 581 for each RCU (FIG. 35) in the HIB 500.

The viewer touches the track ball to select the desired apparatus on the display panel. When VTR (1) is selected, the apparatus identification code for the selected apparatus VTR (1) and the RCU identification code are transmitted from RCU to HIB 500 in the form of electromagnetic waves. According to the apparatus identification code and RCU identification code received, HIB 500 reads operation data from the RCU menu memory section of the apparatus identification code correspondence table for each RCU 580, and transfers it in electromagnetic wave.

The RCU expands the transferred operation data into an operation menu 680 on its display panel and displays it. The subscriber operates the apparatus according to the operation menu 680 on the display panel. From this time on, as in the previous embodiment, the remote control code corresponding to the operation is sent from the apparatus control code correspondence table 581, so that the viewer can control the VTR as if he was dialoguing with the specified controlled apparatus (in this case, VTR (1)).

As in the previous embodiment, the apparatus operation menu identification created by HIB 500 may be modulated into a specific channel in a TV signal format and transmitted onto house transmission wiring. Then, while looking at the apparatus operation menu on the TV, the user may control the apparatus to turn on and off TV power or set so as to receive a specific reception channel which display method is used depends on the necessity of TV, the operation procedure, and the number of menus. For example, when a CD is played back, it is not necessary to display on a TV, but when an LD or a VTR is played back, a TV is needed as a display destination.

Instead of sending remote control codes from the apparatus control code correspondence table 581 in each operation as described above, all of the remote control codes for the controlled apparatuses may be transferred to the RCU at the time when the controlled apparatuses are determined previously. This, however, requires the RCU to have a large memory capacity. Furthermore, to control another apparatus, it is necessary to provide an additional memory for storing the remote control code for another apparatus. Therefore, a method of transmitting the remote control code for the controlled apparatus from the HIB 500 each time operation is effected is convenient.

(Simplifying the display contents on the RCU's liquid-crystal display panel)

A simplified structure of the RCU has neither a liquid-crystal panel display section nor a character generating section. Specifically, the display contents on the RCU's display section is simplified, and with an operation menu displayed on the TV screen as in the previous embodiment, the viewer carries out remote control while watching the TV and the contents of the display on the RCU. In the LED display section on the RCU, the LEDs corresponding to the apparatus identification codes may be tuned on or the colors of the LEDs may be changed to indicate the apparatus to be selected.

According to this operation, the apparatus identification code corresponding to the RCU identification code and select operation is read from the memory, and sent to HIB 500 in electromagnetic waves.

The conversion table showing the correspondence between the individual apparatus identification codes and the actual remote control codes for controlling the apparatuses is stored in the entered data storage section in HIB 500. On the basis of the RCU identification code and apparatus identification code, the HIB 500 refers to the by-apparatus control codes entered in the data storage section, creates operation menu information in a TV signal format, modulates the menu screen into a specified channel, and transmits it onto house transmission wiring. At the same time, the HIB 500 controls the TV power, sets so as to receive a specific channel, and displays an apparatus operation menu on the TV. The subscriber or viewer selects the operation menu on the menu screen displayed on the TV and operates the track ball or other operation keys to select the apparatus.

In the RCU, at least either the manufacturer codes or the by-model codes may be stored instead of the apparatus identification codes. Of course, two or more of these three may be stored.

(Initial setting of apparatus control codes)

An initial setting method of RCU identification and apparatus control codes will be explained below. In FIG. 40, the same parts as those in FIG. 1 are indicated by the same symbols. TV 612, TV 613, RCU 602 and RCU 603 indicate representative apparatuses.

Figure 41:
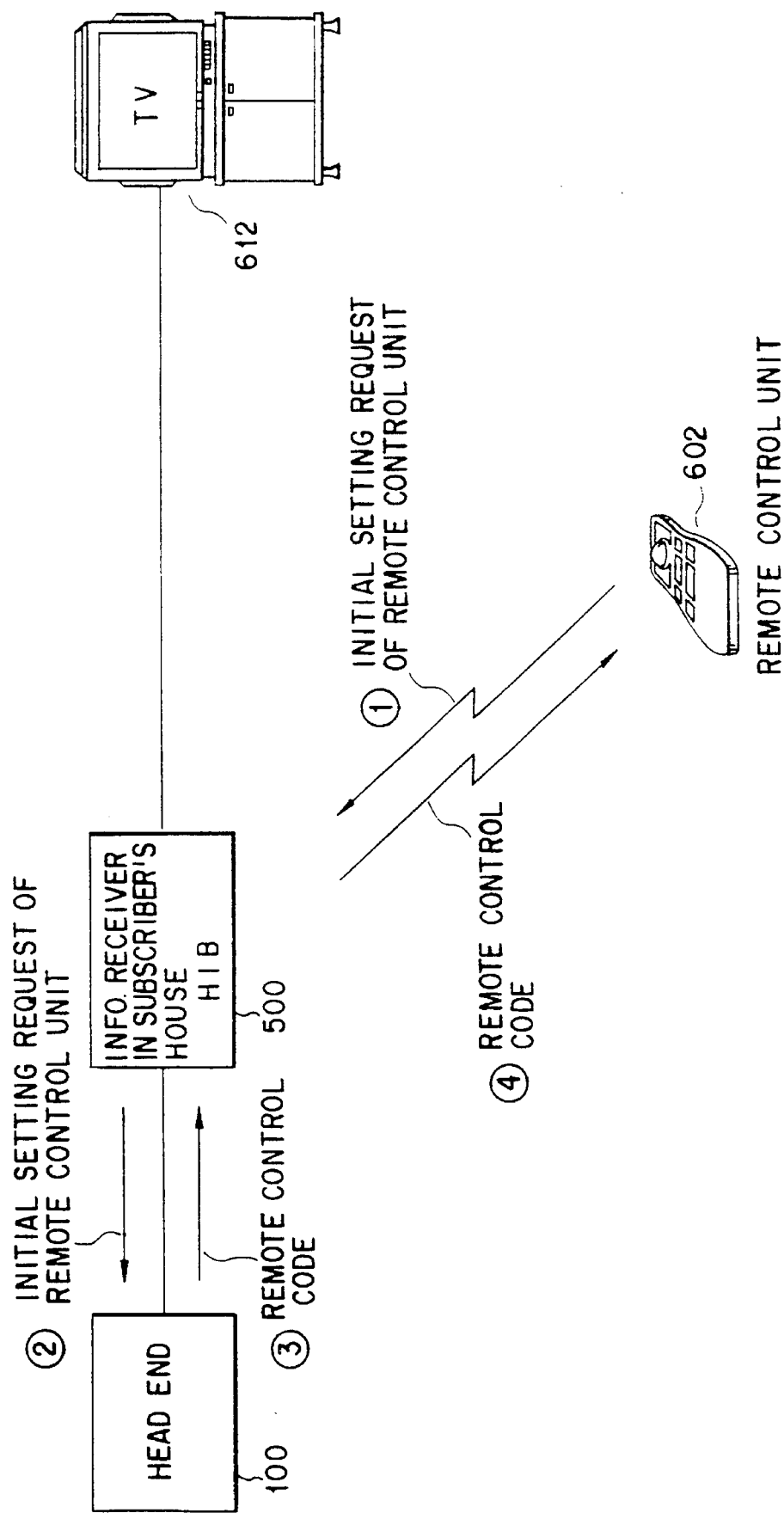
FIG. 41 shows a first example of the initial setting operation.

FIG. 41 shows a first example of a remote control code initial setting method. In this embodiment, the RCU 601 and RCU 602 themselves have memories for storing the remote control codes for such apparatuses as TVs or VTRs. In FIG. 41, RCU 602 is operated to request initial setting of a remote control unit. At this time, the manufacture's name and the serial number for the TV or the VTR, together with the initial setting request, are sent to HIB 500. Then, HIB 500 relays the initial setting request of a remote control unit and the manufacturer's name and serial number to the head end 100.

Receiving this request, the head end 100 takes out the apparatus control (remote control) code requested by the HIB 500 from its own database, and sends it to HIB 500. The HIB 500 relays this to RCU 602, in which the desired code is set.

Figure 42:
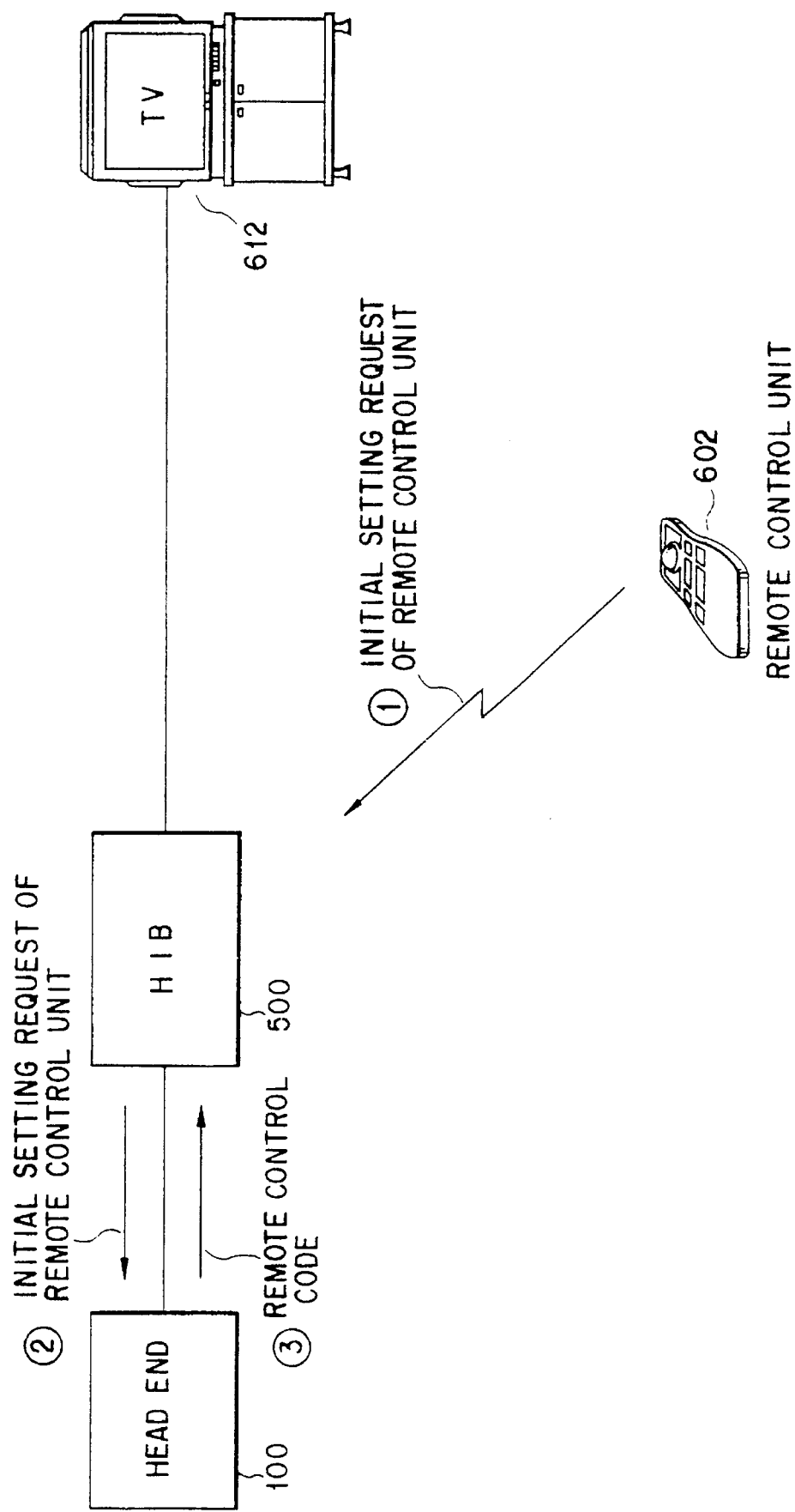
FIG. 42 shows a second example of the initial setting operation.

FIG. 42 shows a second example of a remote control code initial setting method. In this embodiment, the HIB 500 has a memory for storing the remote control codes for such apparatuses as TVs or VTRs. In FIG. 42, RCU is operated to request initial setting of a remote control unit. At this time, the manufacture's name and the serial number for the TV or the VTR, together with the initial setting request, are sent to HIB 500. Then, HIB 500 relays the initial setting request of a remote control unit and the manufacturer's name and serial number to the head end 100.

Receiving this request, the head end 100 takes out the remote control for the apparatus requested by the HIB 500 from its own database, and sends it to HIB 500. The HIB 500 associates this with the RCU identification code in HIB 500, and stores it in the apparatus control code correspondence table 581.

In this way, when HIB stores the remote control code, for example, when TV 612 is operated, this operation request is sent to HIB 500 once as shown in FIG. 43. HIB 500 reads the remote control code coinciding with the manufacturer's name and serial number for the TV or VTR to be operated by RCU from the apparatus control code correspondence table 581 (FIG. 35) in HIB 500, and sends it to RCU 602. The RCU 602 converts the received code into an IR signal and sends this signal to such an apparatus as a TV or a VTR to operate it.

A third embodiment of the initial setting method of a remote control unit will be explained. In this case, the initial setting of the remote control codes for such apparatuses as TVs or VTRs is effected on a menu basis.

Using FIG. 44, this embodiment will be explained.

In this example, it is assumed that the head end 100 has the right of instructing a menu screen generator. Even if HIB 500 has the right of instruction, the same effect will result while the RCU itself is supposed to have a memory for remote control codes, providing this memory for the HIB 500 will produce the same effect.

The viewer first operates the RCU 602 to require initial setting of a remote control unit. Then, HIB 500 relays this to the head end 100.

Receiving the initial setting request of remote control, the head end 100 takes out the remote control setting menu from its own database, and sends it to HIB 500. The HIB 500 delivers this to the cables in the house. The operator watches TV 615 and carries out subsequent remote control setting.

Then, the operator selects the manufacturer's name and serial number according to the remote control code setting menu. The HIB 500 sends these pieces of information all together to the head end 100.

Figure 45:
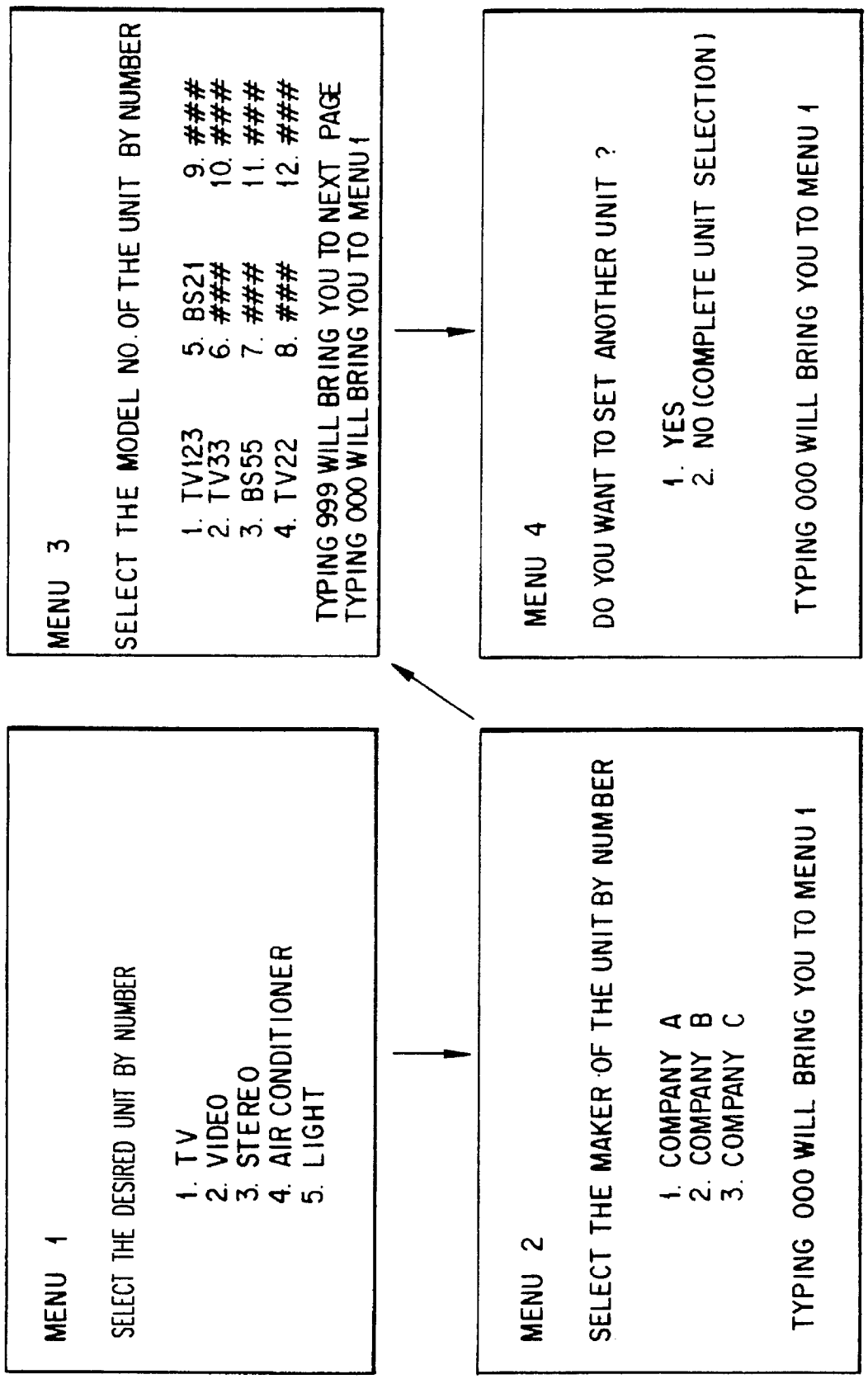
FIG. 45 is an explanatory diagram of the menu screen in setting the third example.

Receiving the apparatus select information including the manufacturer's name and serial number, the head end 100 takes out the remote control for the apparatus requested by the HIB 500 from its own database, and sends it to HIB 500. The HIB 500 relays this to RCU 602, which stores this in the code memory. An example of the apparatus setting menu is shown in FIG. 45. When an initial setting request of a remote control unit is made, menu 1 appears. After a model is selected, menu 2 for maker selection appears when a maker is selected, menu 3 appears, from which a model is selected. Then, menu 4 appears, from which addition or non-addition is selected. If there is no apparatus to be added and set, apparatus select information on the selected items is sent to the head end 100. The menu screen may be displayed on the RCU's display section.

As a result of such setting, the apparatus control code for the controlled apparatus is stored in HIB 500 or RCU 602.

As explained above, when the user has bought a new apparatus, or when he has moved an apparatus installed in a room to another room, he can perform remote control through initial setting. The HIB 500 and RCU contain memory sections and can exhibit a learning function in initial setting. Furthermore, the menu screen may be transmitted from the head end in the form of images. It may be transmitted in the form of menu screen code data. In this case, the HIB 500 needs means for converting the code data into images. Use of a character memory easily realizes the means since most menus consist of such still pictures as characters.

(Scramble system)

A scramble system using RCU and HIB 500 shown in FIG. 1 will be explained below.

FIG. 46 shows the major apparatuses with the same parts as those in FIG. 1 being indicated by the same symbols.

In a CATV system, an HIB 500 can descramble the video and audio signals obtained by scrambling multiple channels, and distribute the descrambled signal to the cable in the house. The demodulating section 554 in FIG. 35 also contains a descramble function.

By using a plurality of RCUs controlling the terminals, different programs can be watched in separate rooms in which RCU 602 and RCU 603 are used separately. In such a system, the RCU is allocated an RCU identification code so that the HIB 500 can identify the upstream signal from RCU to HIB 500 and that RCU can determine whether the downstream signal from HIB 500 is intended for itself.

Figure 47:
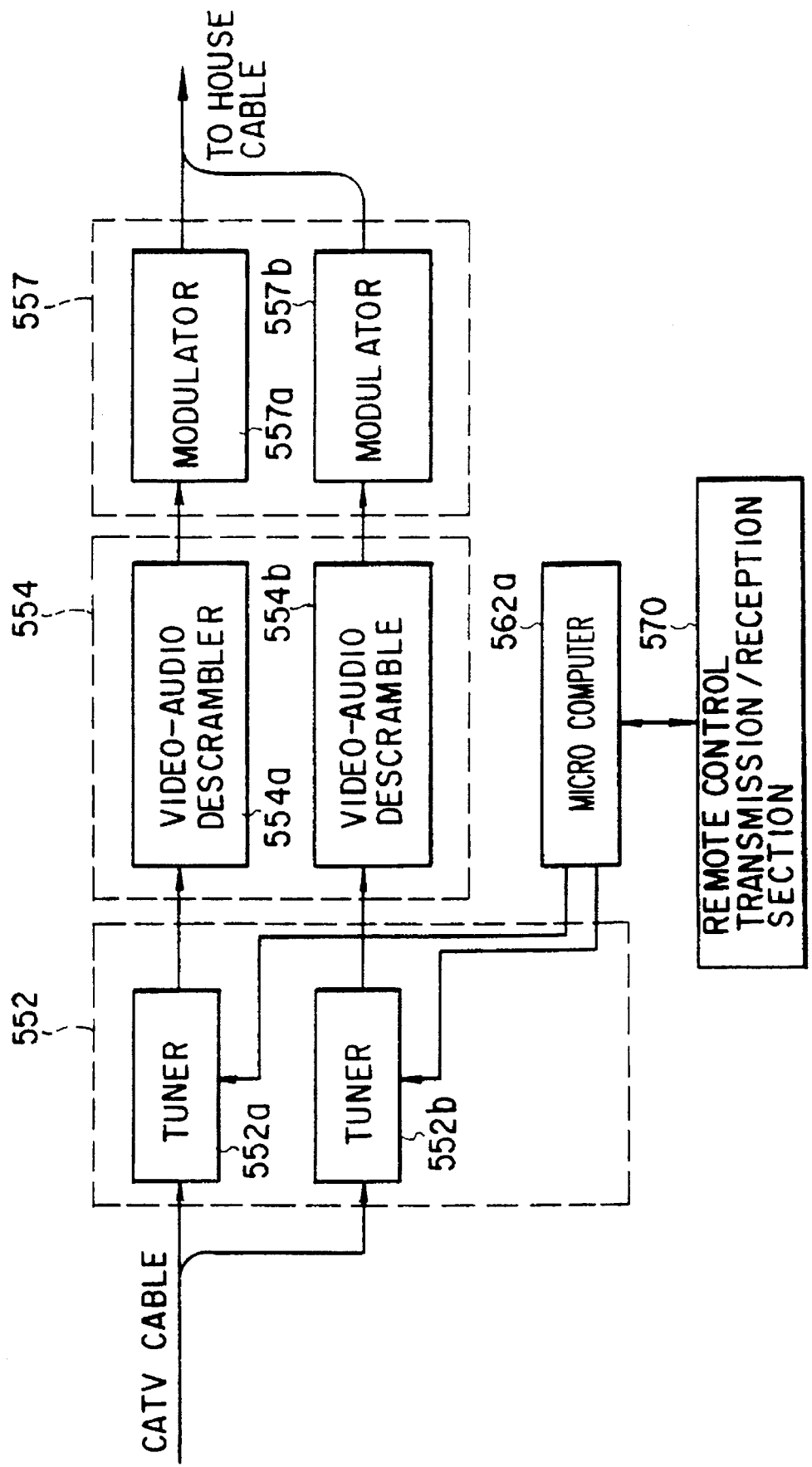
FIG. 47 is a detailed block diagram of part of the HIB in FIG. 35.

FIG. 47 shows an example of HIB 500 in the system. The same blocks as those in FIG. 35 are indicated by the same symbols. In this example, two channels can be descrambled. The communication section with the head end is omitted in this example. Specifically, a tuning section 552 has two tuners 552a and 552b in parallel. The outputs of the tuners 552a and 552b are inputted to video and audio descramblers 554a and 554b respectively, which returns them to the original video and audio signals. Then, the outputs of the video and audio descramblers 554a and 554b are inputted to modulators 557a and 557b respectively, which modulate them into the channels corresponding to TVs. A timing generating section 562 contains a microcomputer 562a, which is related to a remote control transmission and reception section 570.

with this configuration, the tuners 552a, 552b each receive separate channels. The video and audio descramblers 554a, 554b can return the outputs of these tuners to their original signals. The restored signals are received by the TVs corresponding to the separate channels.

(Calling function)

In the embodiment shown in FIG. 48, a screen generator 554c and a modulator 557c are added to the HIB 500 of FIG. 47. The modulators 557a, 557b may also be used as the modulator 557c. The screen generator 55c is a signal generator for displaying character data on the TV and is well known in connection with teletext or the personal computer, so that a detailed explanation will not be given.

Screens displayed in this example will be explained with reference to FIG. 49. Using an RCU (hereinafter, remote control unit 1) as an example, the procedure for executing the control system will be described. The microcomputer 562a in HIB 500 shown in FIG. 48 receives the remote control signal, determines the calling RCU on the basis of the received RCU identification code, turns on the power switch of the TV in the room where the RCU exists (hereinafter, referred to as room 1), and changes the channel so that the menu screen may appear on the TV in room 1. At the same time, HIB 500 generates the main menu screen of FIG. 49A, thereby allowing a menu screen to appear on the TV. When the mode to execute the system (hereinafter, the control system) is selected on the RCU (hereinafter, remote control 1), the main menu of FIG. 49A appears.

Next, the operator in room 1 selects the control menu on the main menu screen. For example, if he selects "1. Call", the screen will return to the display mode of FIG. 49B. This call is used to call up the user in another room. At this time, the microcomputer 562a and screen generator 554c in FIG. 47 generate the screen for call menu 1. The TV in room 1 shows this screen. Then, the operator in room 1 makes a choice on the call menu 1 screen. For example, in FIG. 29, it is assumed that the room with TV 512 and remote control unit 602 is a children's room. If "1. Children's room" is selected, the microcomputer 562a of FIG. 48, receiving the remote control signal 1, will generate the screen for call menu 2 of FIG. 49C. This enables HIB 500 to sense that the TV in the children's room should be on.

After call menu 2 has appeared, the operator can effect various settings. Types of calls include a call to give notice that there is a telephone call, a call to let people know the meeting room, and a wake-up call. When the user in room 1 selects "1. Telephone call for you," the representation as shown in FIG. 49D will appear on the TV in the children's room. In this way, for telephone call, the message shown in FIG. 49D can be displayed in the children's room from room 1. In this example, because there is a telephone call, the message is displayed to let the user in the children's room know this.

In this example, the correspondence between remote control unit ID and room must be previously set in the microcomputer 562a of HIB 500. When this setting is omitted, the screen of FIG. 49B displays the remote control unit ID for each room, not the name of each room.

While in the above explanation, the TV in the children's room is assumed to be off at first, it can be considered to be on. Since the turning on and off of the TV power supply is usually controlled with a single button, if the initial state of the power supply is on, it is illogical. An example to avoid this situation will be explained.

In this case, after the operator in room 1 has selected on the screen of call menu 2, the microcomputer 562a and the screen generator of FIG. 48 generate the screen of FIG. 49D, and also change the channel so as to display the screen on the call TV in the children's room. Then, as shown in FIG. 49D, a code of 777 is waited for to be sent from the remote control unit in the children's room. If the code has arrived, it is judge that the message has been recognized, and there is no subsequent processing. If the code has not arrived, it is judged that the TV is off, and the TV in the children's room is controlled to be on, and the channel is changed so that the screen of FIG. 49D may appear on the TV in the children's room. This enables the message to be displayed regardless of whether the power supply of the TV in the children's room is on or off. Although explanation is omitted, a speech message may be added.

A wake-up call menu will be explained, assuming that the microcomputer 562a of FIG. 48 has a timer function or a clock function. According to the menus shown in FIG. 50 (FIGS. 50A and 50B), the room and time can be set. At the time, the microcomputer 562a and screen generator 554c generate the screen of FIG. 50C, and display it on the TV in the specified room.

Figures 51A, 51B:
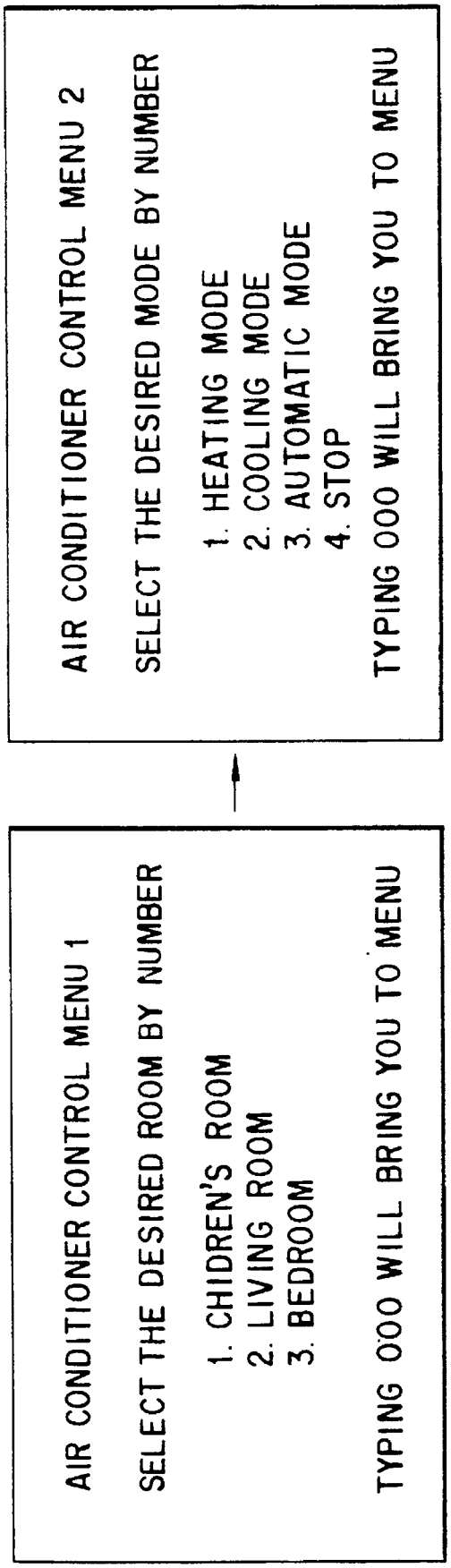
FIGS. 51A and 51B show still other examples of displaying the menu screen when the HIB of FIG. 48 is use

FIG. 51 shows an air-conditioner control menu. In this mode, when the room and operation mode are selected, the air conditioner in the specified room can be set in the mode. The signals that can control the air conditioner regardless of the initial operating state, that is, the operating signal and the stop signal, must be different remote control codes.

A structure of the track ball 650 in the remote control unit explained in FIGS. 29 and 30 will be described.

FIGS. 52A and 52B show the supporting state of a move sensing ball 651. The ball 651 is inserted in a hollow made in an enclosure 671 with part of the ball sticking out of the hollow 762. At the bottom of the hollow 762, bearings 673, 674 to push up the ball elastically are provided and loaded with springs. This produces space between the bottom of the hollow 672 and the bottom of the ball 651. In the space, there is provided a z-direction sensing switch 678. Rollers 681 to 684 provided on the circumferential surface of the ball 651 are rotatably in contact with to the upper side wall of the hallow 672. For example, the rotation of roller 681 or 682 is transmitted to an x-direction data generator, and the rotation of roller 683 and 684 is transmitted to a y-direction data generator.

FIG. 53 shows another embodiment of the track ball. The same parts as those in FIG. 52 are indicated by the same symbols what is different from the previous embodiment is that the ball 651 is installed so as to stick out of the top and bottom surface of the enclosure 671 (FIG. 53B), that a z-direction sensing switch 690 is installed on the enclosure as a two-way sensing switch, and that a sense arm 691 is designed to sense small upward and downward movements of the ball 651. When the ball 651 is pushed upward, this turns on switch SW1. Pushing the ball 651 down turns switch SW2 on. with this track ball, depending on the operation in the z direction, for example, pushing up, the function now being executed can be canceled or a hierarchical menu higher than the function mark can be selected. A mouse that is slid over the desk can also be used.

With the remote control system described above, a burden for the remote control unit can be alleviated in setting a plurality of controlled apparatuses or functions, and a learning function can be achieved without complicating the apparatus even when controlled apparatuses and functions are added.

The broadcast signal transmitted via an optical cable 701 is taken in by a HIB 500 via a photoelectric converter 702 and a drop cable 703. The HIB 500 transmits the signal to house wiring 620 connected to TVs 611 to 613 and VTRs 613, 614. The individual TVs are allocated remote control units (RCU) 601 to 603, respectively. For example, when RCU 602 effects remote control of TV 612, it sends its control information to HIB 500 and controls HIB 500 using the control code stored in HIB 500.

As explained above, with the present invention, a unified operation procedure can be achieved in setting controlled apparatuses or functions, and the interactive operation enables the controlled apparatuses or functions to be controlled in a more straightforward manner. Furthermore, with the two-way communication function, the state of each RCU is managed centrally by a learning function block, thereby avoiding interference between the RCUs and simplifying the operation of controlled apparatuses and functions.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A CATV system comprising:

center facilities comprising, program information transmission means for transmitting program information including a plurality of television signals, and center-side two-way communication means for exchanging data with a subscriber database unit and also for transmitting and receiving data to and from external systems, comprising a transmitting and receiving section;

a two-way transmission line, one end of which is connected to an output end of said program information transmission means and the transmitting and receiving section of said center-side two-way communication means; and a subscriber terminal unit connected to the other end of said two-way transmission line, comprising, a common bus having physical addresses and logical addresses assigned at predetermined periods of time for each block connected thereto, a receiving block having a receiving channel and an external terminal connected to said two-way transmission line and which receives and digitizes the program information from said program information transmission means, and outputs the digitized signal to at least one of said logical addresses assigned to said common bus, a terminal-side two-way communication block connected to said two-way transmission line, having an internal terminal connected to said common bus, exchanging data with said center-side two-way communication means, and also transmitting and receiving data with a subscriber remote control unit, a plurality of program information processing blocks for processing the program information received by said receiving block and outputted to at least one of said logical addresses assigned to said common bus, a management block connected to said common bus and storing management data for blocks connecting to said common bus, and providing at least timing setting data, which designates the logical addresses, to each of the blocks connecting to said common bus in order to manage, (1) the logical addresses of the receiving block on said common bus;

(2) the receiving channel of the receiving block;

(3) an output timing at which reception program information is output from the receiving channel to said common bus;

(4) a logical address of said terminal-side two-way communication block on said common bus;

(5) an input and output timing at which input and output data of the terminal-side two-way communication block are output to said common bus, and (6) respective logical addresses of said program information processing blocks on said common bus, reception of timing information corresponding to program information on said common bus and contents of processes hosted on said program information processing blocks;

a switch section to which the program information processed in said program information processing blocks is supplied, and a basic block which,
(1) grasps the physical address of each block connected to the physical addresses assigned to the respective blocks on said common bus,
(2) communicates data with said terminal-side two-way communication block via said common bus,
(3) provides said management block with tuning information, specifying information and the grasped physical address of each block, said tuning information being obtained from said subscriber remote control unit, and said specifying information specifying a content of a process at one of said program information processing block and the output destination, said tuning information and said specifying information being provided as said management data, and
(4) controls a select state of said switch section based on the specifying information.

2. A communication system for a CATV system, comprising:

center facilities comprising,
an information transmitting unit for outputting program information including a plurality of television broadcasts,
a subscriber database unit, and
center-side two-way communication means;

a two-way transmission line connected to said center facilities;

a subscriber terminal unit connected to said two-way transmission line comprising,
terminal-side two-way communication means for communicating with said center facilities,
an output terminal,
information reception means which receives at least one signal from said center facilities, and
relay means for transmitting the at least one signal received by said information reception means to at least one of a plurality of controllable apparatuses,;

the plurality of controllable apparatuses being connected to the output terminal of said subscriber terminal unit via respective coaxial cables;

address management means for managing addresses of a subscriber remote control unit and other subscriber remote control units, and for preventing an execution of an undesirable operation due to interference in signal transmission between said subscriber remote control unit and said other subscriber remote control units by managing respective peculiar addresses associated with subscriber remote control units, at least one of said peculiar addresses included in said signal transmission, and the subscriber remote control unit which is configured to communicate with said subscriber terminal unit and having one of said peculiar addresses, said subscriber remote control unit including means for transmitting data held in said subscriber terminal, where said data includes said peculiar address associated with said subscriber remote control unit inserted therein, wherein communication is effected between said subscriber terminal unit and said subscriber remote control unit to control said plurality of apparatuses, and data of said means for transmitting held in said subscriber terminal unit is used by said subscriber remote control unit to control, along with said subscriber terminal unit, at least one of said plurality of apparatuses.

3. A communication system for a CATV system according to claim 2, wherein the number of said information reception means and that of said retransmission means in said subscriber terminal unit are each more than one, and the output frequencies of said retransmission means are each allocated to at least a plurality of television sets.

4. A CATV system according to claim 1, further comprising said subscriber remote control unit which has a peculiar address that is managed at said subscriber database unit before being managed at said subscriber terminal unit.

5. A CATV system according to claim 4, wherein the peculiar address of said subscriber remote control unit managed at said subscriber database unit is transferred to said subscriber terminal unit by way of said two-way transmission line.

6. A CATV system according to claim 1, wherein said terminal-side two-way communication block in said subscriber terminal unit allocates peculiar addresses to said subscriber remote control unit and other subscriber remote control units on a one-to-one basis.

7. A CATV system according to claim 1, wherein,
said subscriber remote control unit comprises plural of said subscriber remote control units, each of which is allocated a predetermined transmission frequency, and
said terminal-side two-way communication block in said subscriber terminal unit comprises,
a remote control unit transmission frequency managing means, and
means for selectively receiving communications from said plural of said subscriber remote control units in order to prevent radio interference.

8. A CATV system according to claim 7, wherein said terminal-side two-way communication block generates a data indicative of a predetermined transmission frequency for said subscriber terminal unit in said subscriber remote control unit which is managed at said subscriber database unit before being managed at said subscriber terminal unit.

9. A CATV system according to claim 7, wherein,
each of said subscriber remote control unit transmits data having a preamble period set therein, and
said terminal-side two-way communication block in said subscriber terminal unit determines which subscriber remote control unit to communicate with by sensing said preamble period in time division for each frequency managed.

10. A CATV system according to claim 8, wherein said two-way transmission line transmits the generated data for the, predetermined transmission frequency.

11. A CATV system according to claim 7, wherein said plurality of program information processing blocks and said switch section in said subscriber terminal unit allocate a downstream transmission frequency to each of said plural subscriber remote control units on a one-to-one basis.

12. A CATV system according to claim 1, wherein said terminal-side two-way communication block, and a communication means in said subscriber remote control unit are composed of terminal-side two-way communication means capable of two-way communication with each other and remote control unit-side two-way communication means.

13. A CATV system according to claim 12, wherein the subscriber terminal unit comprises plural subscriber terminal units, and a downstream transmission frequency for the remote control unit corresponding to each subscriber terminal unit are changeable for each of adjacent subscriber terminal units.

14. A CATV system according to claim 13, wherein subscriber database unit manages data for obtaining said downstream transmission frequency.

15. A CATV system according to claim 14, wherein said data for obtaining said downstream transmission frequency for said subscriber terminal unit is transmitted from said subscriber database unit to a corresponding subscriber terminal unit by way of said two-way transmission line so that the downstream transmission frequency for said subscriber remote control unit can be changed.

16. A CATV system according to claim 1, wherein in order to enable said subscriber terminal unit to obtain various information services offered by said center facilities at will, said common bus of said subscriber terminal unit is configured to connect to a plurality of function blocks, thereby enabling an addition and removal of said function blocks to and from said common bus according to a selection of information services transmitted from said center facilities.

17. A CATV system according to claim 16, wherein said common bus has a plurality of logical slots set thereon, said logical slots having logical addresses.

18. A CATV system according to claim 16, wherein the subscriber terminal unit is one of at least two of said subscriber terminal units, and said subscriber database unit manages data and a function of said plurality of function blocks.

19. A CATV system according to claim 18, wherein in order to run a diagnostic check on said subscriber terminal units, said subscriber database unit transfers the data for the function blocks via said two-way transmission line to each of said subscriber terminal units, and compares a sense result transferred back via said two-way transmission line from abnormality sensing means in each of said subscriber terminal units with a reference data to make a self-diagnosis.

20. A CATV system according to claim 1, wherein the terminal-side two-way communication means of said subscriber terminal unit is connected to an expansion unit-side two-way communication means of an expansion unit via a coaxial cable, said expansion unit is further connected to a different apparatus via a two-way communication means provided by the different apparatus, and said different apparatus is connected to said subscriber terminal unit via said expansion unit.

21. A CATV system according to claim 20, wherein said subscriber terminal unit comprises a data format conversion means for a converting a format of data from at least one of the different apparatus connected to the output of said information recognition means or the output of the receiving block, thereby enabling a transmission of a television signal to said different apparatus via said expansion unit.

22. A CATV system according to claim 20, wherein said subscriber terminal unit further comprises data format conversion means for converting an upstream data transmitted from said different apparatus, and to a television set in a subscriber's house or to the center facilities.

23. A CATV system according to claim 22, wherein the converter upstream data provided to said center facilities is transferred again to another subscriber terminal unit.

* * * * *